US012771213B2

(12) United States Patent
Thompson

(10) Patent No.: US 12,771,213 B2
(45) Date of Patent: Oct. 20, 2026

(54) CIRCUIT FOR RECAPTURING MAGNETIC ENERGY

(71) Applicant: Ryan Mark Thompson, Owatonna, MN (US)

(72) Inventor: Ryan Mark Thompson, Owatonna, MN (US)

( * ) Notice: Subject to any disclaimer, the term of this patent is extended or adjusted under 35 U.S.C. 154(b) by 73 days.

(21) Appl. No.: 18/228,330

(22) Filed: Jul. 31, 2023

(65) Prior Publication Data

US 2024/0039373 A1 Feb. 1, 2024

Related U.S. Application Data

(60) Provisional application No. 63/393,360, filed on Jul. 29, 2022.

(51) Int. Cl.

*H02K 11/33* (2016.01)
*H02K 1/27* (2022.01)
*H02K 11/00* (2016.01)
*H02K 15/03* (2025.01)
*H02P 9/40* (2006.01)

(52) U.S. Cl.

CPC ............... *H02K 11/33* (2016.01); *H02K 1/27* (2013.01); *H02K 11/0094* (2013.01); *H02K 15/03* (2013.01); *H02P 9/40* (2013.01)

(58) Field of Classification Search

CPC ...... H02K 11/33; H02K 1/27; H02K 11/0094; H02K 15/03; H02P 9/40

See application file for complete search history.

(56) References Cited

U.S. PATENT DOCUMENTS 3,517,280 A 6/1970 Rosier
4,055,789 A 10/1977 Lasater
6,545,444 B2 4/2003 Bedin
8,142,318 B2 * 3/2012 Palmer ..................... B60K 6/46 475/5
9,230,730 B2 1/2016 Heins
10,103,591 B2 10/2018 Heins
10,291,162 B1 5/2019 Heins
2008/0030165 A1 2/2008 Lisac
2009/0224716 A1 * 9/2009 Vig ........................ G05B 19/19 318/550

(Continued)

FOREIGN PATENT DOCUMENTS

EP 688091 A1 12/1995
JP 2002315379 A 10/2002
WO 2016015072 A1 2/2016

OTHER PUBLICATIONS

International Search Report and Written Opinion from PCT/US2023/071363 mailed Oct. 23, 2023, 19 pages.

*Primary Examiner* — Zoheb S Imtiaz

(74) *Attorney, Agent, or Firm* — Merchant & Gould P.C.

(57) ABSTRACT

A circuit for recapturing magnetic energy is provided. When a magnet approaches a coil, a switching circuit may activate an electrical path to direct current from a power source through the coil. When the magnet moves away from the coil, the switching circuit may deactivate the electrical path to substantially decrease current from the power source to the coil, a magnetic field induced in the coil may at least partially collapse, and energy from the at least partially collapsing magnetic field may be captured in the storage device, charging the storage device.

21 Claims, 60 Drawing Sheets

(56) References Cited

U.S. PATENT DOCUMENTS

| | | | | |
|---|---|---|---|---|
| 2014/0217941 | A1* | 8/2014 | Yamada | H02P 21/0089 318/400.26 |
| 2016/0079889 | A1* | 3/2016 | Pietromonaco | H02M 3/155 318/400.3 |
| 2016/0079893 | A1* | 3/2016 | Pietromonaco | H02P 6/14 318/254.1 |
| 2022/0385182 | A1* | 12/2022 | Gorski | H02M 7/125 |

* cited by examiner

CIRCUIT FOR RECAPTURING MAGNETIC ENERGY

CROSS-REFERENCE TO RELATED APPLICATIONS

This application claims priority to U.S. Provisional Patent Application No. 63/393,360, filed Jul. 29, 2022 and is incorporated herein by reference.

BACKGROUND

Traditional electric motors rely on converting electrical energy into mechanical energy with the use of magnetic fields. By passing current through an inductor, a magnetic field is induced. This magnetic field can then interact with magnets in the electric motor and cause the motor to rotate. However, generating that magnetic field in the inductor requires energy. In traditional electric motors, this energy is lost when the current flow in the inductor changes and the magnetic field collapses.

In view of the above and other disadvantages of existing systems, improvements are desirable.

SUMMARY

In general terms, this disclosure is directed to a circuit for recapturing magnetic energy. A magnetic field induced in a coil may at least partially collapse, and energy from the at least partially collapsing magnetic field may be captured in a storage device.

In a first aspect, an energy recovering circuit system is provided. The system includes a power source, a switching circuit defining an electrical path, a storage device, and a motor. The motor comprises a coil and a magnet. The coil is electrically connected to the power supply and the switching circuit, and at least one of the magnet and the coil is movable relative to the other of the coil or the magnet. When the coil and the magnet are at a first position relative to one another, the storage device has a voltage. When the coil and the magnet are at a second position relative to one another, the switching circuit activates the electrical path to direct current from the power source through the coil. When the coil and the magnet are at a third position relative to one another, the switching circuit deactivates the electrical path to substantially decrease current from the power source to the coil, a magnetic field induced in the coil at least partially collapses, and energy from the at least partially collapsing magnetic field is captured in the storage device, charging the storage device.

In a second aspect, a method for capturing energy in an electrical circuit is provided. A storage device stores a voltage when a coil and a magnet are at a first position relative to one another. When the coil and the magnet are at a second position relative to one another, an electrical path is activated with a switching circuit to direct power from a power source through the coil. The electrical path is deactivated with the switching circuit to substantially decrease current from the power source to the coil, at least partially collapsing a magnetic field induced in the coil and capturing energy in the storage device, the captured energy from the at least partially collapsing magnetic field, charging the storage device.

In a third aspect, an energy capturing circuit is provided. The circuit includes a power source, a coil, a storage device, a PNP transistor, an NPN transistor, and a recovery conversion system. The power source supplies electricity to the circuit and has a positive side and a negative side. The coil has a first side and a second side. The first side of the coil is electrically connected to the positive side of the power source. The storage device has a positive side electrically connected to the second side of the coil and a negative side electrically connected to the negative side of the power source. When energy is released by the coil, the energy is captured by the storage device. The PNP transistor has a base, a collector, and an emitter. The NPN transistor has a base, a collector, and an emitter. The emitter of the PNP transistor is electrically connected to the positive side of the power source, the collector of the PNP transistor is electrically connected to the base of the NPN transistor, and the base of the PNP transistor is electrically connected to the second side of the coil and the collector of the NPN transistor. The emitter of the NPN transistor is electrically connected to the negative side of the storage device and the negative side of the power source. When the coil and the magnet are at a first position relative to one another, the storage device has a voltage. When the coil and the magnet are at a second position relative to one another, the switching circuit activates the electrical path to direct current from the power source through the coil. When the coil and the magnet are at a third position relative to one another, the switching circuit deactivates the electrical path to substantially decrease current from the power source to the coil, a magnetic field induced in the coil at least partially collapses, and energy from the at least partially collapsing magnetic field is captured in the storage device, charging the storage device. Recovered energy stored in the storage device returns to the power source by running through the recovery conversion system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings may not be to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
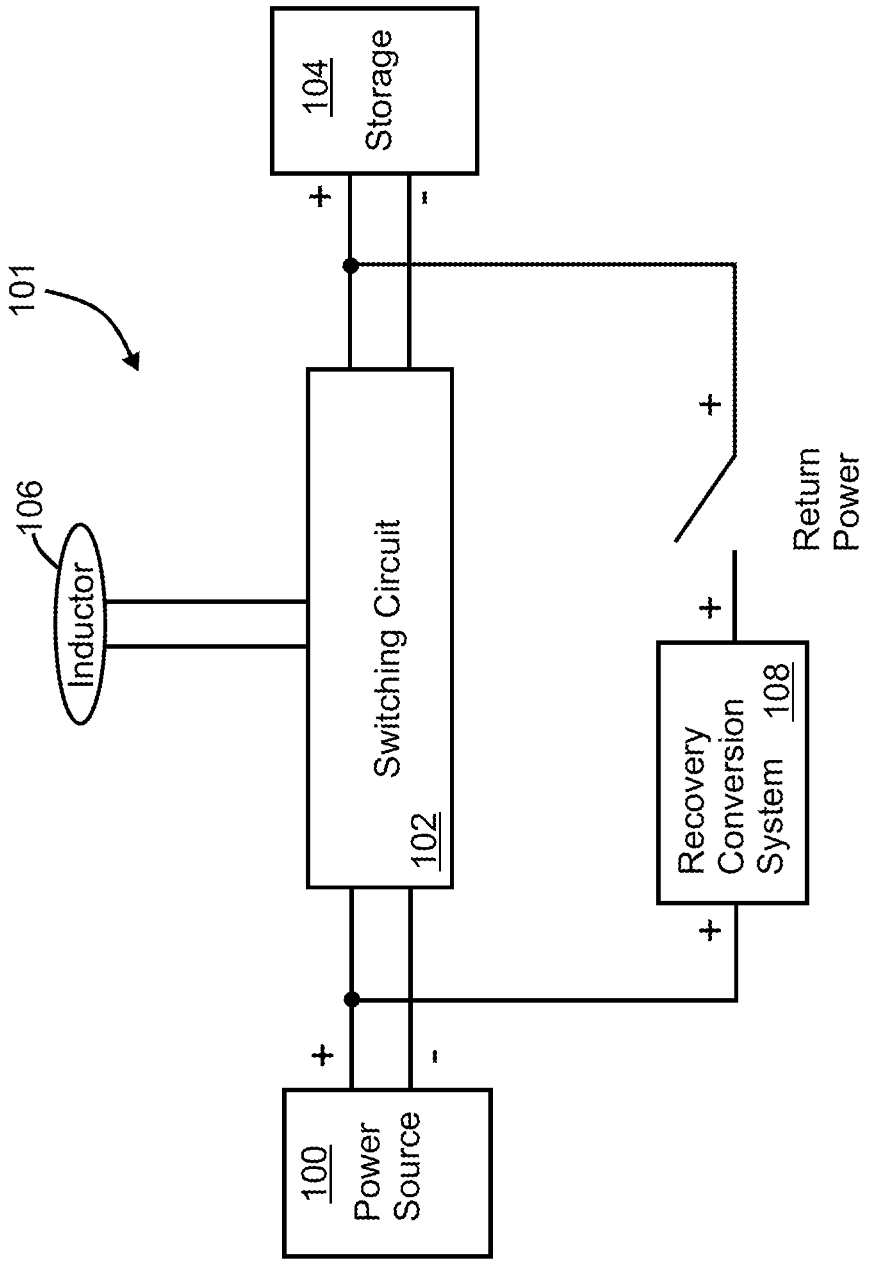
FIG. 1 illustrates a block diagram of an energy recovering circuit system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

For purposes of this patent document, the terms “or” and “and” shall mean “and/or” unless stated otherwise or clearly intended otherwise by the context of their use. Whenever appropriate, terms used in the singular also will include the plural and vice versa. The use of “a” herein means “one or more” unless stated otherwise or where the use of “one or more” is clearly inappropriate. The use of “comprise,” “comprises,” “comprising,” “include,” “includes,” “including,” “having,” and “has” are interchangeable and not intended to be limiting. The term “such as” also is not intended to be limiting. For example, the term “including” shall mean “including, but not limited to.”

All ranges provided herein include the upper and lower values of the range unless explicitly noted. Although values are disclosed herein when disclosing certain exemplary embodiments, other embodiments within the scope of the pending claims can have values other than the specific values disclosed herein or values that are outside the ranges disclosed herein.

Terms such as “substantially,” “approximately” or “about” when used with values or structural elements provide a tolerance that is ordinarily found during testing and production due to variations and inexact tolerances in factor such as material and equipment. These terms also provide a tolerance for variations found in nature and environmental conditions due to factors such as changes in temperature, humidity, etc. These terms also provide a tolerance for residual currents and voltages within circuits described herein, such as those caused by minor changes in a magnetic field.

When ranges of values are given, the range includes the value at either end of the range and all values between the ends of the range, unless explicitly noted otherwise.

In general terms, this patent document is directed to a circuit for recapturing energy from the magnetic field induced in an inductor.

Figure 2:
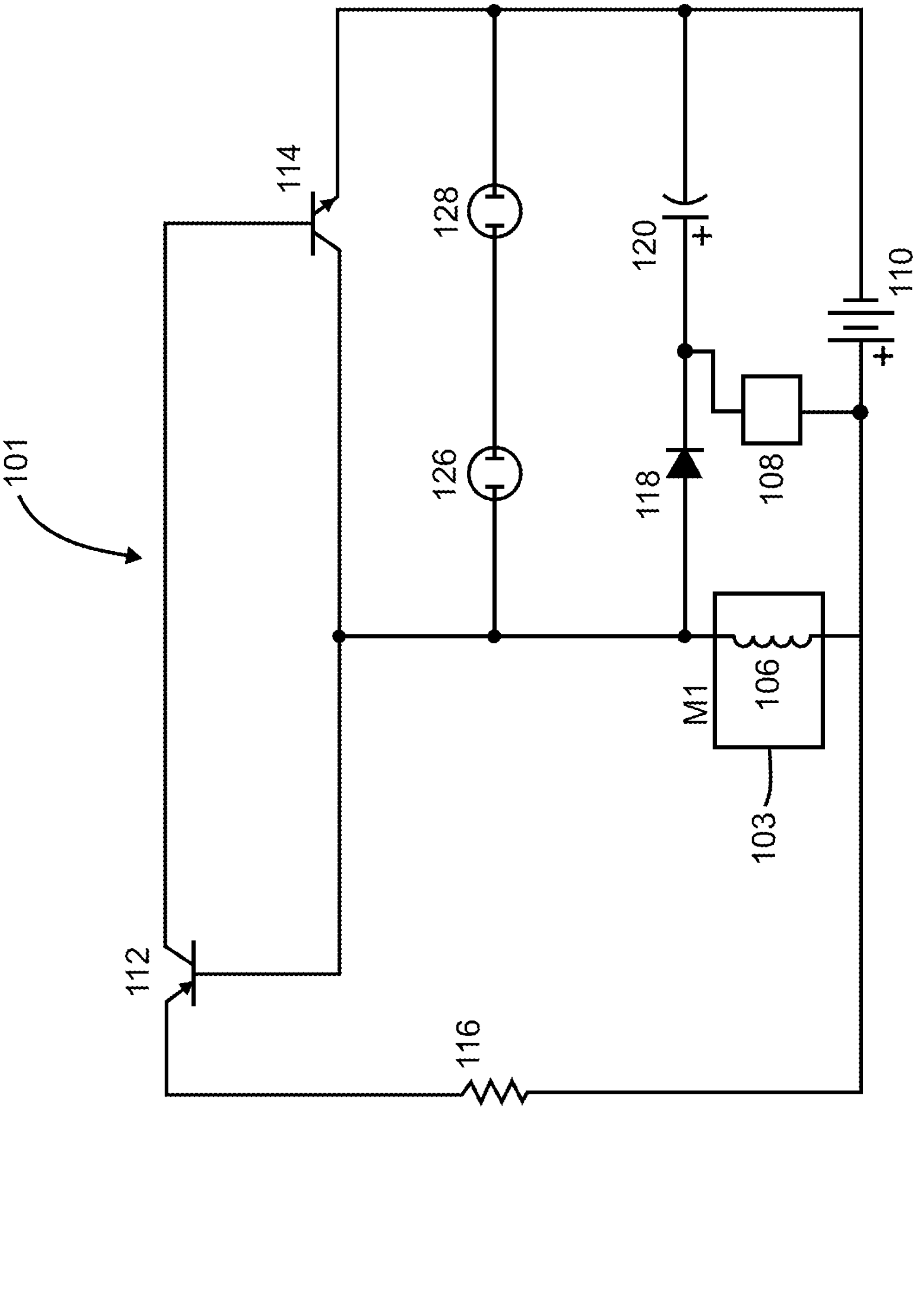
FIG. 2 illustrates an example embodiment of an energy capturing circuit.

Turning now to FIGS. 1 and 2, a circuit 101 includes a power source 100, a switching device 102, a storage device 104, an inductor 106, and a recovery conversion system 108.

The power source 100 provides energy to the circuit 101. In an embodiment, the power source 100 is a battery 110. In alternative embodiments, the power source 100 is any other suitable type of power source such as an AC grid/line power, a storage capacitor, solar power, wind power, or hydro power. Any form of electrical power can be considered as an input power source 100 as long as its output includes, or can be converted into, direct current.

The switching device 102 defines electrical paths and controls the current flow through the circuit 101. By controlling the flow of current through the circuit 101, the switching device 102 can switch at least one associated motor or rotor on and off and control when magnetic energy can be recovered. In an embodiment, such as the circuit shown in FIG. 2, the switching device 102 comprises a PNP transistor 112, an NPN transistor 114, and a resistor 116. When the PNP transistor 112 is triggered, it allows current to flow from its emitter out its collector and to the base of the NPN transistor 114. This triggers the NPN transistor 114 and allows current to flow from its collector to its emitter. The resistor 116 acts as the biasing resistor for both transistors 112, 114. In an embodiment, the resistor 116 has a resistance of approximately 1 kiloohm. In alternative embodiments, the resistor 116 has a resistance in the range of 25 ohms to 10 kiloohms. By acting as the biasing resistor, the resistor 116 sets the allowable amount of power from the battery 110 and the capacitor 120 that the circuit 101 is capable of consuming, sets the limit on how much magnetic energy must be induced in the inductor 106 in order for the PNP transistor 112 to trigger, and creates an imbalance in the circuit 101 that causes current to flow at the PNP transistor 112 before the NPN transistor 114. In alternative embodiments, the switching device 102 is a MOSFET, an insulated gate bipolar transistor (IGBT), a silicone controlled rectifier (SCR), a transistor and MOSFET sharing the same connections (TransFET), or a current and voltage device in the same package or discretely made.

The storage device 104 stores the recovered energy to be returned to the power source 100. In an embodiment, such as the circuit shown in FIG. 2, the storage device 104 is a diode 118 in series with a capacitor 120. The capacitor 120 stores the recovered energy, and the diode 118 substantially prevents the stored energy from returning to the circuit 101 without first returning to the battery 110 through the recovery conversion system 108. In alternative embodiments, the storage device 104 is any suitable device capable of storing voltage such as a capacitor, a battery, or an ultra-capacitor, either with or without a diode connected in series.

The inductor 106 generates a magnetic field when current flows through it. When the magnetic field in the inductor 106 breaks down, the energy is captured by the storage device 104. In an embodiment, the inductor 106 is made of copper. In alternative embodiments, the inductor 106 is made of aluminum, steel, brass, graphene conductor, carbon nanotubes, bifilar wire, trifilar wire, or litz wire, or some other suitable conductor.

The inductor 106 may be a coil. In an embodiment, the inductor 106 comprises one or more windings in an electric motor M1 103. In example embodiments, the inductor (i.e., motor winding) 106 comprises the windings in an electric motor M1 103 electrically connected in series. In other embodiments, the inductor (i.e., motor winding) 106 comprises the windings in the electric motor M1 103 electrically connected in parallel. In embodiments, the inductor (i.e., motor winding) 106 is a single winding in the motor M1 103.

In example embodiments, one or more circuits 101 can be electrically connected to the motor M1 103. For example, a circuit 101 can be electrically connected to a single inductor (i.e., motor winding) 106. In this embodiment, the other inductors (i.e., motor windings) in the motor continue to receive electrical current and rotate the motor shaft. In another example, each inductor (i.e., motor winding) 106 in the motor M1 103 is connected to a separate circuit 101 and is used to recover energy independently from the other combination of an inductor (i.e., motor winding) 106 and a circuit 101. In other examples, more than one inductor (i.e., motor winding) 106, but less than all the inductors (i.e., motor windings) 106 in the motor M1 103 are connected to separate circuits 101.

The recovery conversion system 108 is connected between the positive side of the storage device 104 and the positive side of the power source 100. The recovered energy stored in the storage device 104 returns to the power source 100 by running through the recovery conversion system 108. In an embodiment, the recovery conversion system 108 is a step-down resistor. In alternative embodiments, the recovery conversion system 108 is any suitable circuit 101 or device such as a step-down DC-to-DC converter, an electric motor, a light bulb, a series connected capacitor or capacitors, a linear regulator, an inductor, or a transformer.

In alternative embodiments, the circuit further includes a switching protection device. The switching protection device provides a warning when the voltage across the storage device 104 is too high. An example of a switching protection device, shown in FIG. 2, is a pair of neon light bulbs 126, 128 which will turn on when the voltage across the capacitor 120 is too high as a visual indicator. In an embodiment, the neon light bulbs 126, 128 are configured to handle approximately 180 volts of direct current (VDC). Other examples of switching protection devices include a single neon light bulb, transient voltage suppression (TVS), metal oxide varistor (MOV), gas discharge tube (GDT) and a resistor (i.e., carbon, wire wound, or metal film).

Figure 3:
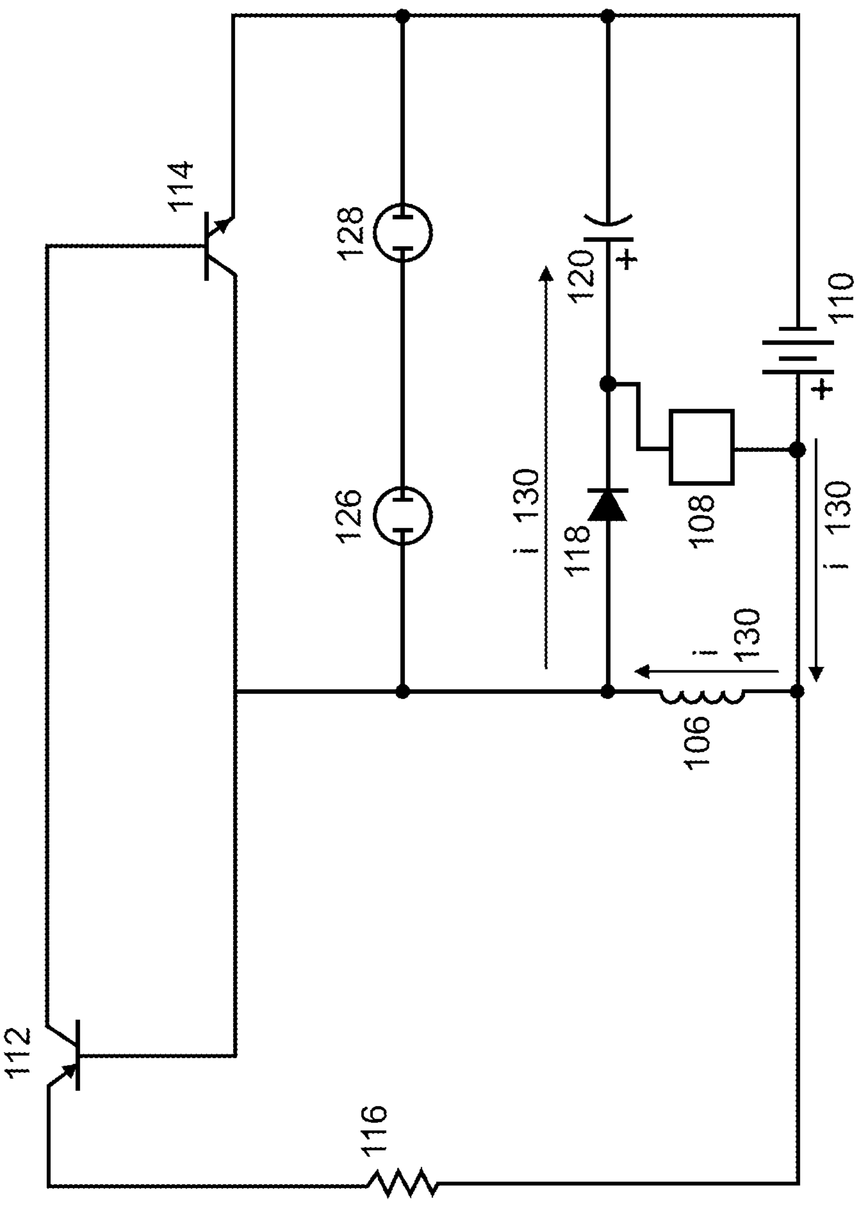
FIGS. 3-5 illustrate an embodiment of the energy capturing circuit shown in FIG. 2 in operation.
Figure 4:
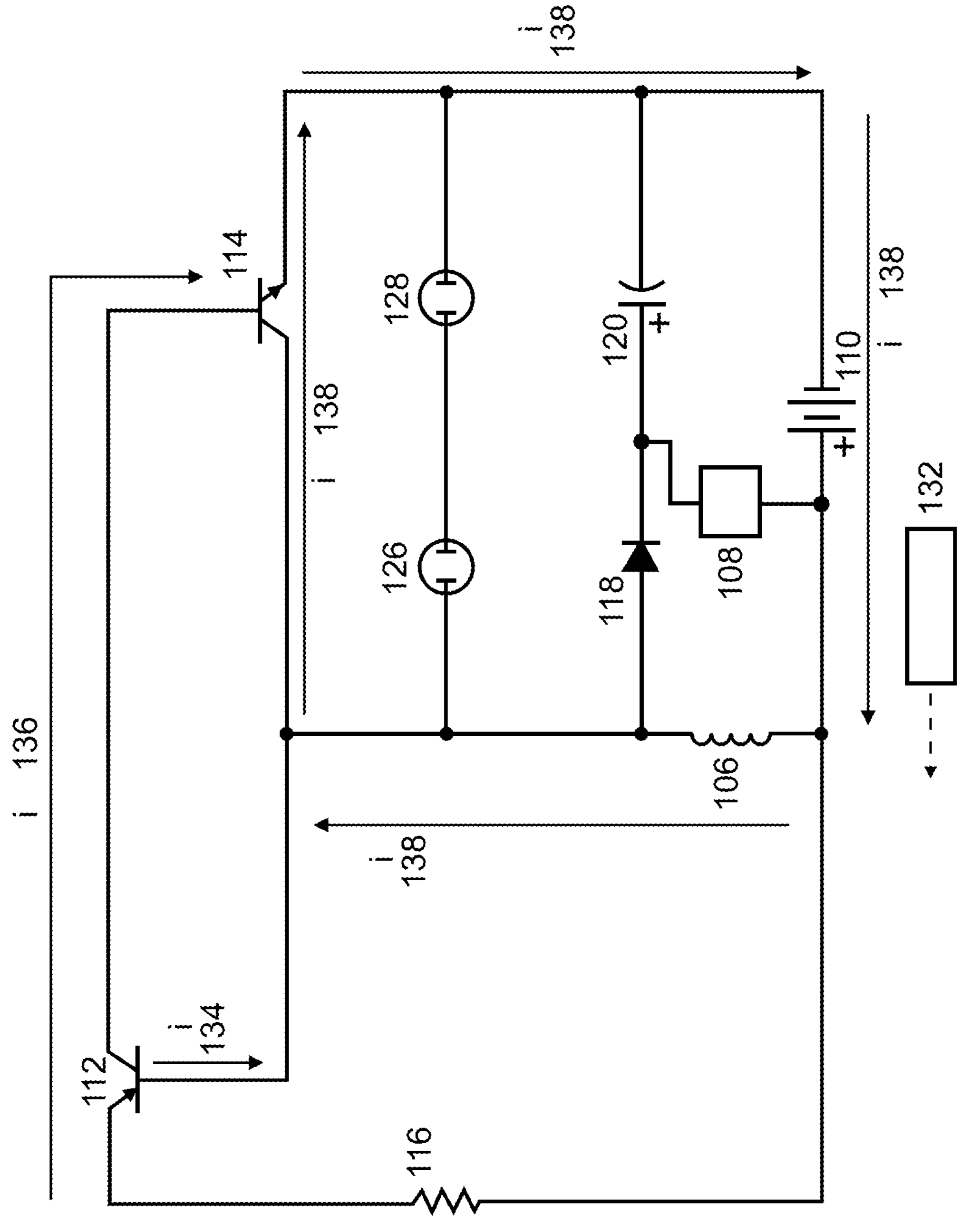
Figure 5:
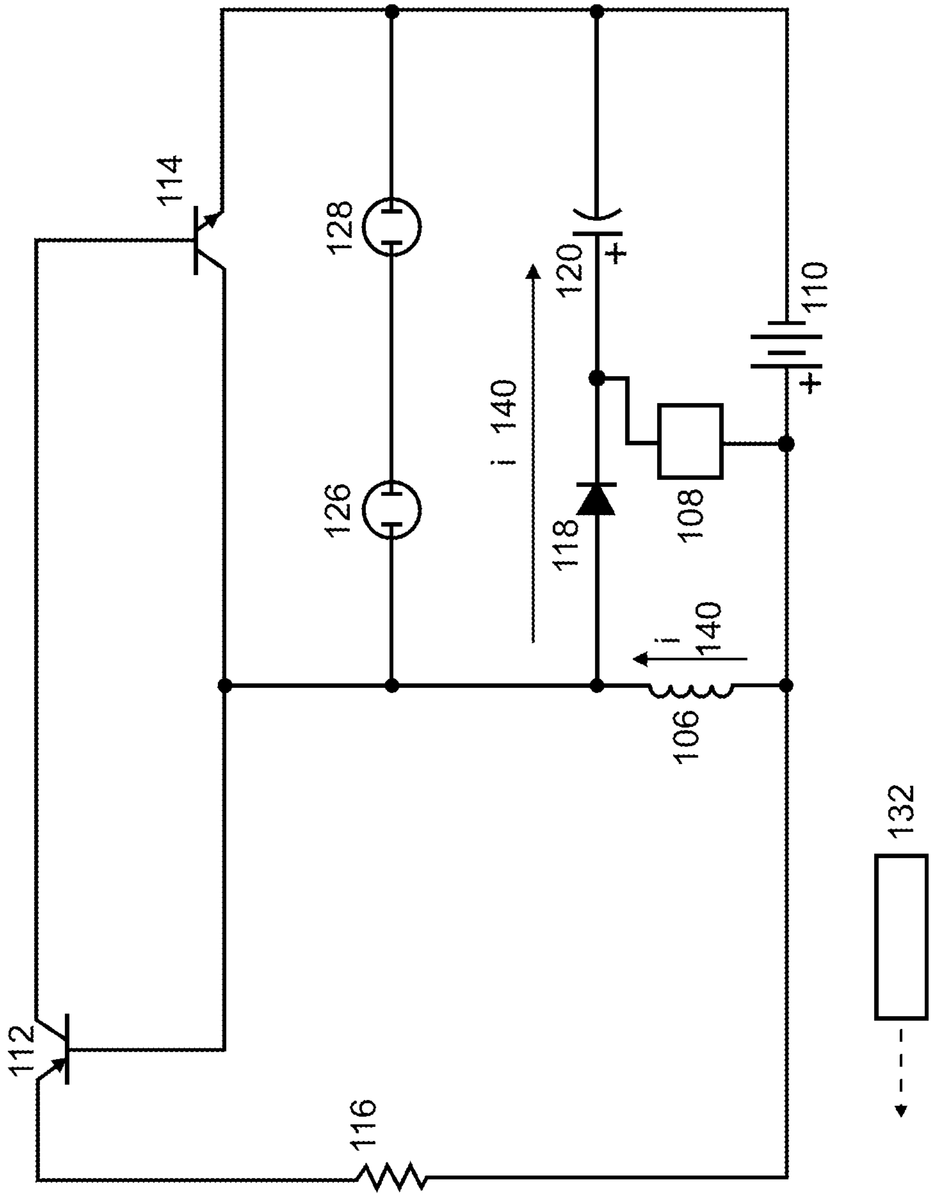

FIGS. 3-5 show an embodiment of the circuit in operation using a motor such as the motors described in more detail herein. From time T0 to T1, as shown in FIG. 3, a magnet 132 (not shown) is in a first position relative to the inductor (i.e., motor winding) 106 such that the magnet 132 is not passing by the inductor (i.e., motor winding) 106, and the circuit is at rest. No measurable current or voltage is consumed by the transistors 112, 114. While the circuit is at rest, current 130 flows into the capacitor 120, charging it up to the voltage of the battery 110.

As shown in FIG. 4, the magnet 132 approaches the inductor (i.e., motor winding) 106 from time T1 to T2. While the magnet 132 is in a second position, the magnet 132 is approaching the inductor (i.e., motor winding) 106, and a small negative current 134 is induced that extends to the base of the PNP transistor 112. This activates the PNP transistor 112, allowing current 136 to flow from its emitter to its collector. Current 136 flowing out of the collector of the PNP transistor 112 flows into the base of the NPN transistor 114. This activates the NPN transistor 114, allowing current 138 to flow from its collector to its emitter. When current 138 is allowed to flow from the collector to the emitter of the NPN transistor 114, current 138 can flow from the battery 110 through the inductor (i.e., motor winding) 106, and directly back to the battery 110. Additionally, the negative current 134 reduces the magnitude of the current 130, and in some embodiments, can at least temporarily cause current to stop flowing through the inductor (i.e., motor winding) 106.

As shown in FIG. 5, the magnet 132 is moving away from the inductor (i.e., motor winding) 106 from time T2 to T3. While the magnet 132 is in a third position moving away from the inductor (i.e., motor winding) 106, the small negative current that was induced substantially disappears, removing the small negative current on the base of the PNP transistor 112. This turns off the PNP transistor 112, substantially blocking current from flowing from its emitter to its collector. In turn, this substantially prevents current from flowing into the base of the NPN transistor 114, turning it off and substantially preventing current from flowing from its collector to its emitter. With the NPN transistor 114 off, the battery 110 is no longer directly connected to the inductor (i.e., motor winding) 106 and current flow through the inductor (i.e., motor winding) 106 drops. This causes the magnetic field that was generated in the inductor (i.e., motor winding) 106 to at least partially collapse. Energy 140 from the at least partially collapsing magnetic field travels through the diode 118 to the capacitor 120, which increases the voltage of the capacitor 120. Once the magnet 132 moves away from the inductor (i.e., motor winding) 106, the circuit returns to rest until another magnet approaches the inductor (i.e., motor winding) 106.

Because the voltage or charge of the capacitor 120 increases from the energy 140 from the collapsing magnetic field, energy is returned from the capacitor 120 to the battery 110 as the capacitor 120 discharges. In an embodiment, the energy from the capacitor 120 is discharged and returns to the battery 110 through a recovery conversion system. In embodiments, energy is returned to the battery 110 while no magnets are approaching the inductor (i.e., motor winding) 106 such as in FIG. 3. In other embodiments, energy is additionally or alternatively returned to the battery 110 while the magnet 132 is approaching the inductor (i.e., motor winding) 106 such as in FIG. 4. In further embodiments, energy is additionally or alternatively returned to the battery 110 while the magnet 132 is moving away from the induction (i.e., motor winding) 106 such as in FIG. 5.

Although the embodiments shown in FIGS. 3-5 illustrate the inductor (i.e., motor winding) 106 being stationary and the magnet 132 being movable, in alternative embodiments, the magnet 132 is stationary and the inductor (i.e., motor winding) 106 is movable. In further embodiments, both the inductor (i.e., motor winding) 106 and the magnet 132 are movable relative to one another. Additionally, while only one inductor (i.e., motor winding) 106 and one magnet 132 are shown in FIGS. 3-5, alternative embodiments may include more than one inductor and more than one magnet.

FIGS. 6-40 illustrate alternative embodiments of the circuit 101 depicted in FIG. 2. The illustrated alternative embodiments depict example embodiments, and further embodiments may include additional or alternative components not illustrated in the example embodiments. Additionally, some elements depicted in the example embodiments may be excluded without substantially changing the operation and benefits of the circuit as described herein. Further, example characteristics of the components in the example embodiments are provided herein; however, in alternative embodiments, the components may have different values and characteristics. Although not shown, a magnet may move past a coil L1 in a manner similar to what has been previously described with relation to the circuit depicted in FIGS. 3-5.

Figure 6:
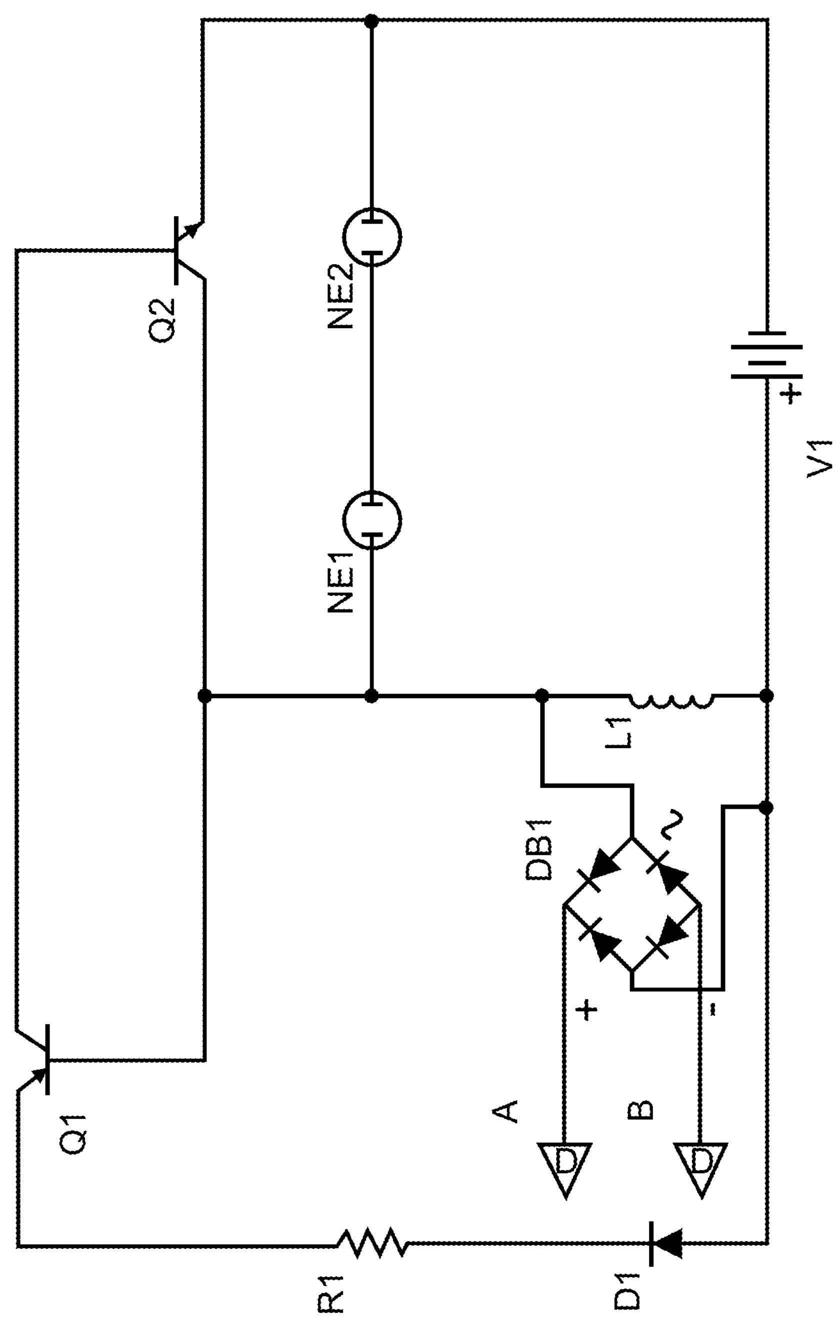
FIGS. 6-40 illustrate alternative embodiments of the energy capturing circuit shown in FIG. 2.
Figure 7:
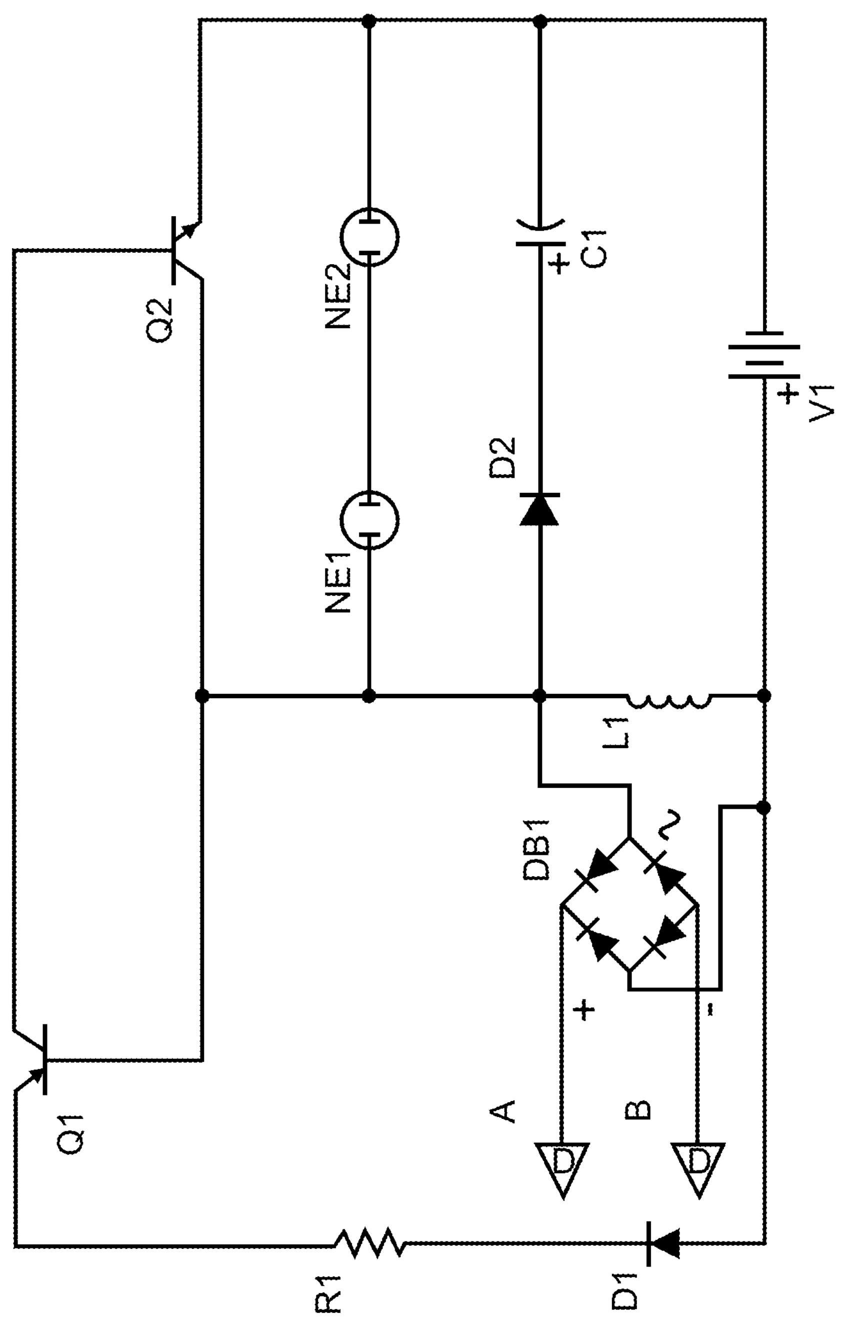

FIGS. 6 and 7 illustrate example embodiments of energy capturing circuits including a bridge rectifier DB1. The bridge rectifier DB1 may be used in place of or in addition to a diode and a storage device as is depicted in FIG. 2. In the illustrated examples, the bridge rectifier DB1 includes four diodes configured to convert an AC input into a DC output. In alternative embodiments, the bridge rectifier comprises additional or alternative components, or the diodes in the bridge rectifier are assembled in an alternative configuration. In the illustrated embodiments, the bridge rectifier DB1 is configured across a coil L1. In these embodiments, the bridge rectifier DB1 and a storage device C1 receive recovered energy from the breakdown of a magnetic field in the coil L1. The recovered energy captured by the bridge rectifier DB1 may be transferred through the bridge rectifier DB1 to another device, such as a circuit or circuit component, a timer, a storage device, or a switching device. In the illustrated embodiments, energy is transferred from the bridge rectifier DB1 to another device thorough contacts A, B. The energy recovered by the bridge rectifier DB1 also may be transferred to the storage device C1.

Figure 8:
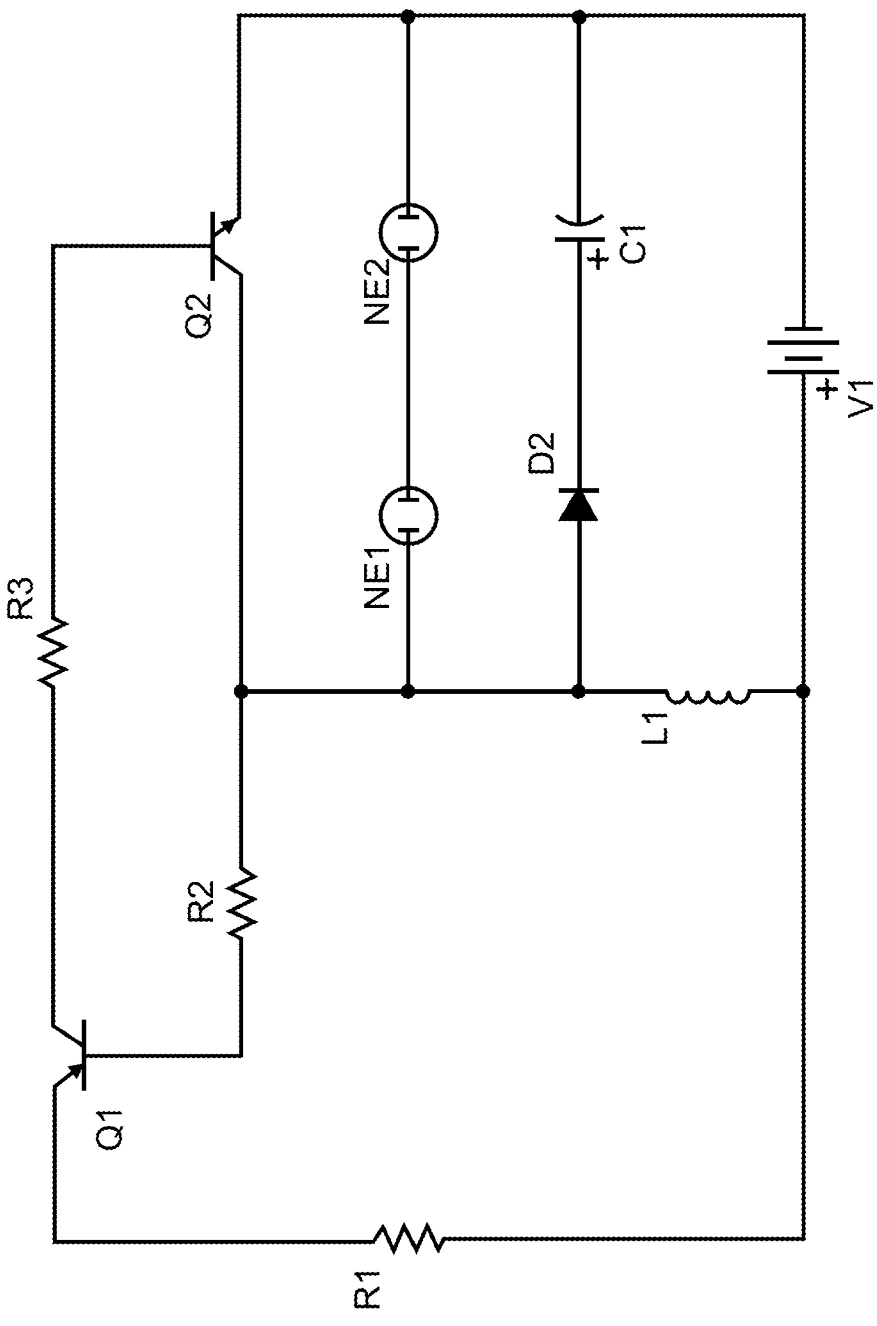
Figure 9:
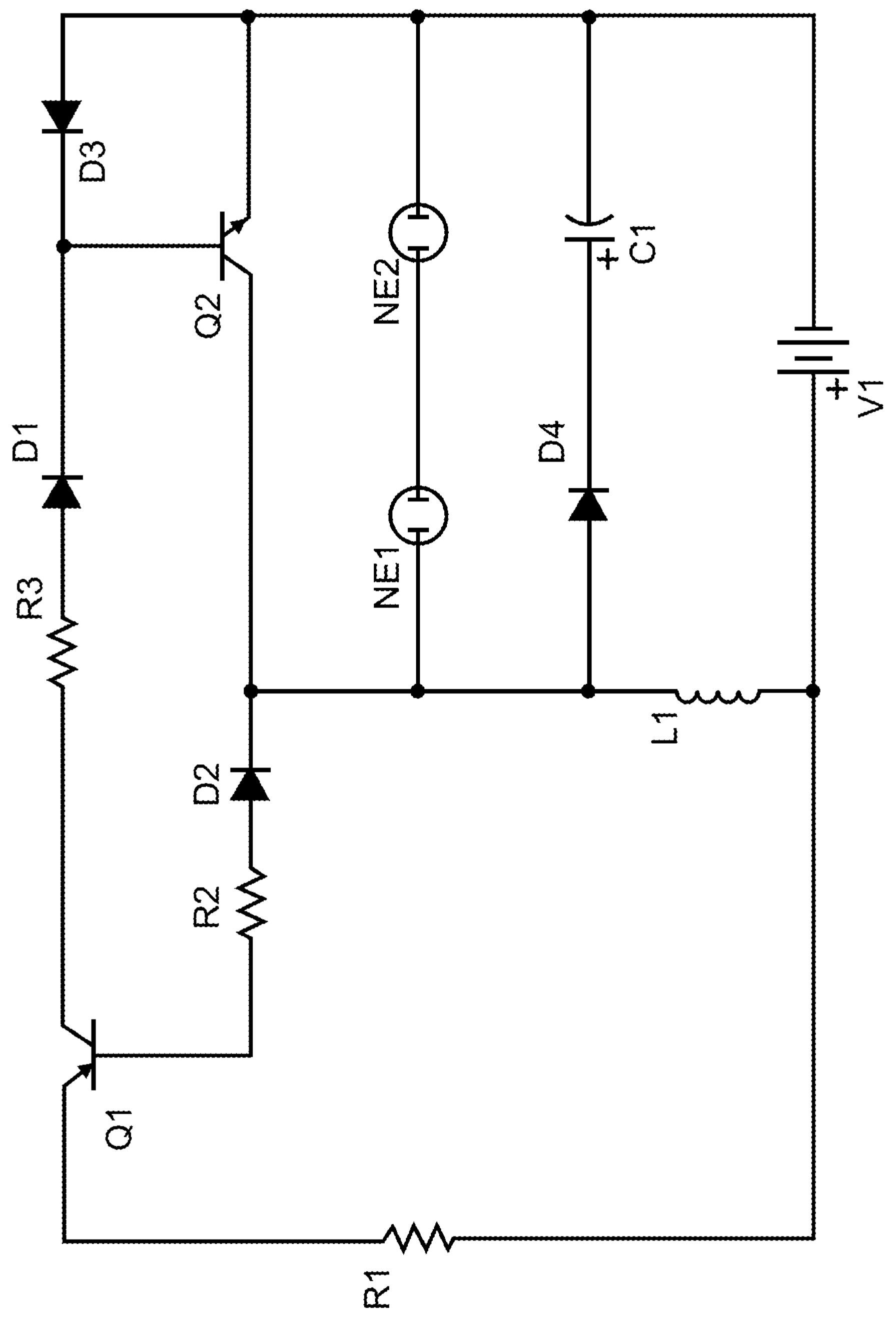
Figure 10:
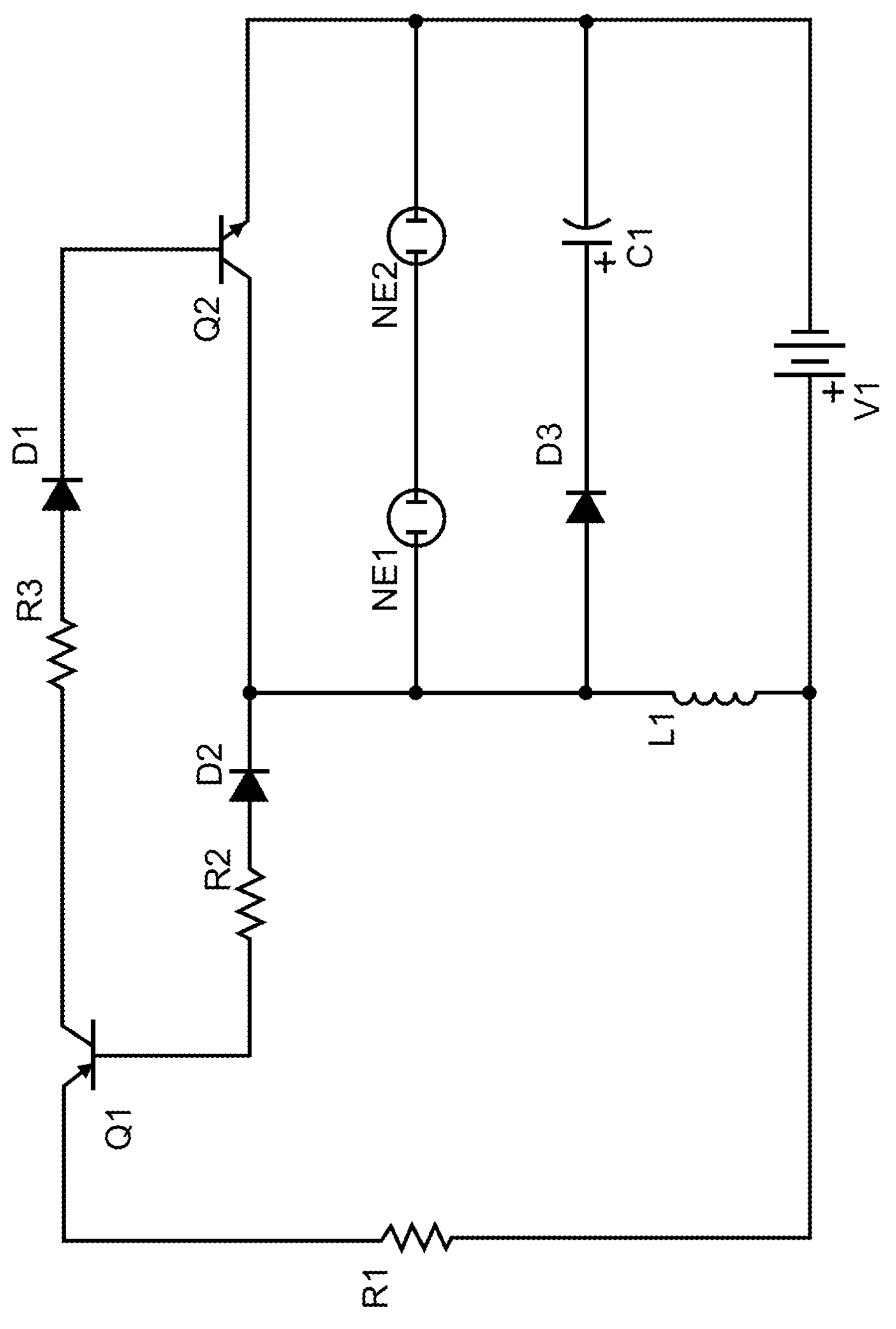

FIGS. 8-10 illustrate example embodiments of energy capturing circuits including additional resistors R2, R3 for a PNP transistor Q1 and an NPN transistor Q2. In these embodiments, the resistance of the biasing resistors R2, R3 affects the energy captured by a storage device C1 or consumed by a motor (not shown). By lowering a resistance of the biasing resistors R2, R3, more energy is transferred to the storage device C1. In an embodiment, the resistance of the biasing resistors R2, R3 is set at a minimum value that still allows the biasing resistors R2, R3 to bias the transistors Q1, Q2, thus maximizing the energy transferred to the storage device C1. In the illustrated embodiments, biasing resistor R1 sets a maximum wattage allowed to enter the circuit. In embodiments depicted in FIGS. 9-10, additional diodes are included. In embodiments, the diodes D1, D2 show the flow of energy through the circuits; however, the circuits function in substantially the same manner without the diodes D1, D2. Similarly, the diode D3 shown in the embodiment depicted in FIG. 9 depicts the flow of energy through the circuit, but the circuit functions in substantially the same manner without the diode D3. The diode D4 shown in FIG. 9 and the diode D3 shown in FIG. 10 act similarly to the diode 118 described above with relation to FIG. 2

FIGS. 11-18 illustrate example embodiments of energy capturing circuits including additional biasing resistors R2, R3 and additional diodes D1, D2, D3. In the illustrated embodiments, the biasing resistors R2, R3 affect the energy captured by a storage device C1 or consumed by a motor, with lower resistances allowing more energy to be captured or consumed. In the illustrated embodiments, the diodes D1, D2, D3 show the flow of energy through the circuit; however, the circuit functions in substantially the same manner without the diodes D1, D2, D3. The illustrated embodiments depicted in FIGS. 11-18 also include additional components.

Figure 11:
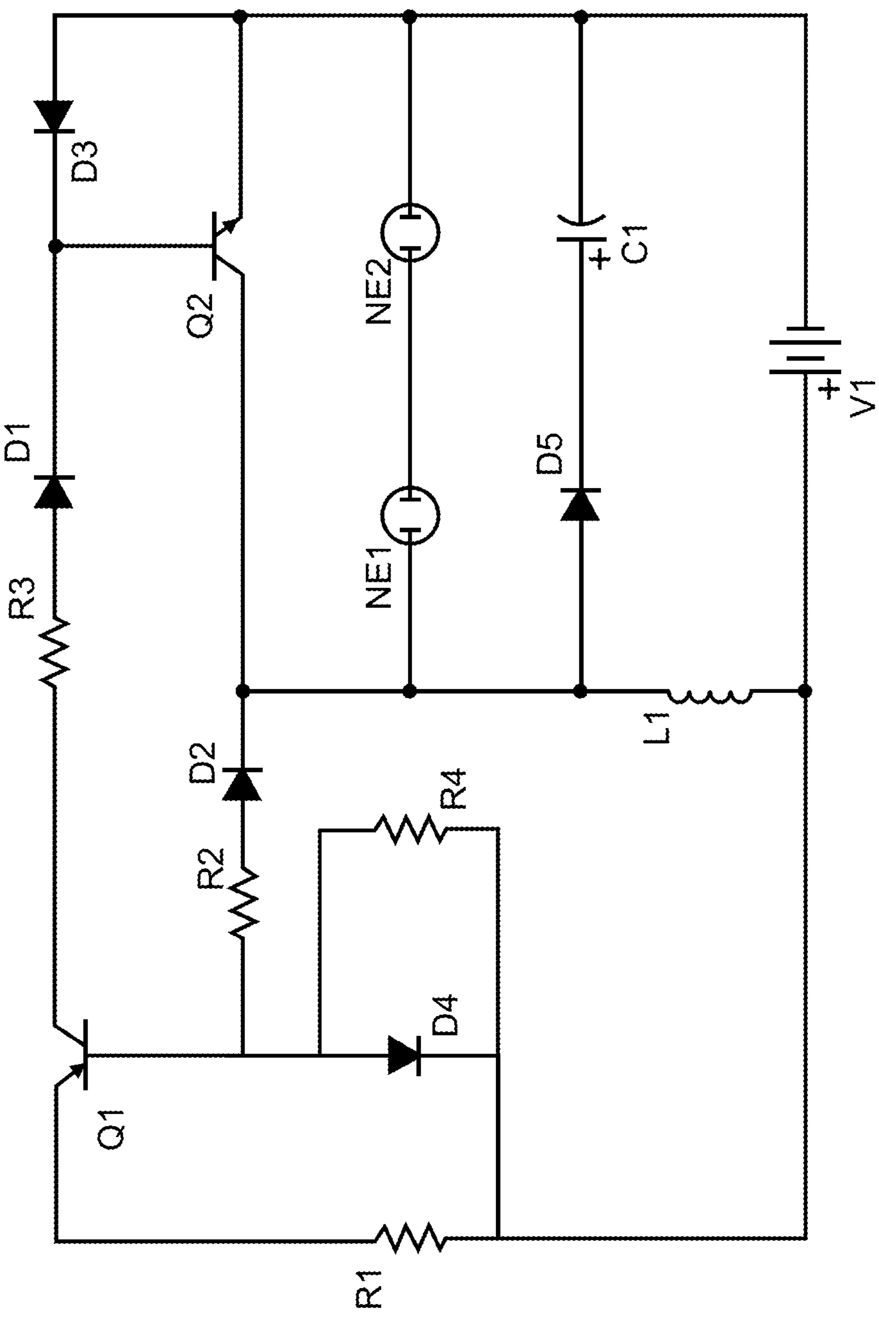

In the embodiment shown in FIG. 11, a diode D4 and a resistor R4 control torque of the motor while still allowing energy to transfer to the storage device C1.

Figure 12:
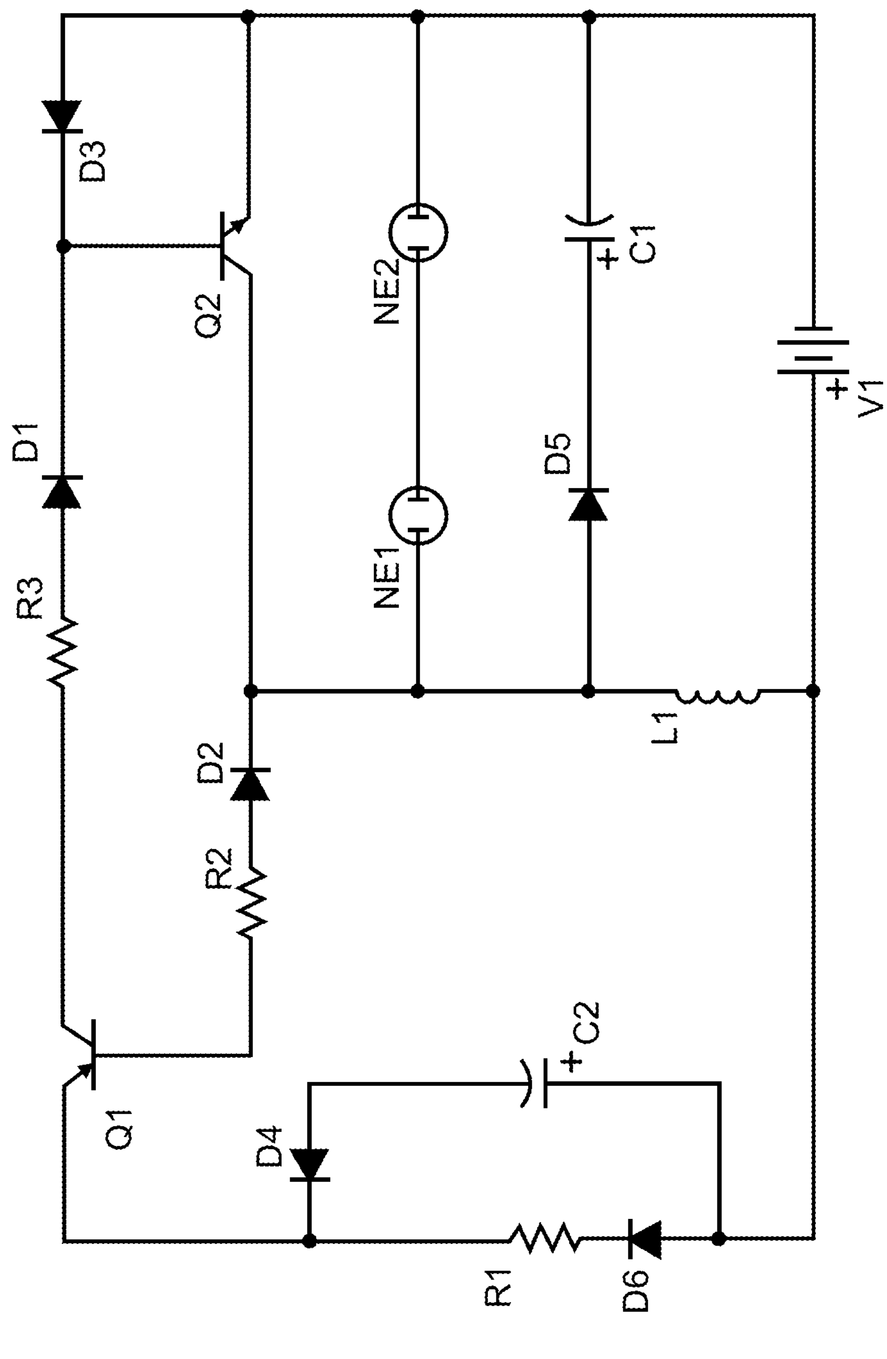

In the embodiment shown in FIG. 12, a diode D4 and a storage device C2 collect returning voltage, storing the returning voltage in the storage device C2. This returning voltage may be, for example, a back electromotive force (back EMF) or a counter-electromotive force (CEMF). In the illustrated embodiment, the storage device C2 is a capacitor. In embodiments, a diode D6 acts as a protection device for a power supply V1, protecting the power supply V1 if a PNP transistor Q1 and an NPN transistor Q2 were to fail by limiting current flowing back to a positive side of the power supply V1.

Figure 13:
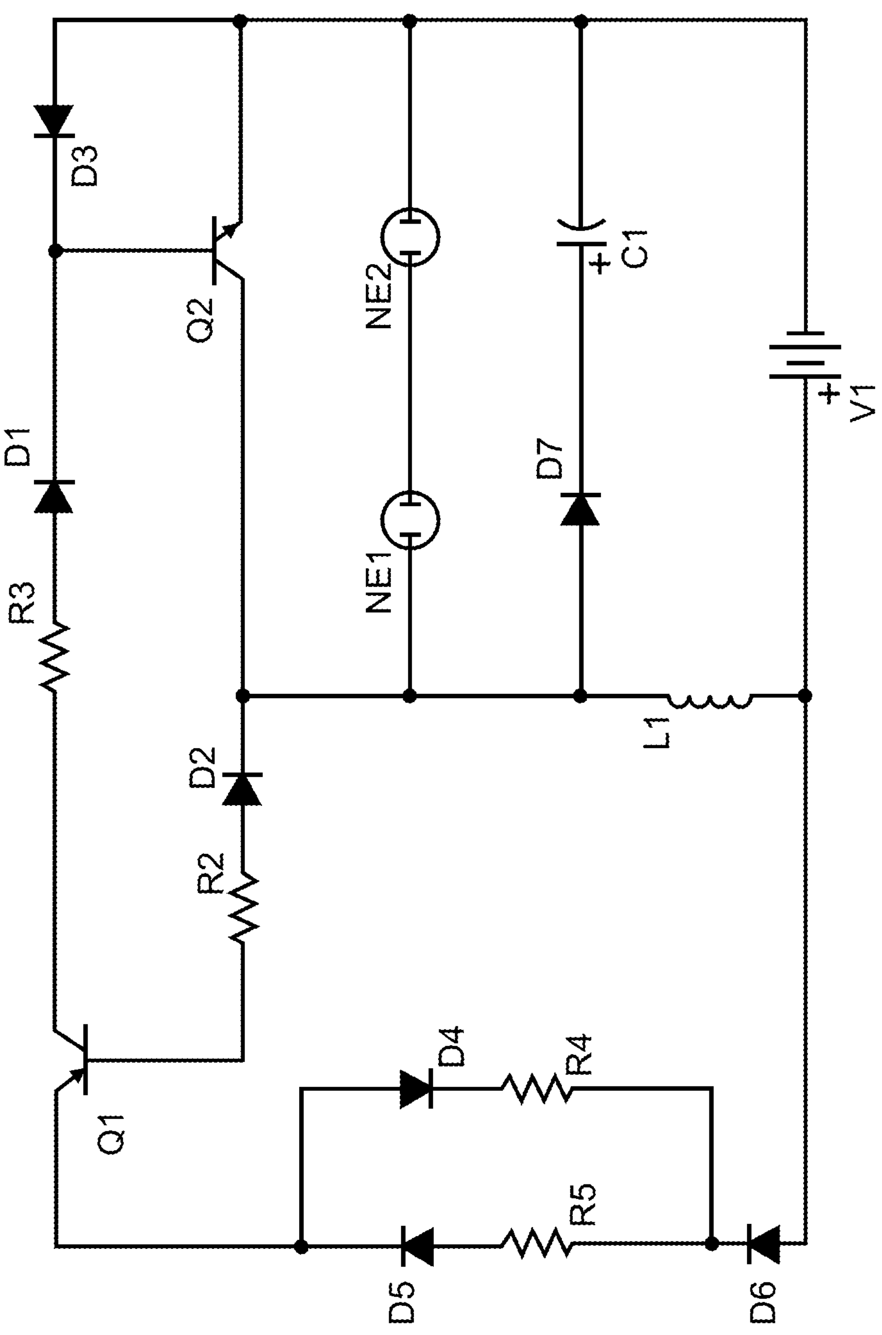
Figure 14:
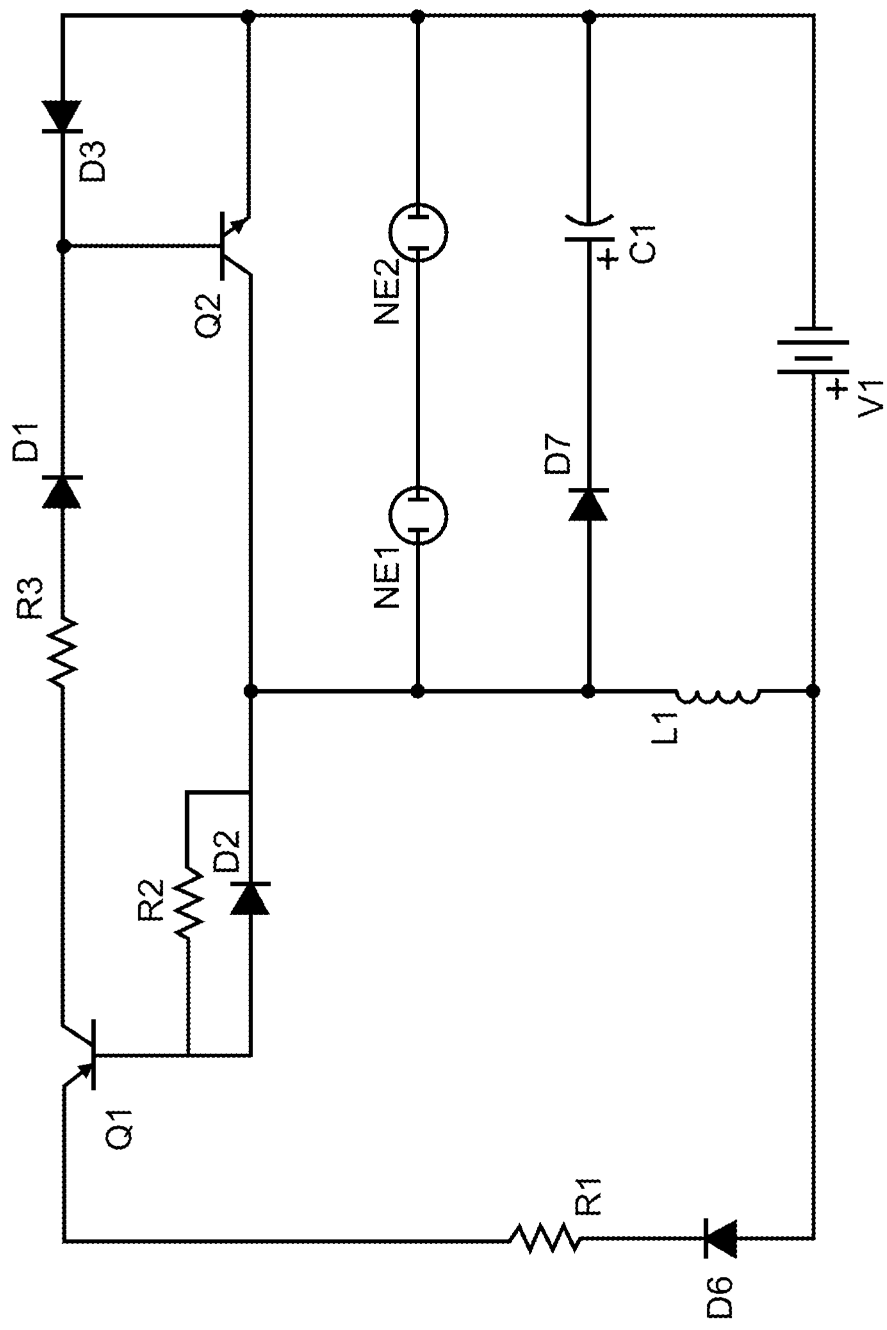
Figure 15:
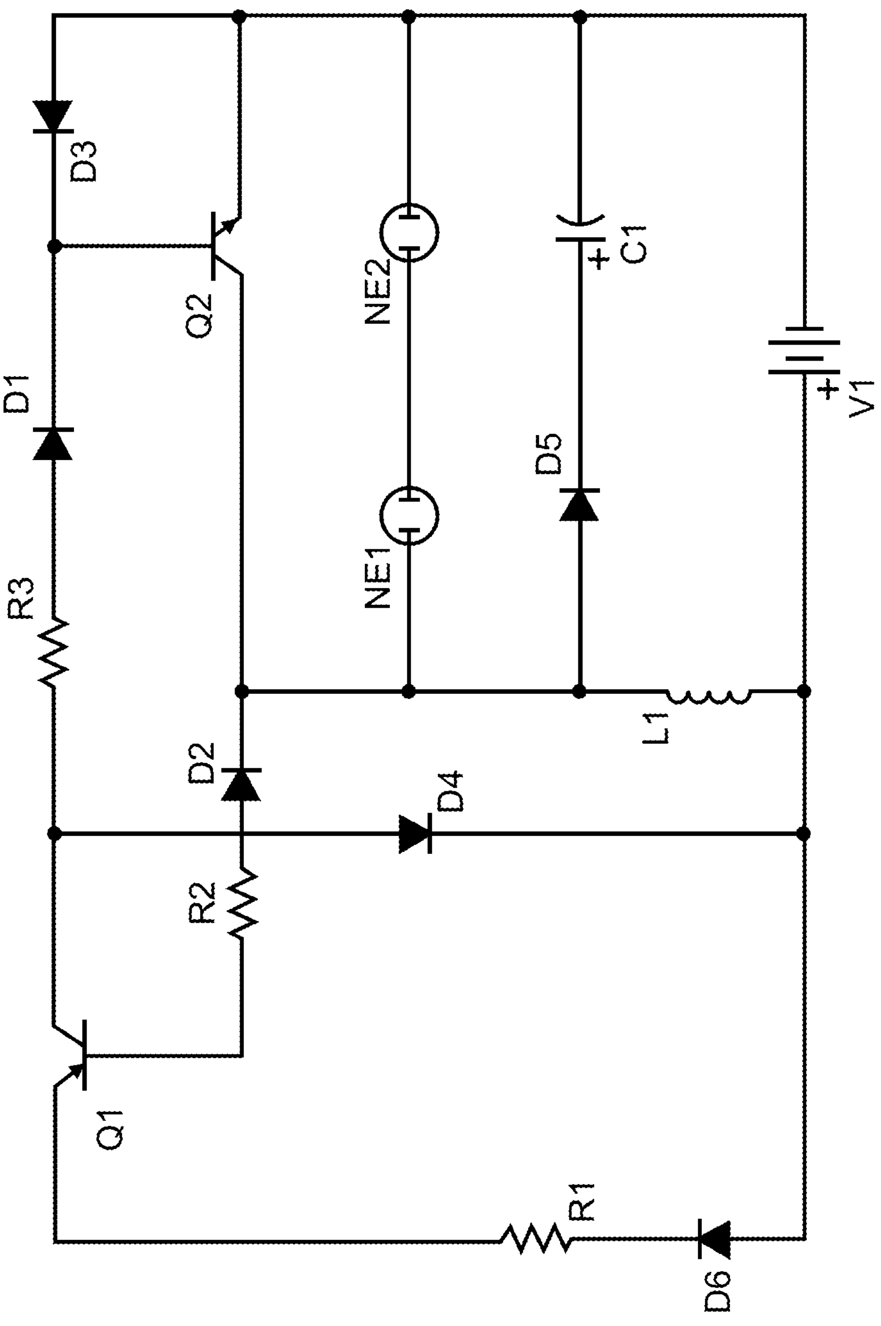
Figure 16:
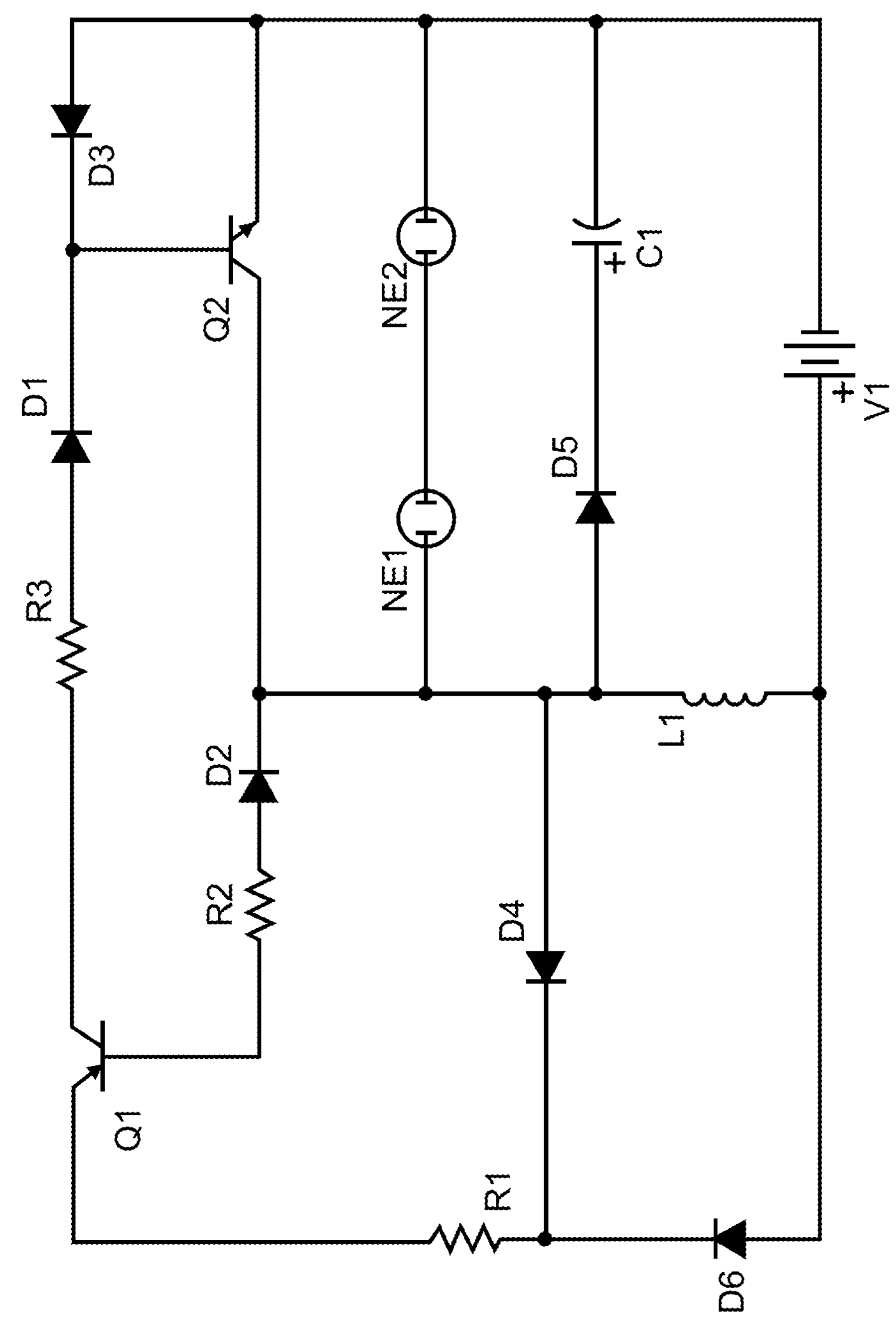
Figure 17:
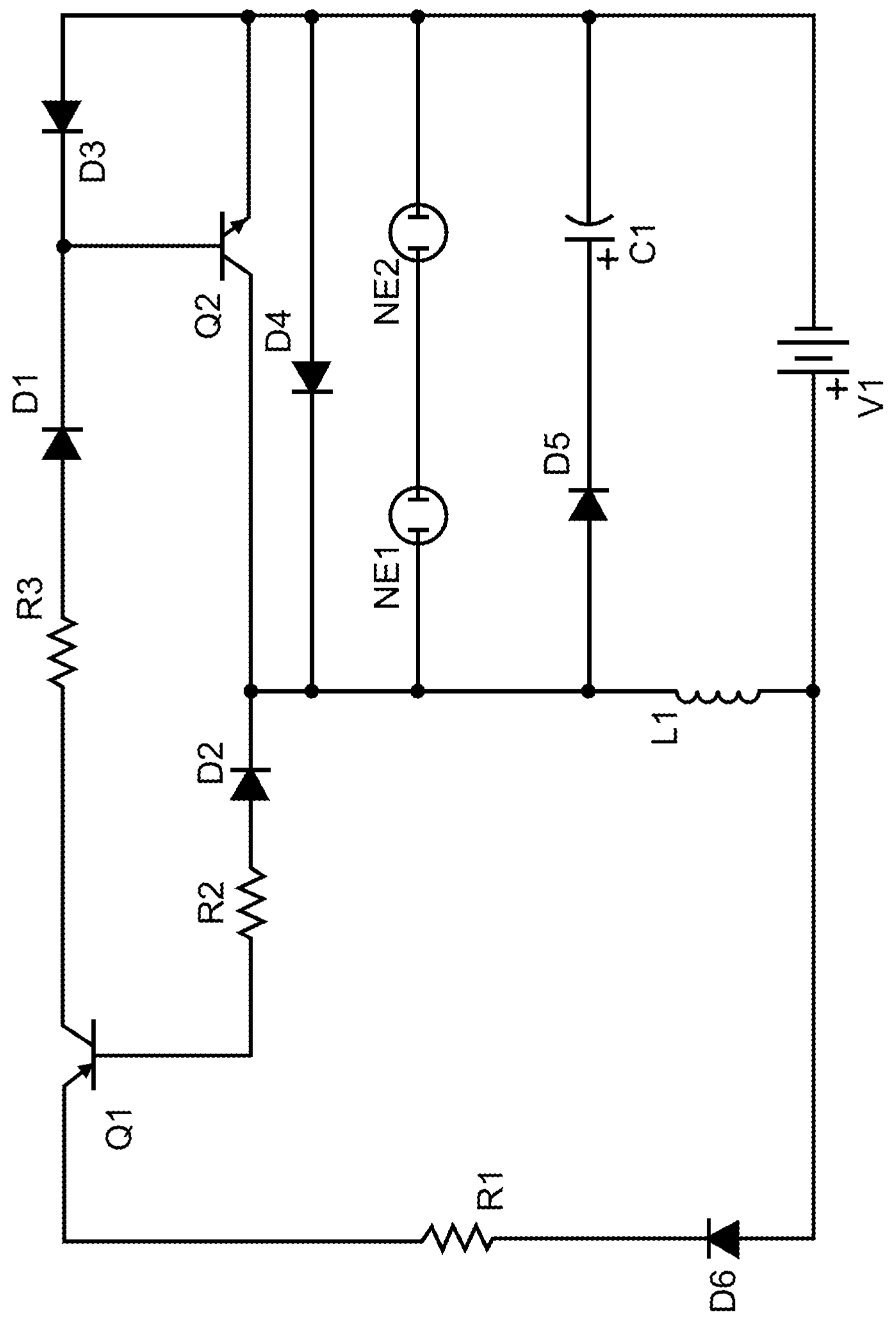
Figure 18:
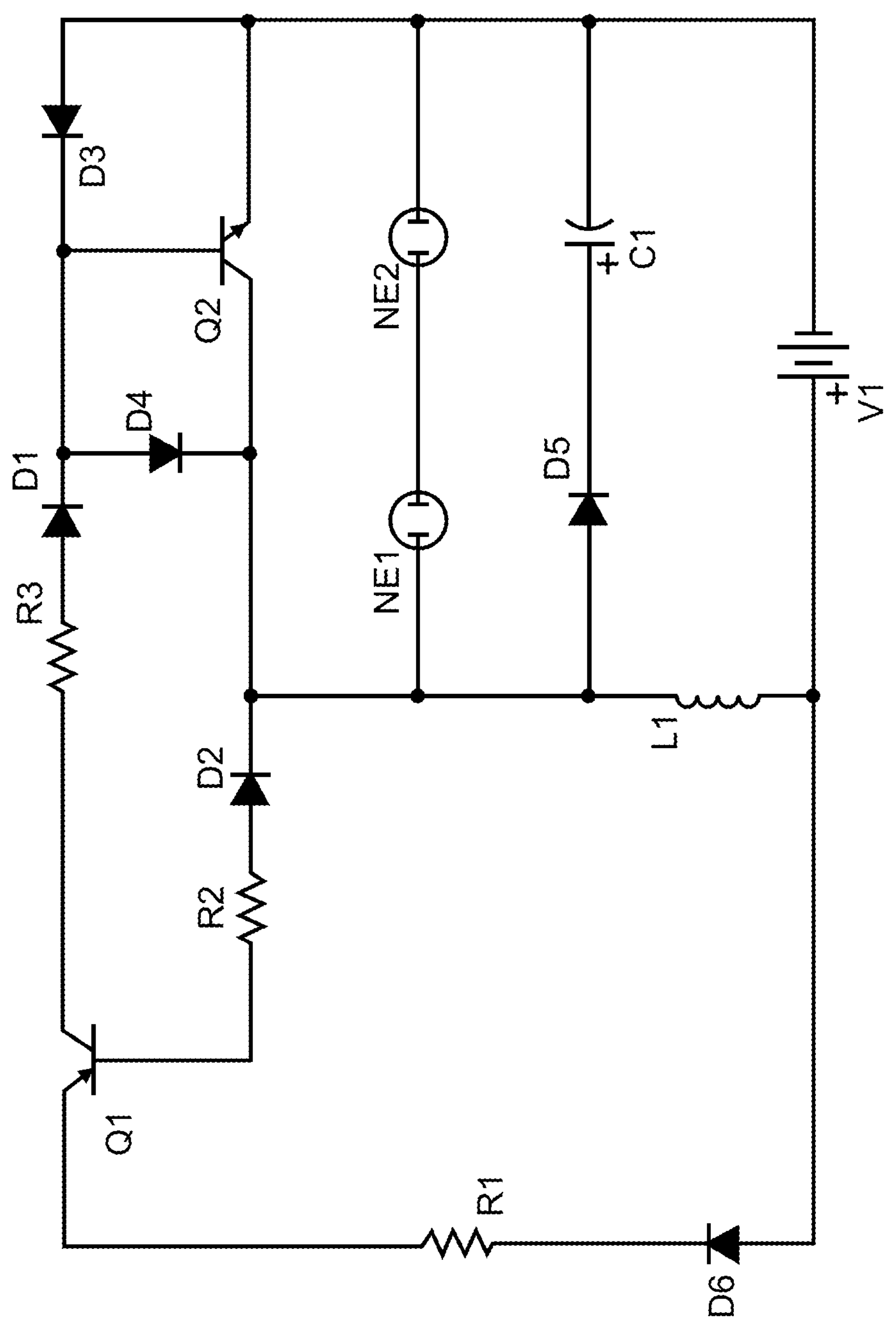

In the embodiment shown in FIG. 13, resistors R4, R5 and diodes D4, D5 may be used to detect a back EMF or a CEMF in the circuit. If the back EMF or the CEMF were present in the circuit, a voltage measured across the resistor R4 would be different than a voltage measured across the resistor R5. Additionally, like the resistor R1 of the circuit illustrated in FIG. 2, the resistors R4, R5 set the maximum input wattage consumed or used by the circuit in this embodiment. In an embodiment, the resistors R4, R5 have substantially the same resistance. In embodiments, a diode D6 acts as a protection device for a power supply V1, protecting the power supply V1 if a PNP transistor Q1 and an NPN transistor Q2 were to fail by limiting current flowing back to a positive side of the power supply V1.

In the embodiments shown in FIGS. 14-18, like in the embodiment shown in FIG. 13, a diode D6 acts as a protection device for a power supply V1, protecting the power supply V1 if a PNP transistor Q1 and an NPN transistor Q2 were to fail. In the embodiments shown in FIGS. 15-18, the diode D4 acts to steer voltage and current in the circuit in a direction indicated by the diode D4. For example, in the embodiment depicted in FIG. 18, the diode D4 steers and voltage and current from a base of the NPN transistor Q2 to the collector of the NPN transistor Q2. The diode D4 also looks for back EMF and CEMF.

Figure 19:
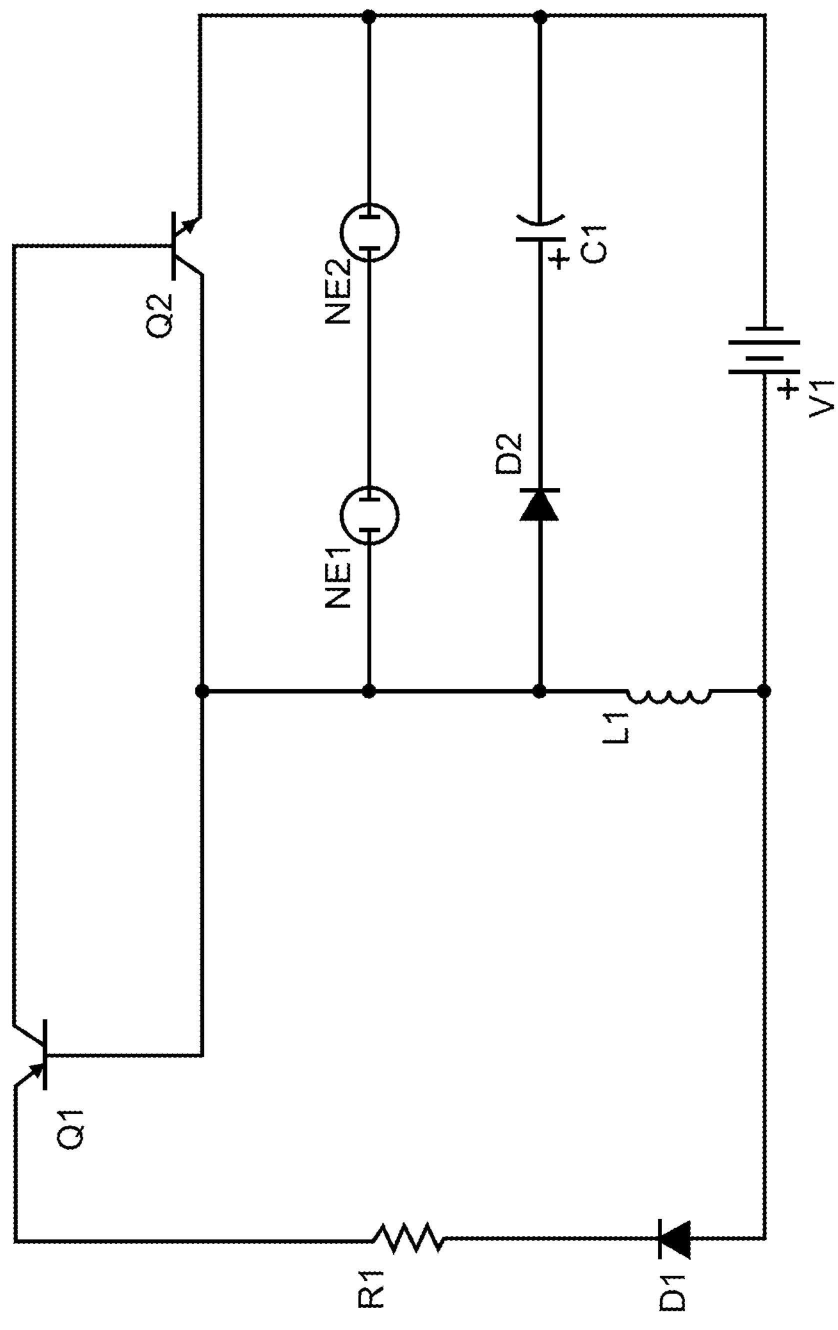

FIG. 19 illustrates an example embodiment of an energy capturing circuit including an additional diode D1. In this embodiment, the diode D1 acts as a protection device for a power supply V1, protecting the power supply V1 if a PNP transistor Q1 and an NPN transistor Q2 were to fail by limiting current flowing back to a positive side of the power supply V1. In embodiments, the diode D1 also acts as a protection device in embodiments that include a switching mode power supply or other switching controller, such as a brushless DC motor and multiphase controller or oscillator. In some embodiments, the efficiency of the energy capturing circuit and the amount of energy recovered by the circuit is increased by increasing the switching and recovery speeds of a diode D2. In further embodiments, a speed rating of the diode D2 matches a speed rating of the diode D1, and a current rating of D2 also matches a current rating of the diode D1.

Figure 20:
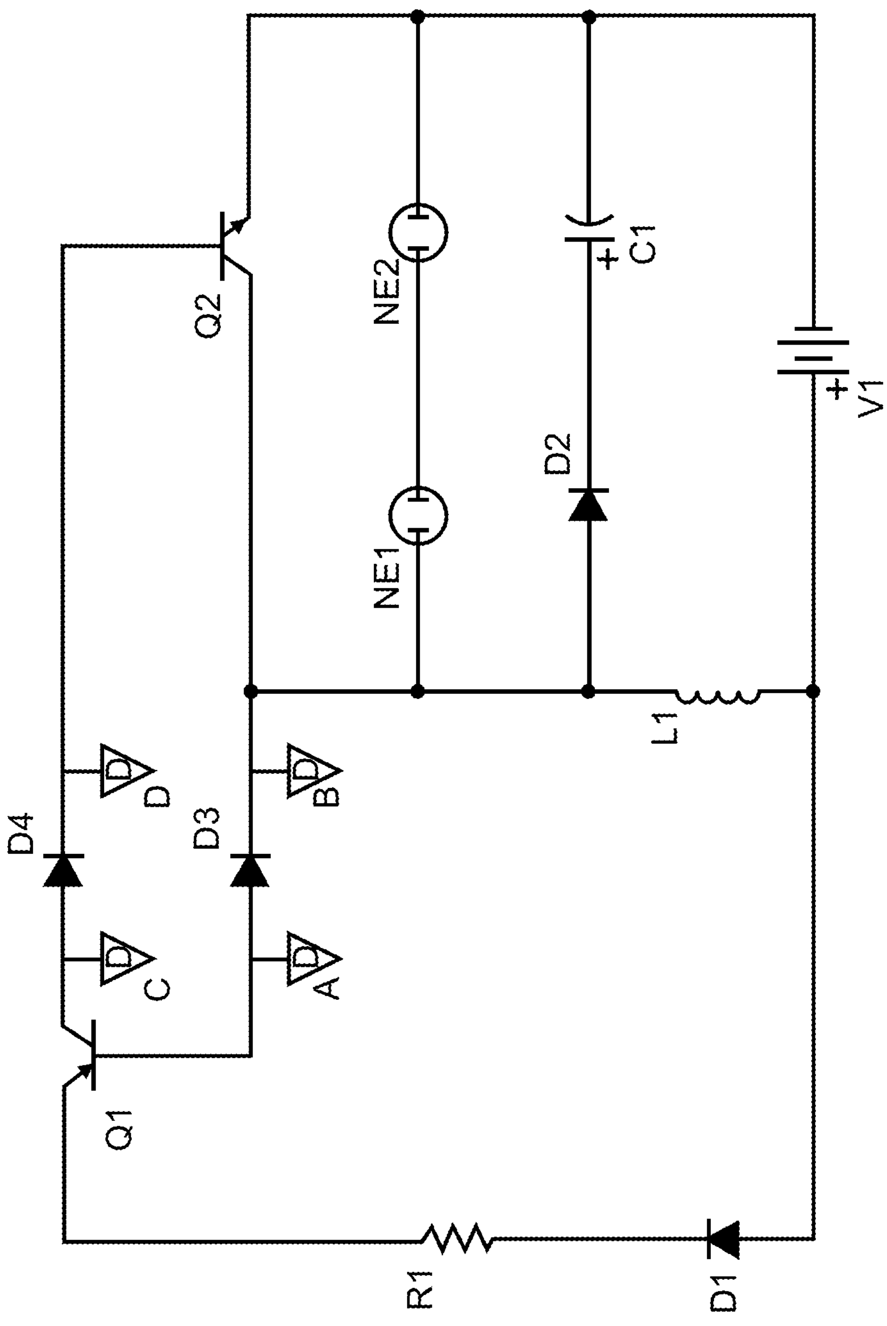

FIG. 20 illustrates an example embodiment of an energy capturing circuit including additional diodes D1, D3, D4 and control points A, B, C, D. The illustrated embodiment of the energy capturing circuit functions without the diode D1; however, including the diode D1 is recommended. In the illustrated embodiment, the control points A, B, C, D control a pulse width modulated (PWM) signal representing an input signal for an associated motor, and controls aspects of the motor's operation, such as rotor revolutions-per-minute (RPM), motor torque, acceleration, and deceleration. In another alternative embodiments, the power supply V1 is pulsed and controlled using a PWM signal.

Figure 21:
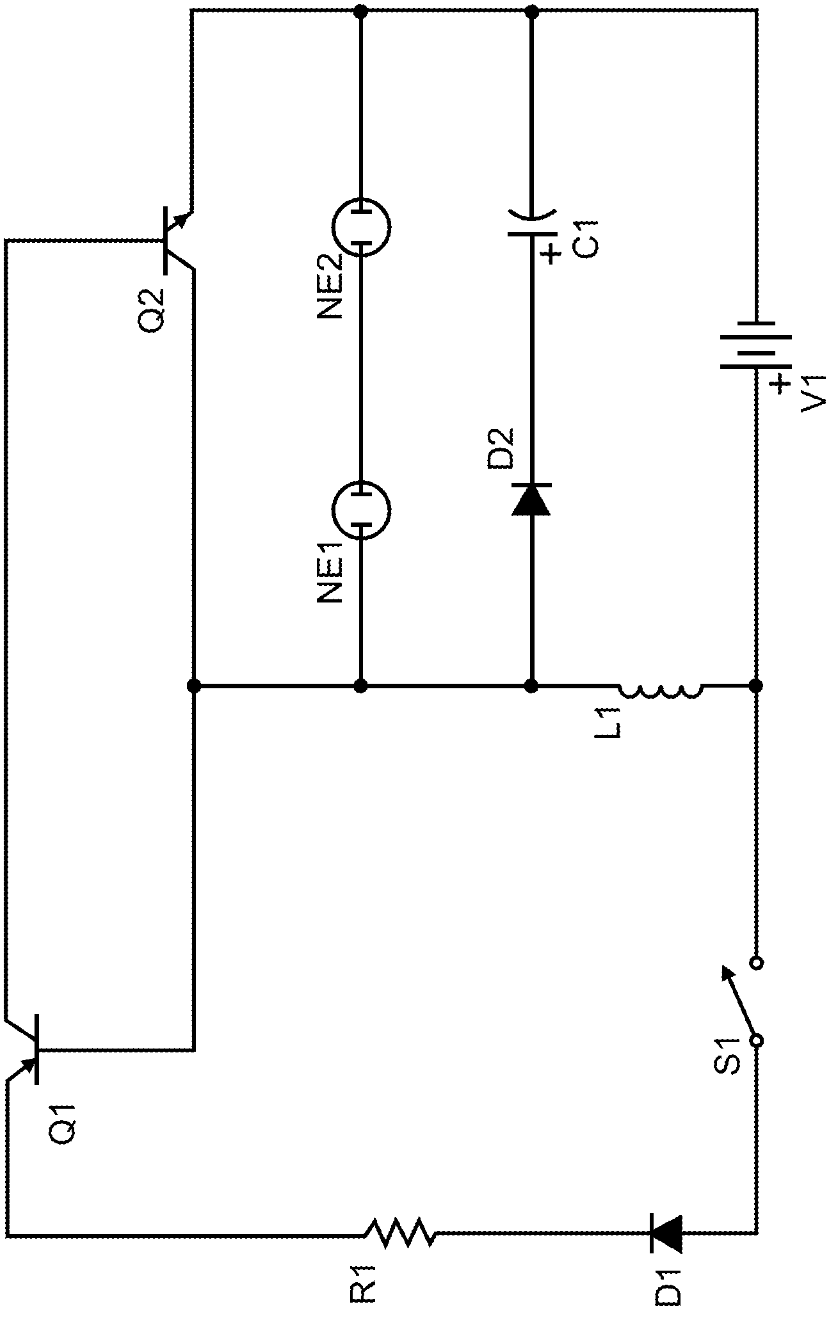

FIG. 21 illustrates an example embodiment of an energy capturing circuit including an additional diode D1 and a switch S1. In embodiments, the switch S1 is used for switching the circuit and associated systems, such as a motor, on and off. In additional embodiments, the switch S1 additionally or alternatively is used for pulse width modulation (PWM) control with other control or switching systems, such as a microprocessor, a three-phase controller, a multi-phase controller, or a 555 timer integrated circuit oscillator. In an embodiment, the switch S1 is a simple switch. In alternative embodiments, the switch S1 is a part of a switching controller, such as a three-phase controller or a brushless DC motor controller.

Figure 22:
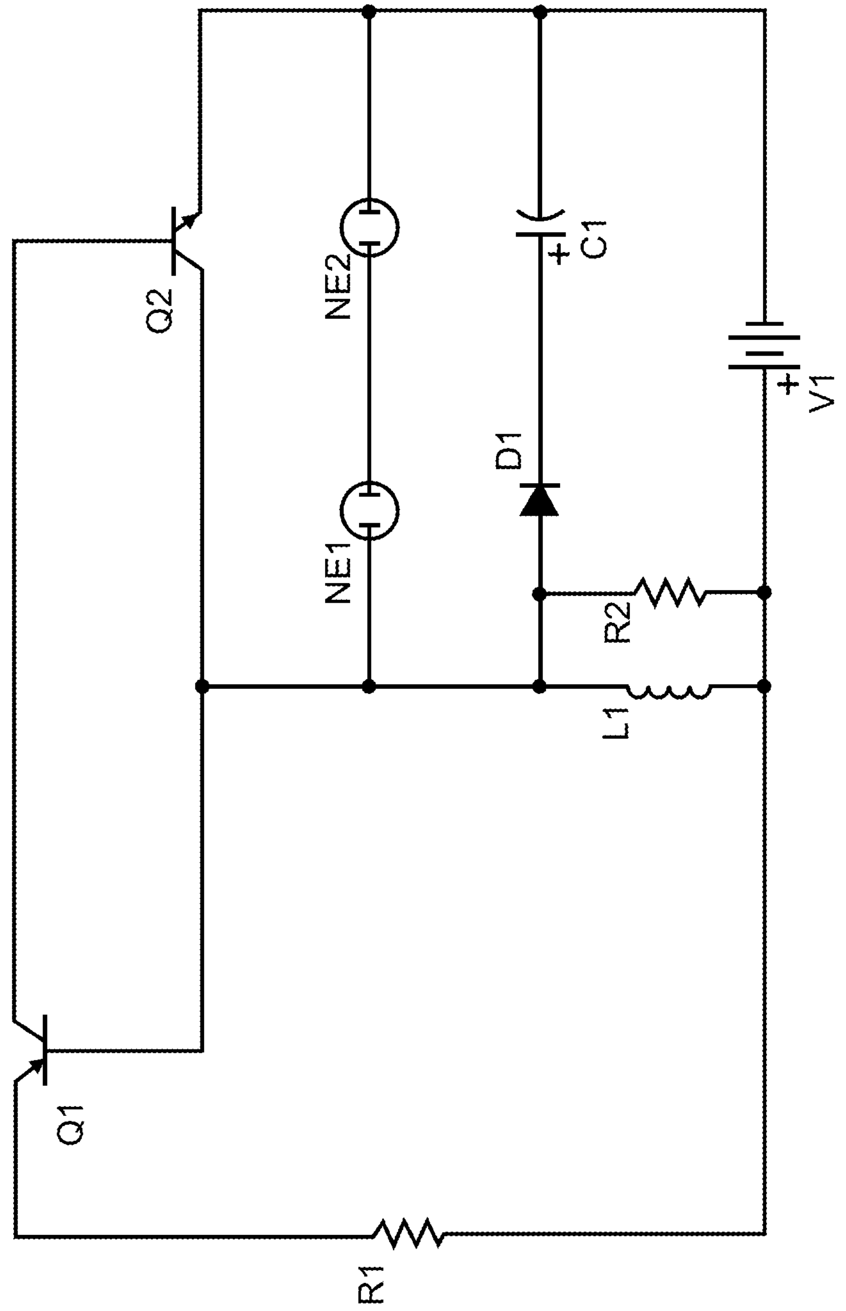
Figure 23:
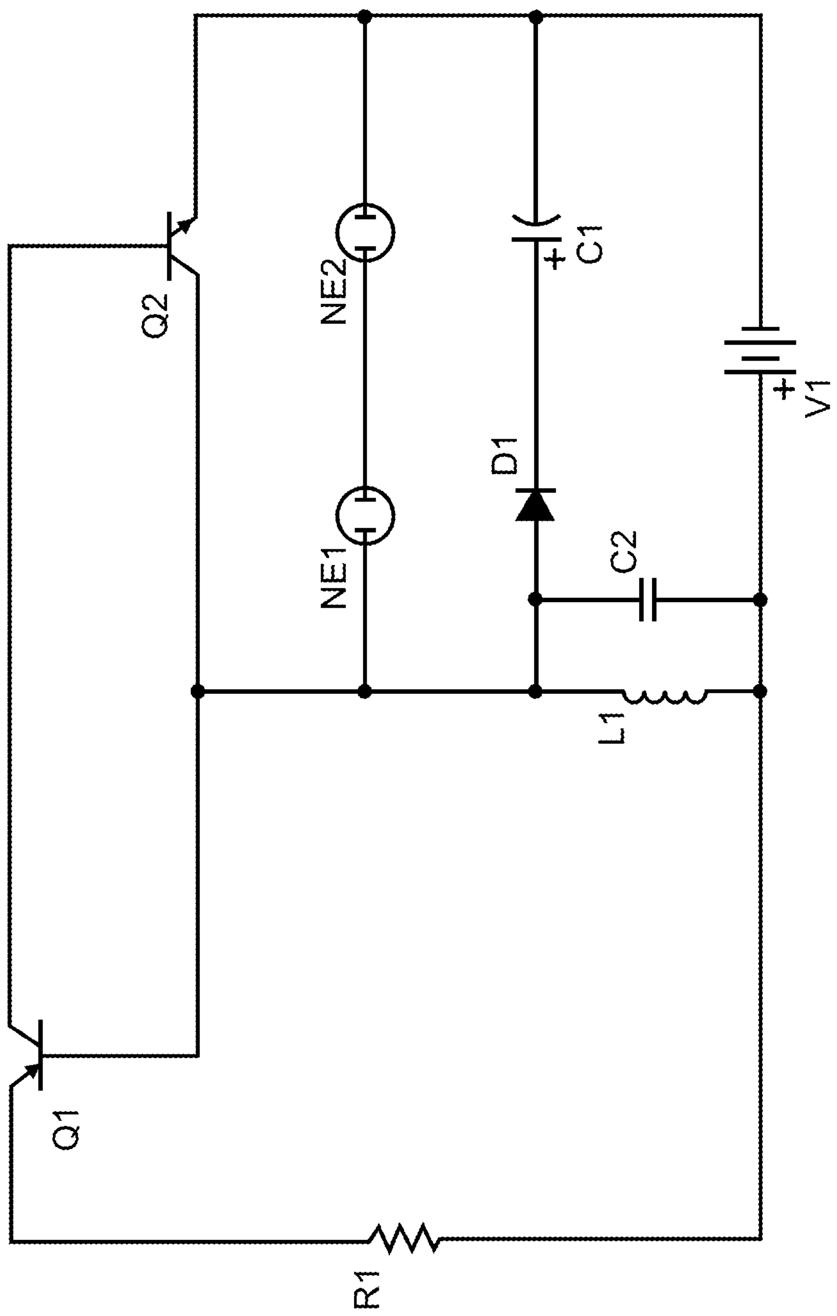
Figure 24:
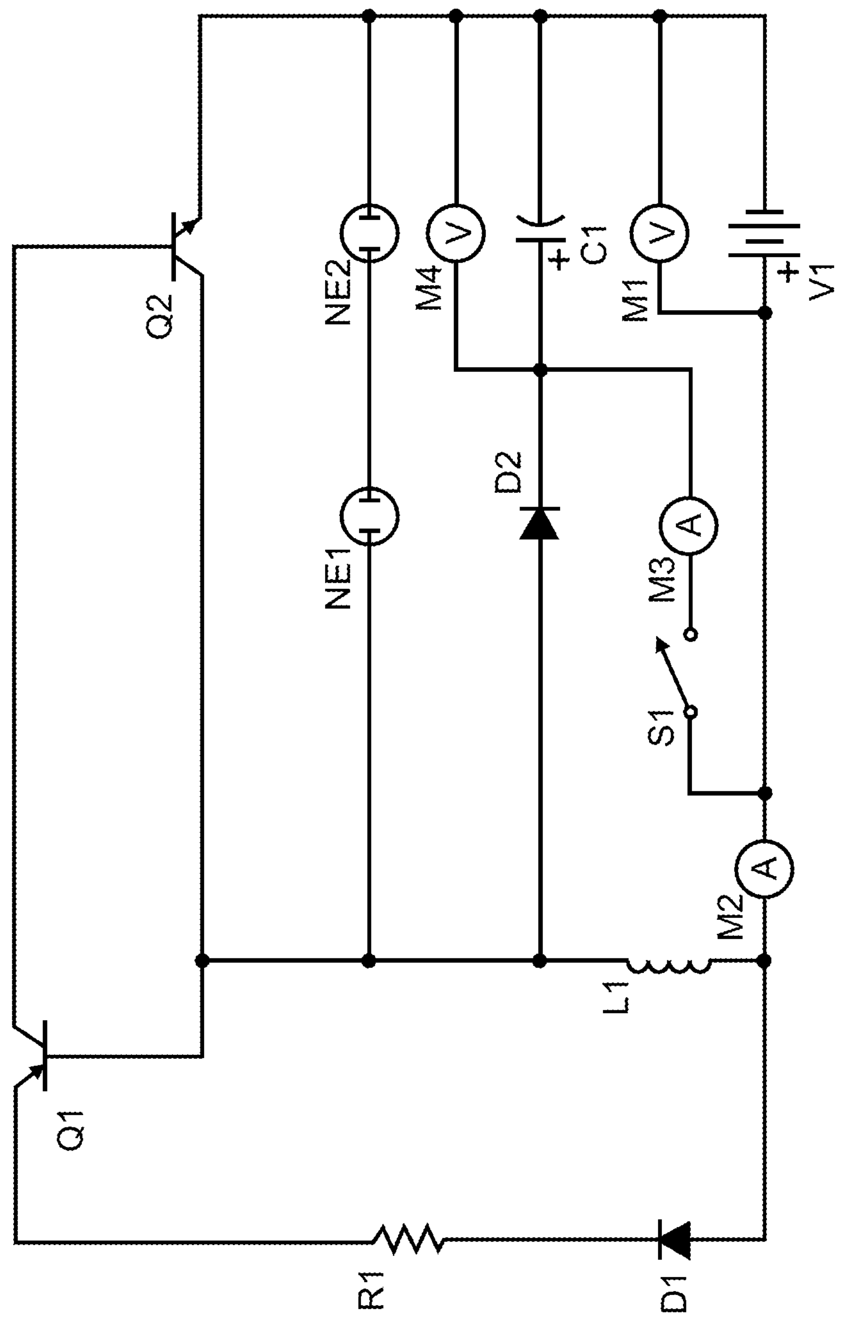
Figure 25:
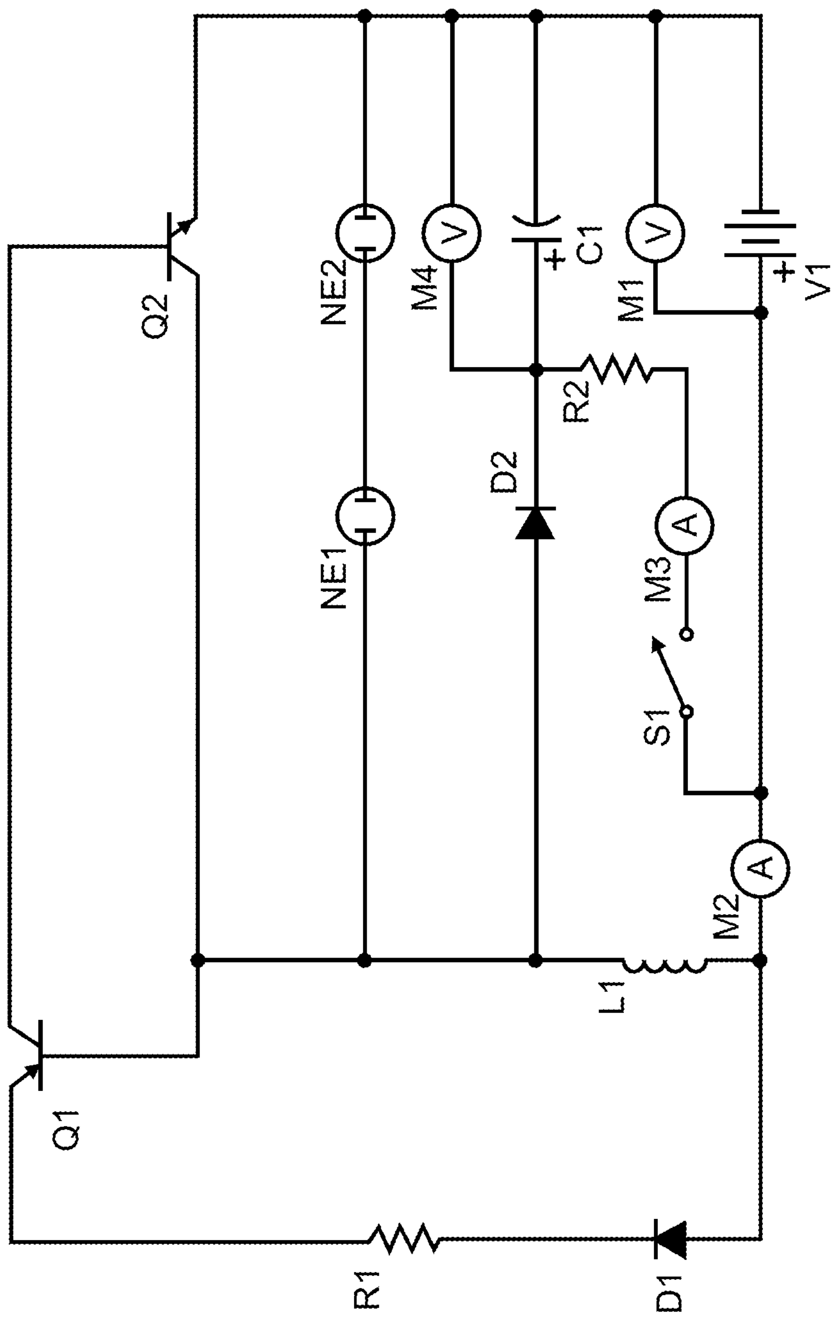

FIGS. 22 & 23 illustrate example embodiments of energy capturing circuits including additional components in parallel with a coil L1. In the embodiment shown in FIG. 22, an additional resistor R2 is included in parallel with the coil L1. In this embodiment, the inclusion of the resistor R2 decreases the wattage on a power supply V1; however, the resistor R2 also produces heat. In an embodiment, the resistor R2 has a resistance that is greater than or equal to a resistance of the coil L1. In the embodiment shown in FIG. 23, an additional capacitor C2 is included in parallel with the coil L1. In this embodiment, the capacitor C2 captures some of the energy from a collapsing magnetic field in the coil L1, similar to the storage device C1. In additional embodiments resistor R2 and capacitor C2 can be used to tune the motor by correcting the frequency of the signal or by reducing inductive ringing.

FIGS. 24-30 illustrate example embodiments of energy capturing circuits including voltmeters M1, M4, M5 and wattmeters M2, M3. In these embodiments, the voltmeters M1, M4, M5 and wattmeters M2, M3 measure voltages and powers, respectively, in the circuits, which provides information for testing performance of the circuit.

Figure 26:
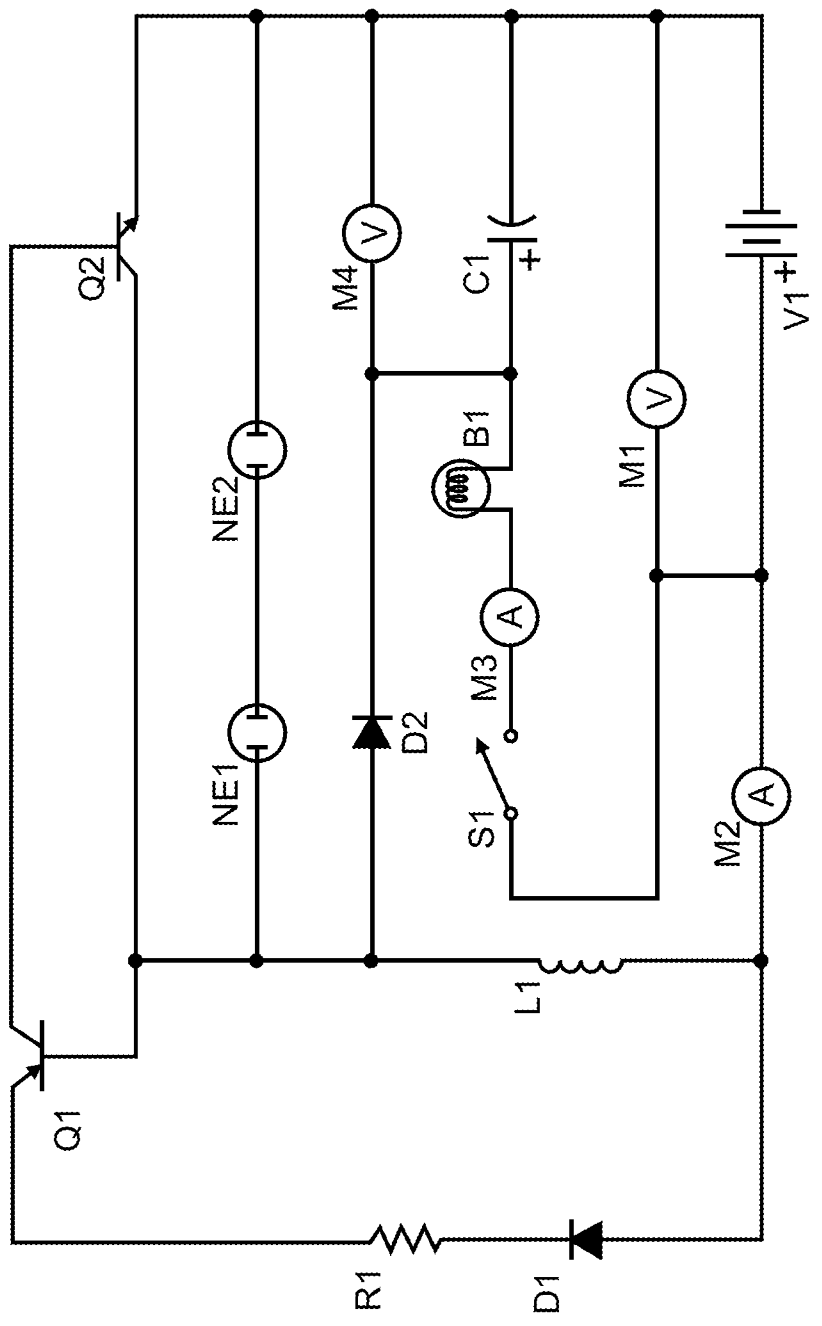
Figure 27:
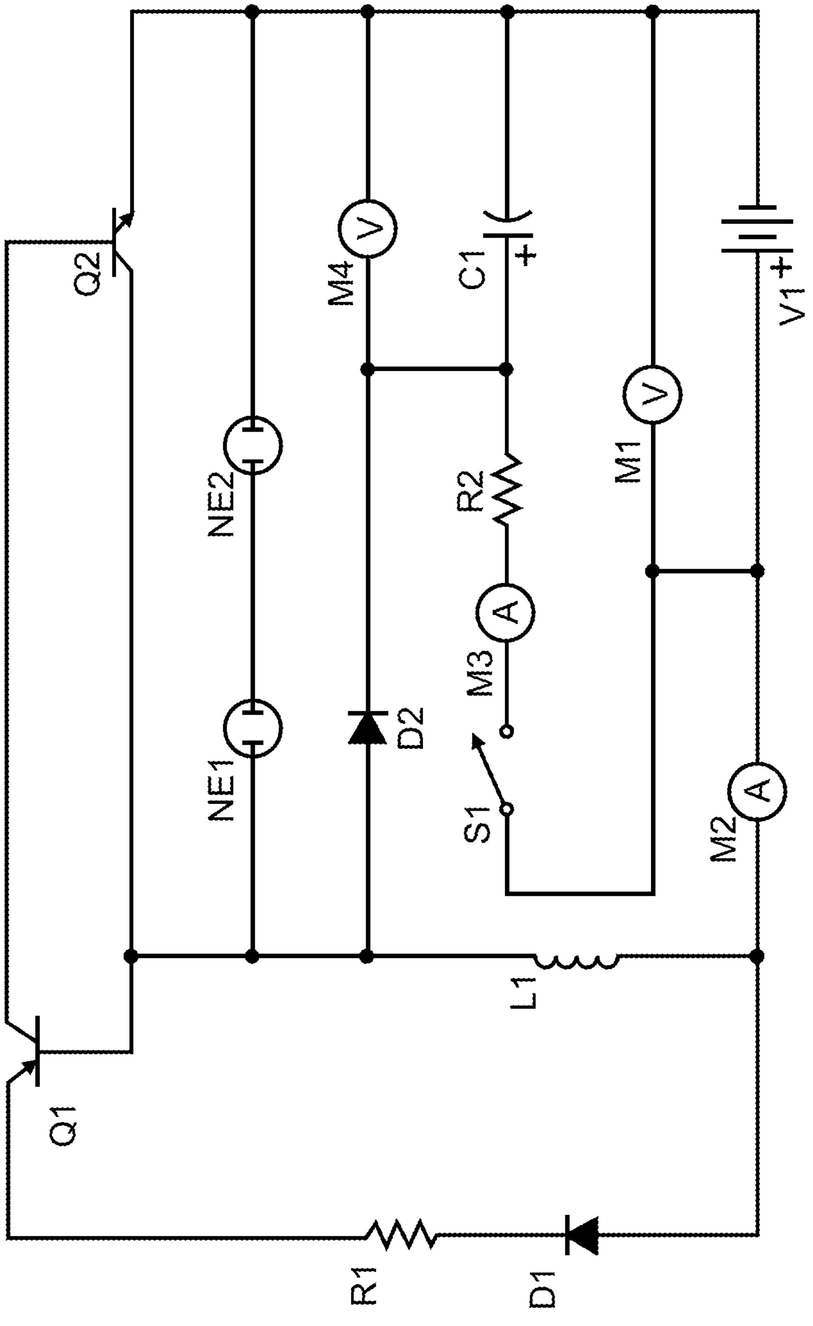
Figure 28:
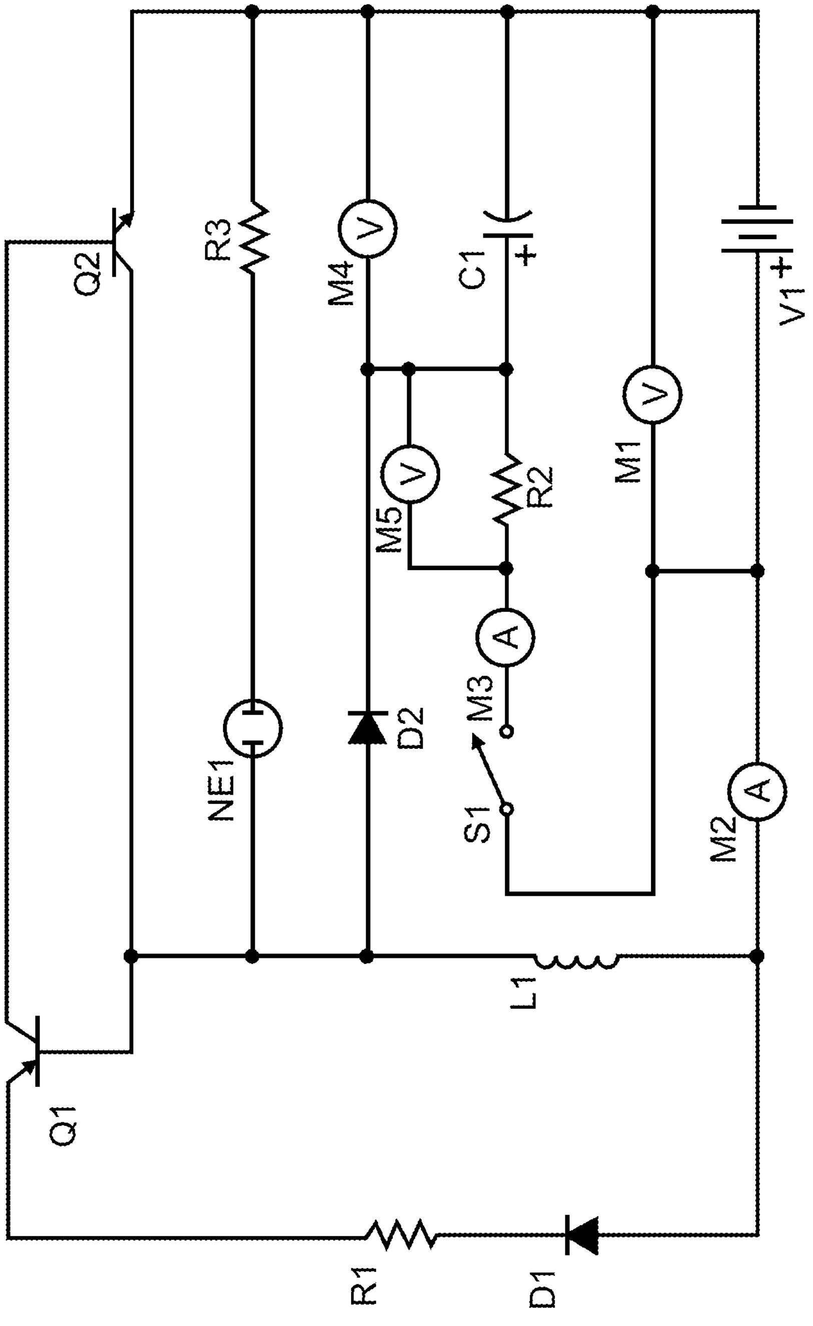
Figure 29:
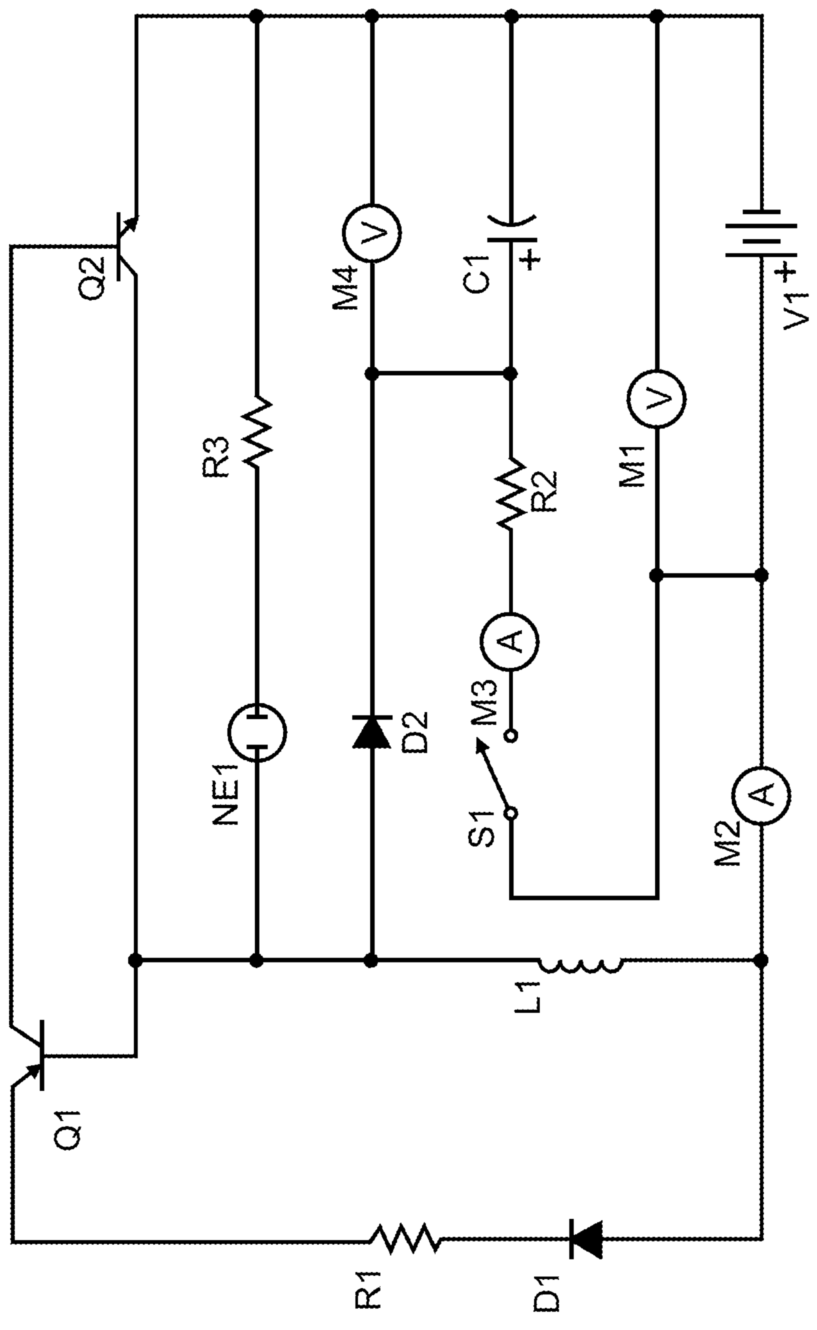
Figure 30:
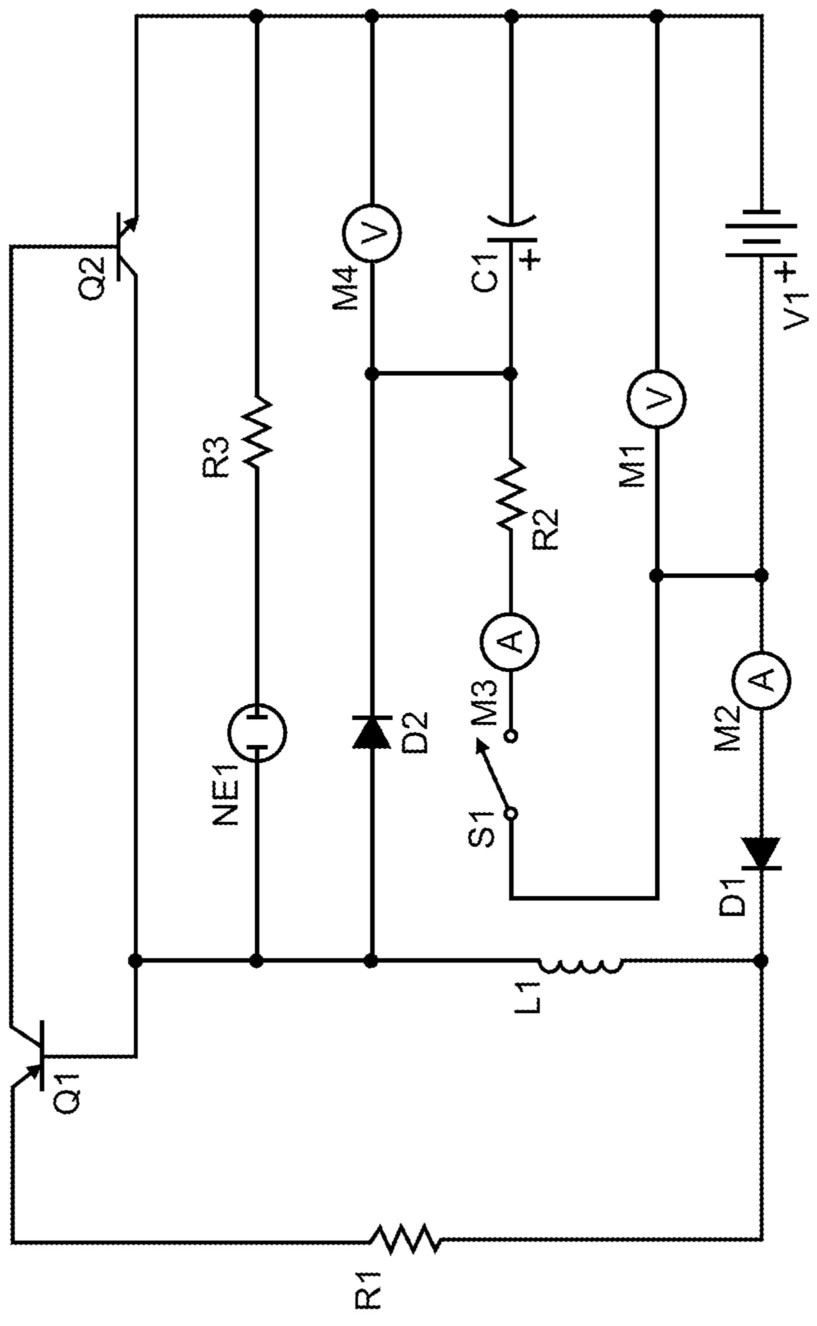

In embodiments of the circuit depicted in FIG. 26, the resistor R1 has a resistance of approximately 750 ohms, and the capacitor C1 has a capacitance of approximately 0.1 farads and is configured to handle approximately 160 volts of direct current (VDC). In embodiments, the bulb B1 is configured to handle approximately 12 volts of direct current (VDC). In embodiments, the power supply V1 is configured to output between approximately 5 and 250 volts of direct current (VDC). In embodiments, the diodes D1, D2 are MUR1520 rectifier diodes manufactured by ON Semiconductor (a/k/a Semiconductor Components Industries, LLC) having its principal place of business in Phoenix, AZ. The transistor Q1 is a MJL21193 PNP transistor manufactured by ON Semiconductor. In embodiments, the transistor Q2 is a MJL21194 NPN transistor manufactured by ON Semiconductor.

In embodiments of the circuits depicted in FIG. 27-30, the resistor R2 has a resistance of approximately 8 ohms. In embodiments, the resistor R1, the power supply V1, the diodes D1, D2, the capacitor C1, and the transistors Q1, Q2 are configured in a similar manner as described above with respect to the embodiment of FIG. 26. In embodiments of the circuits depicted in FIGS. 28-30, the resistor R3 has a resistance of approximately 220 kiloohms.

Figure 31:
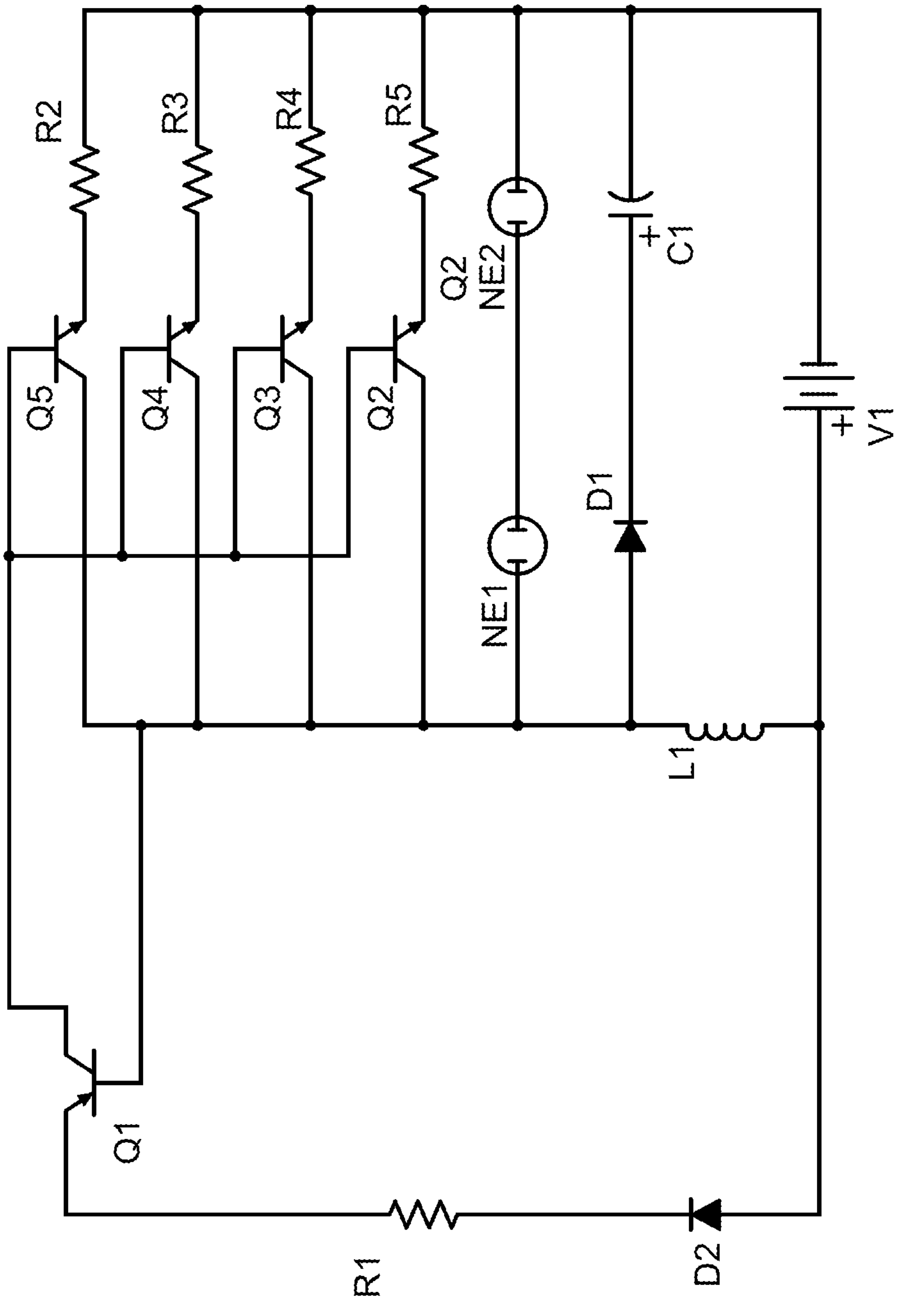

FIG. 31 illustrates an example embodiment of an energy capturing circuit including multiple NPN transistors Q2, Q3, Q4, Q5. In the illustrated embodiment, the NPN transistors Q2, Q3, Q4, Q5 share the work of the single transistor of the embodiment depicted in FIG. 2. In embodiments, having multiple NPN transistors reduces junction losses as compared to an embodiment with a single NPN transistor. The illustrated embodiment further includes additional resistors R2-R5. In this embodiment, the resistors R2-R5 are emitter follower resistors and act as balancing resistors, controlling a flow of current through each of the NPN transistors Q2, Q3, Q4, Q5 such that the flow of current is substantially the same through each of the NPN transistors Q2, Q3, Q4, Q5. In an embodiment, the resistors R2-R5 have substantially the same resistance. In embodiments, the resistors R2-R5 each have a resistance in the range of approximately 0.01 ohms to approximately 0.10 ohms. In alternative embodiments, the resistors R2-R5 have difference resistances to account for differences in the NPN transistors Q2, Q3, Q4, Q5. In an embodiment, the resistor R1 has a resistance of approximately 750 ohms.

Figure 32:
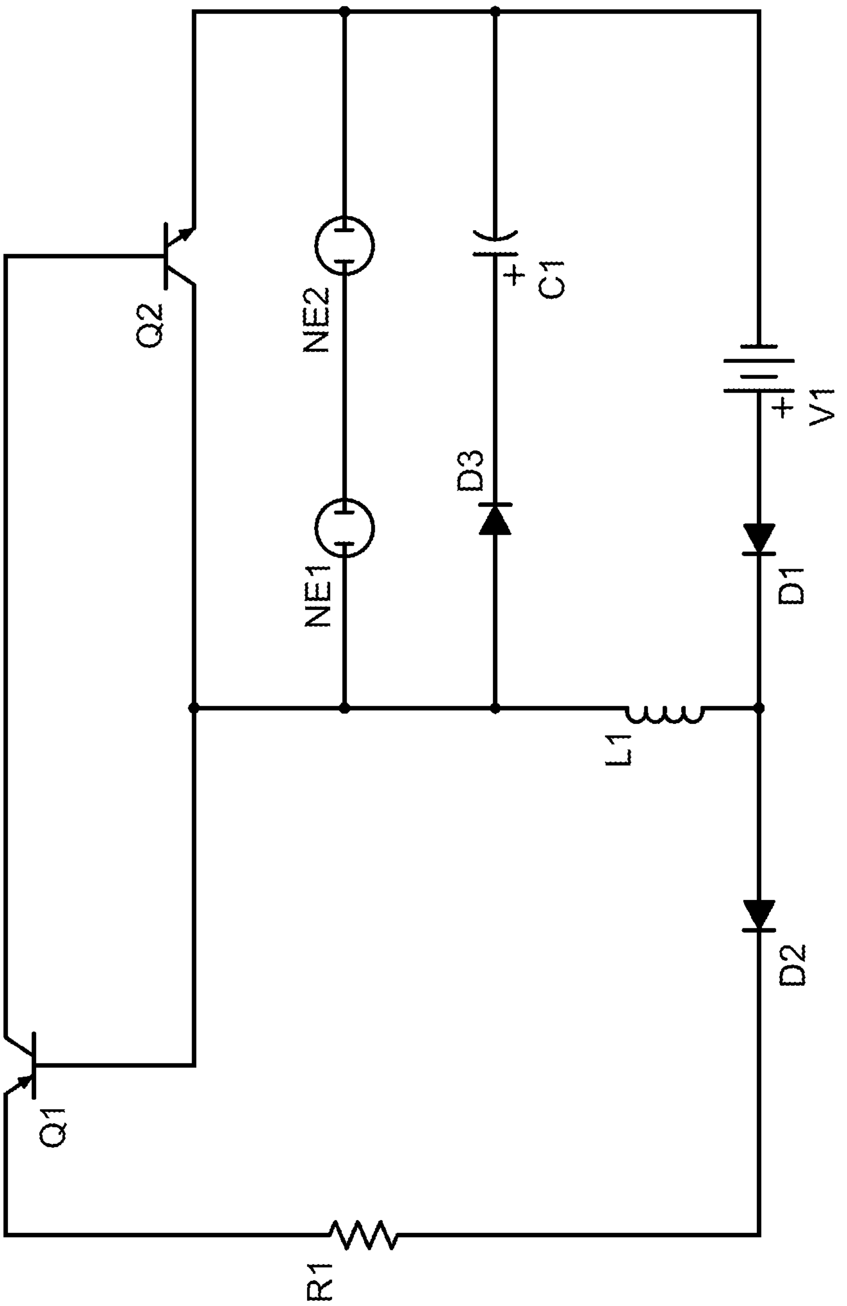
Figure 33:
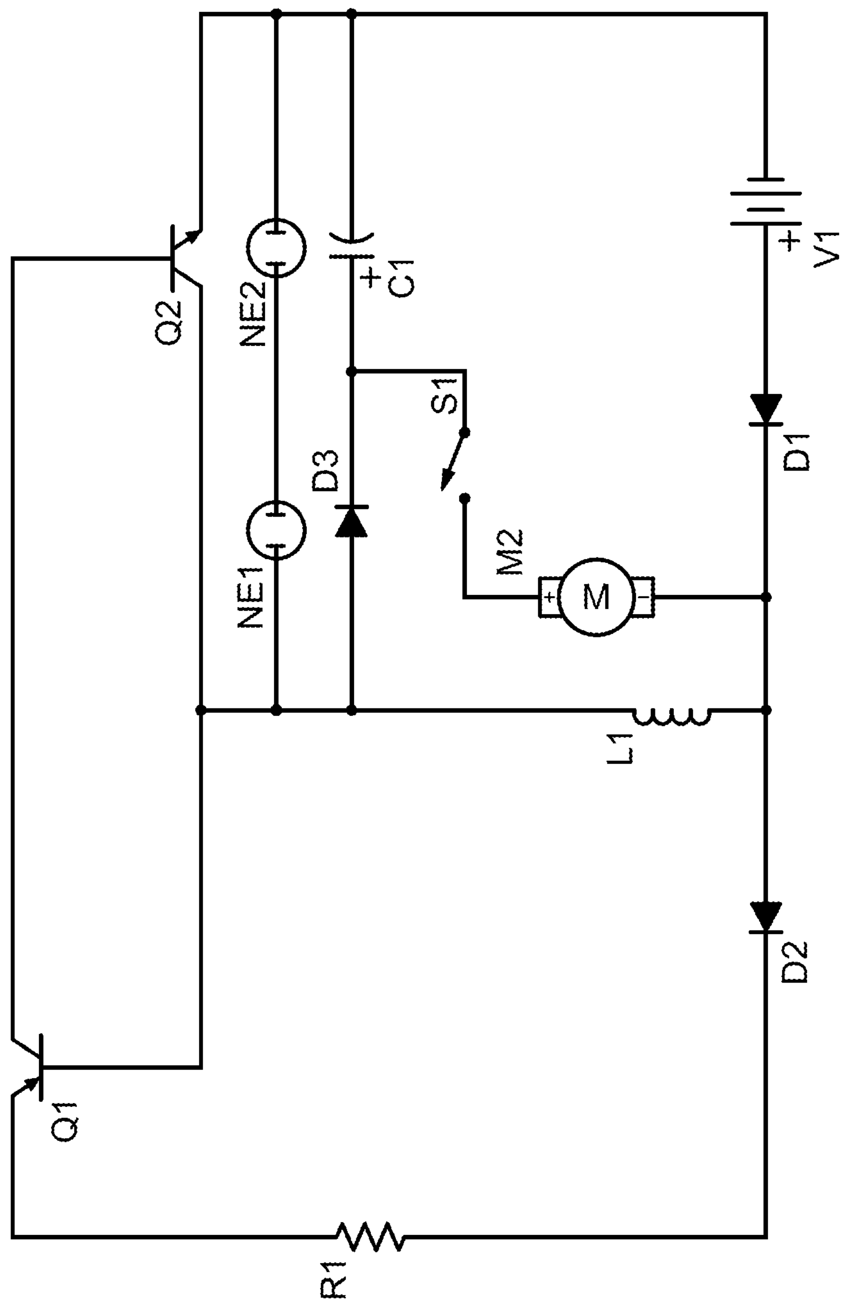

FIG. 32 illustrates an example embodiment of an energy capturing circuit including multiple protection diodes D1, D2. In this embodiment, the diodes D1, D2 protect a power source V1 from reverse power or from recovered power. In embodiments, the diodes D1, D2 further protect the power source V1 if transistors Q1, Q2 fail by limiting current flowing back to a positive side of the power supply V1.

FIGS. 33-37 illustrate example embodiments of energy capturing circuits including recovery conversion systems. In the embodiment shown in FIG. 33, the recovery conversion system includes a motor M2 with a switch S1. In an embodiment, the motor M2 is axially aligned and coupled with a motor that includes a coil L1 and a magnet that rotates past the coil L1. In embodiments, when the switch S1 is closed, energy in the storage device C1 is returned to a power source V1 for energy savings. This also causes the motor M2 to rotate; however, the motor M2 need not be rotating for energy to be returned to the power source V1. In an embodiment, the switch S1 is a mechanical switch. In alternative embodiments, the switch S1 is a semiconductor or other switching components. In yet other embodiments, the switch S1 operates as a PWM controlled interface.

Figure 34:
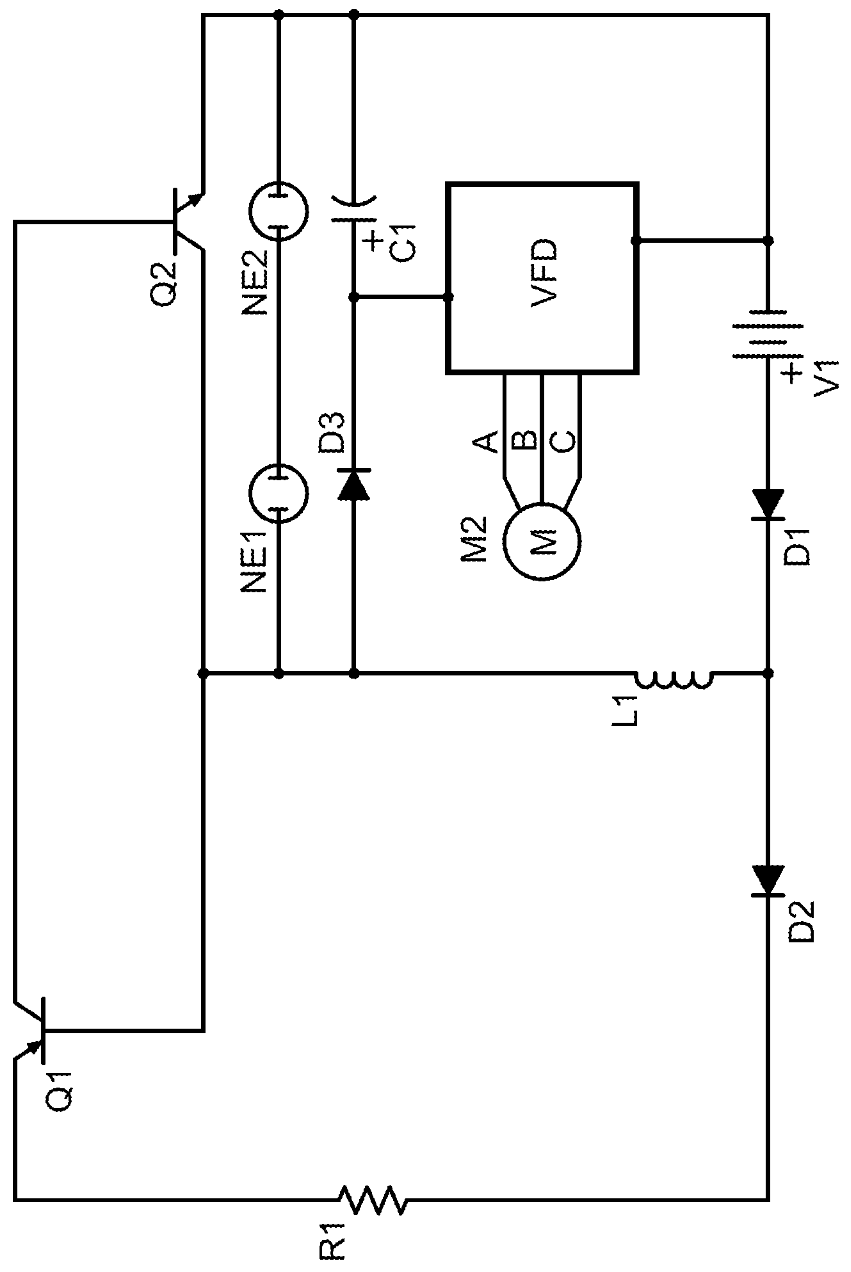

In the embodiment shown in FIG. 34, the recovery conversion system includes a variable frequency drive and a motor M2. In embodiments, the motor M2 is axially aligned and coupled with a motor that includes a coil L1 and a magnet that rotates past the coil L1. In an embodiment, the motor M2 is a three-phase electric motor or a single-phase electric motor. In alternative embodiments, other types of motors may be used. In the illustrated embodiment, the variable frequency drive is electrically connected to the positive side of a storage device C1 and the negative side of a power source V1. In such an embodiment, recovered power stored in the storage device C1 is used to power the variable frequency drive which in turn drives the motor M2; however, in such an embodiment, the stored energy cannot be returned to the power source V1 for energy savings.

Figure 35:
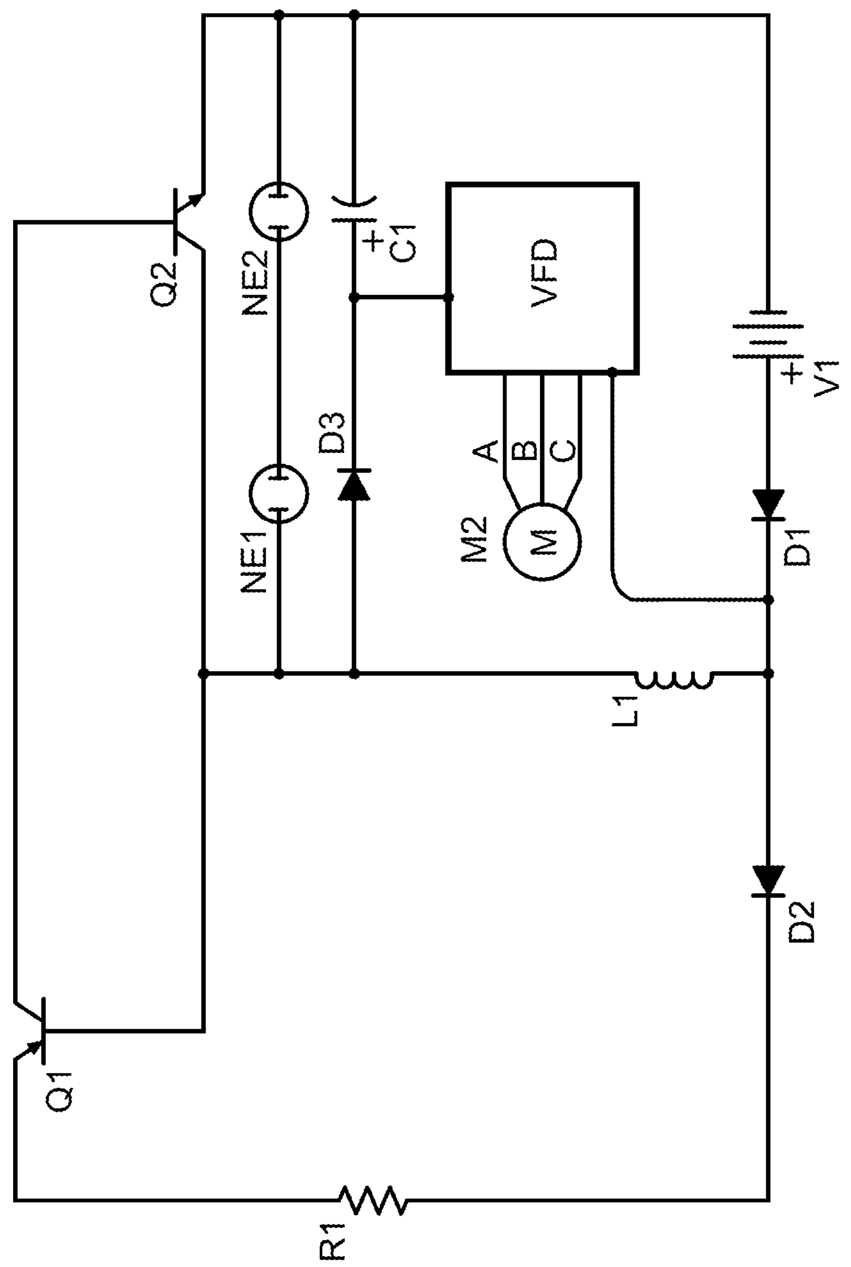

FIG. 35 illustrates a modified embodiment of the embodiment depicted in FIG. 34. In the embodiment depicted in FIG. 35, the variable frequency drive is electrically connected to a positive side of the storage device C1 and a positive side of the power source V1. As such, not only does the recovered power in the storage device C1 power the variable frequency drive and in turn drive the motor M2, but the stored energy in the storage device C1 also returns to the power source V1 for energy savings.

Figure 36:
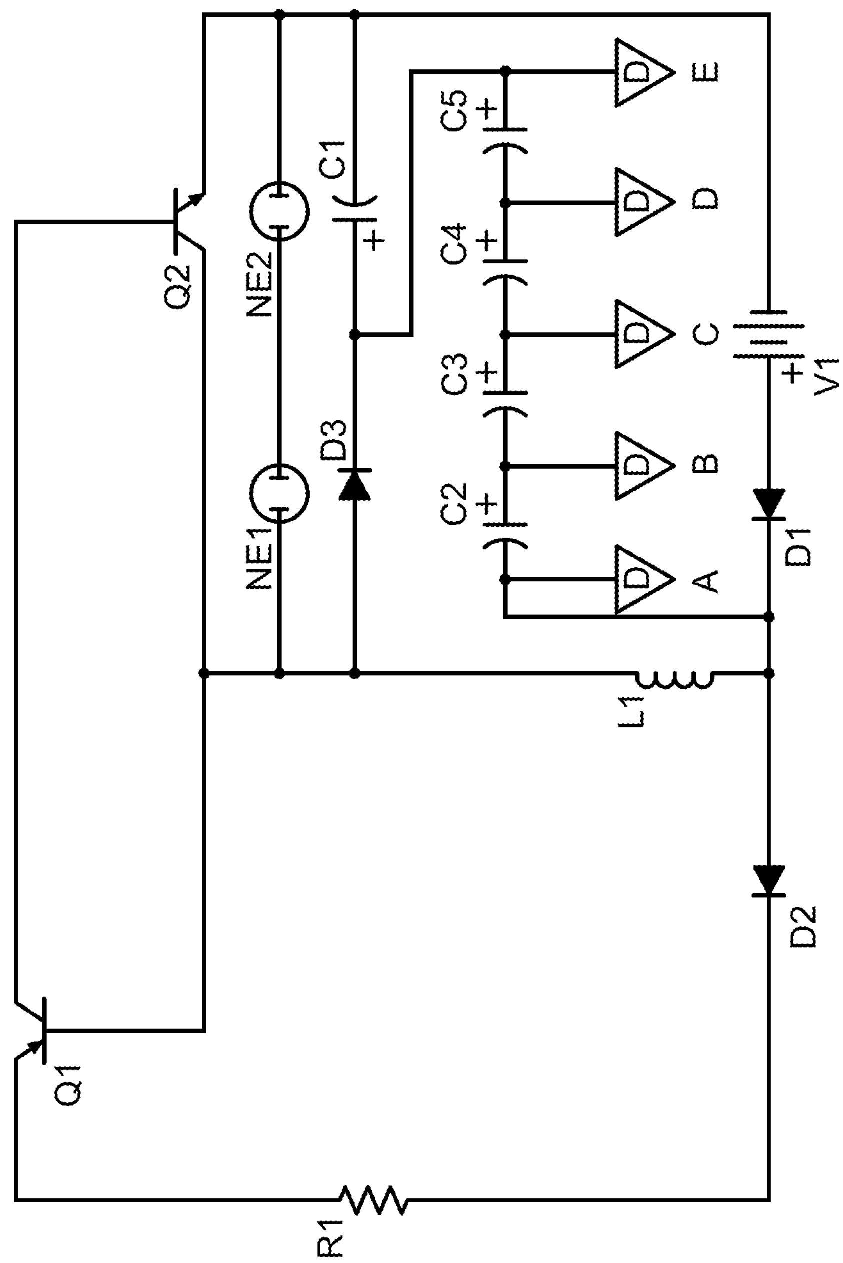

In the embodiment shown in FIG. 36, the recovery conversion system includes a series of capacitors C2, C3, C4, C5 and terminals A, B, C, D, E. In this embodiment, energy from a storage device C1 is returned to a power source V1 through the series of capacitors C2, C3, C4, C5 and terminals A, B, C, D, E for energy savings. Additionally, in embodiments, the series of capacitors C2, C3, C4, C5 is used to step the recovered power down without the losses from other recovery conversion devices, such as DC to DC converters. In some embodiments, the terminals A, B, C, D, E may be used to power additional devices.

Figure 37:
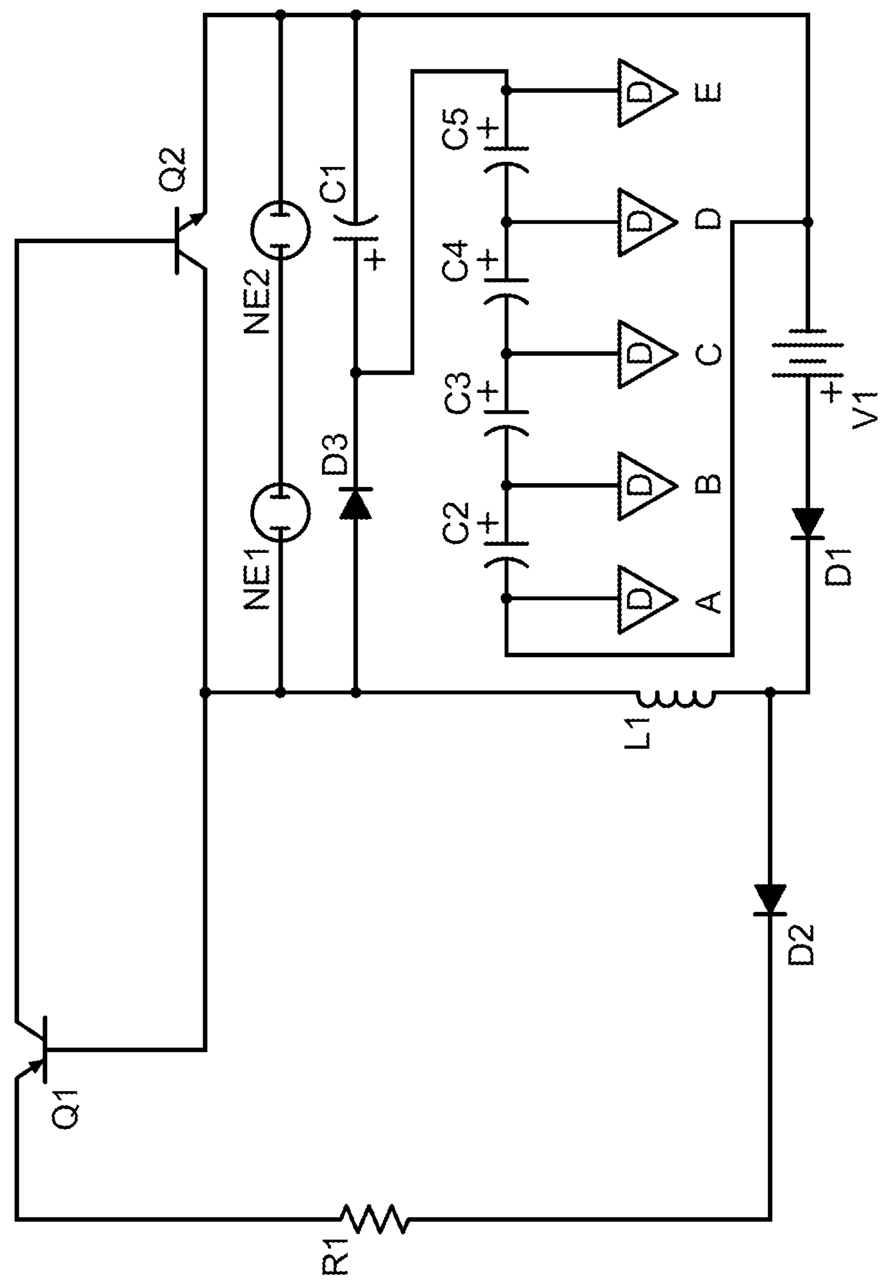

FIG. 37 illustrates an alternative embodiment of the energy capturing circuit depicted in FIG. 36. In the embodiment depicted in FIG. 37, the series of capacitors C2, C3, C4, C5 and terminals A, B, C, D, E are electrically connected to the positive side of the storage device C1 and the negative side of the power source V1. In embodiments, the recovered power in the storage device C1 is used to power additional devices through the terminals A, B, C, D, E; however, no energy is returned to the power source V1 for energy savings.

Figure 38:
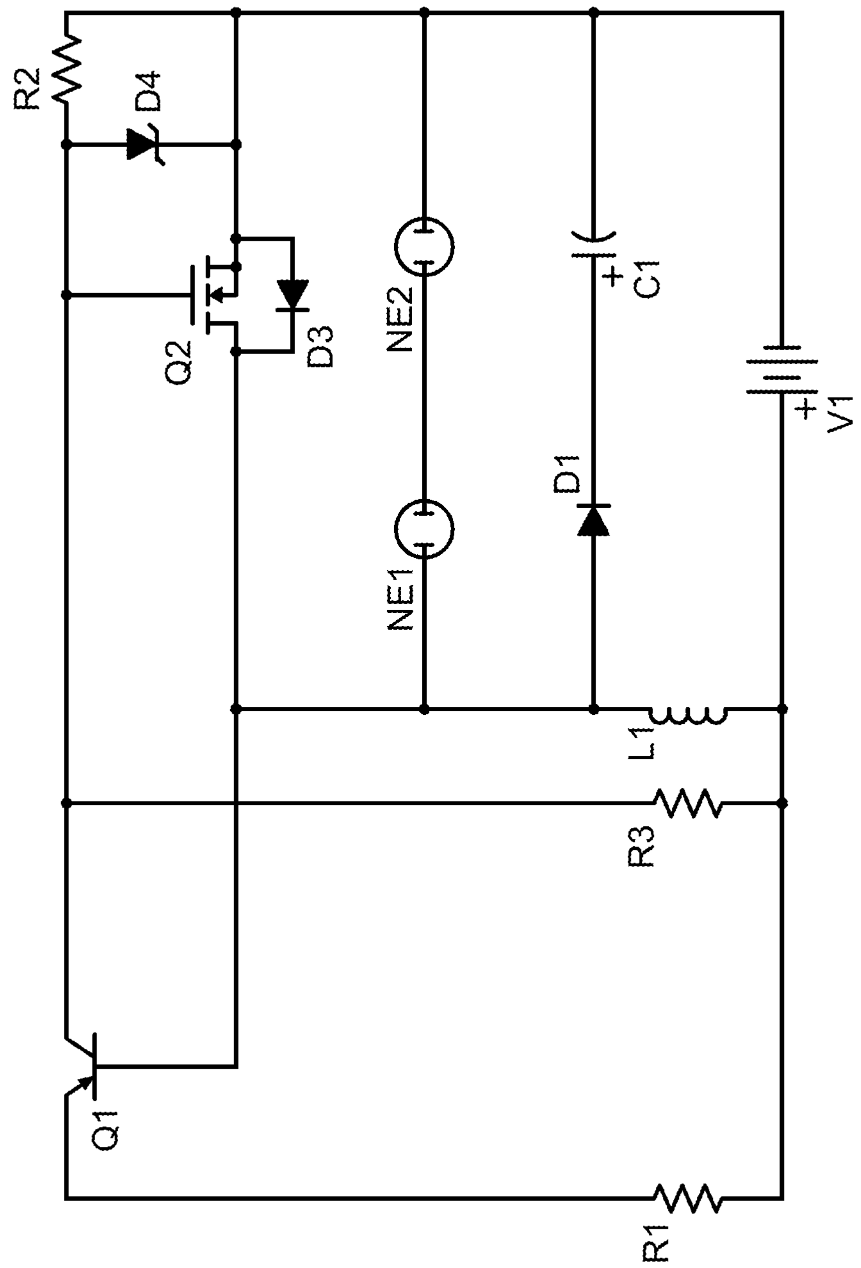

FIG. 38 illustrates an example embodiment of an energy capturing circuit including a switching circuit that includes a PNP transistor Q1 and an enhancement mode metal-oxide-semiconductor field-effect transistor (MOSFET) Q2. In embodiments, the transistor Q2 is an N-Channel MOSFET. In an embodiment, the resistor R1 has a resistance of approximately 10 kiloohms, the resistor R2 has a resistance of approximately 10 kiloohms, and the resistor R3 has a resistance of approximately 40 kiloohms. In an embodiment, the diode D4 is a Zener diode with a breakdown voltage of approximately 15 volts.

Figure 39:
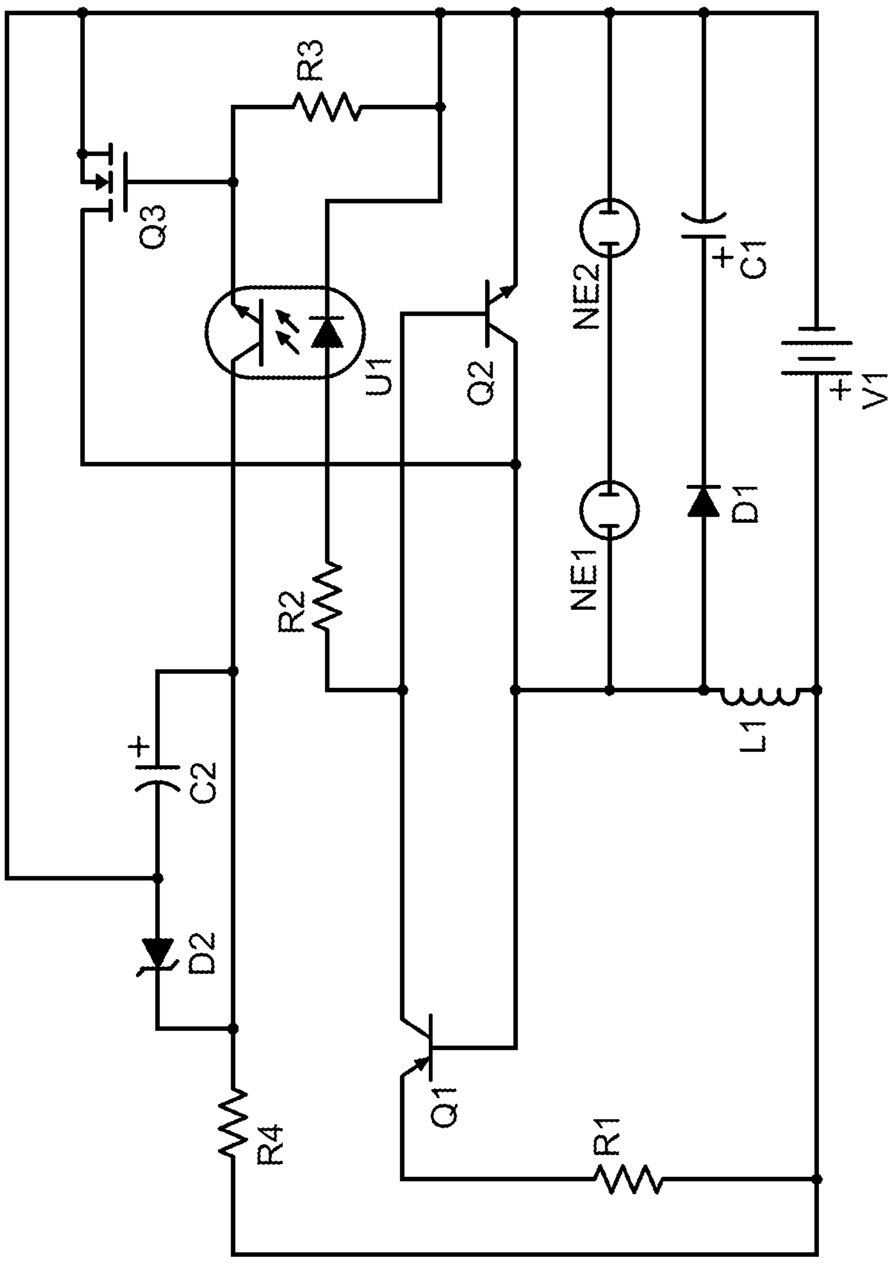

FIG. 39 illustrates an example embodiment of an energy capturing circuit including a switching circuit that includes a MOSFET Q3 on top of an NPN transistor Q2. In this embodiment, an emitter of the NPN transistor Q2 is connected to a source position of the MOSFET Q3, a collector of the NPN transistor Q2 is connected to a drain pin of the MOSFET Q3, and a gate pin of the MOSFET Q3 is connected to a MOSFET driver circuit that is then connected to a base pin of the NPN transistor Q2. In the illustrated embodiment, the circuit also includes an optocoupler U1 that includes a bipolar phototransistor paired with a light-emitting diode. In embodiments, when light is emitted by the light emitting diode, the light hits a base-collector junction in the optocoupler U1, and the phototransistor allows current to flow from its collector to its emitter. In embodiments, the resistor R1 has a resistance of approximately 750 ohms, the resistor R2 has a resistance of approximately 220 ohms, the resistor R3 has a resistance of approximately 15 kiloohms, and the resistor R4 has a resistance of approximately 5.5 kiloohms. In embodiments, the capacitor C2 has a capacitance of approximately 10 microfarads. In embodiments, the diode D2 is a Zener diode with a breakdown voltage of approximately 15 volts.

Figure 40:
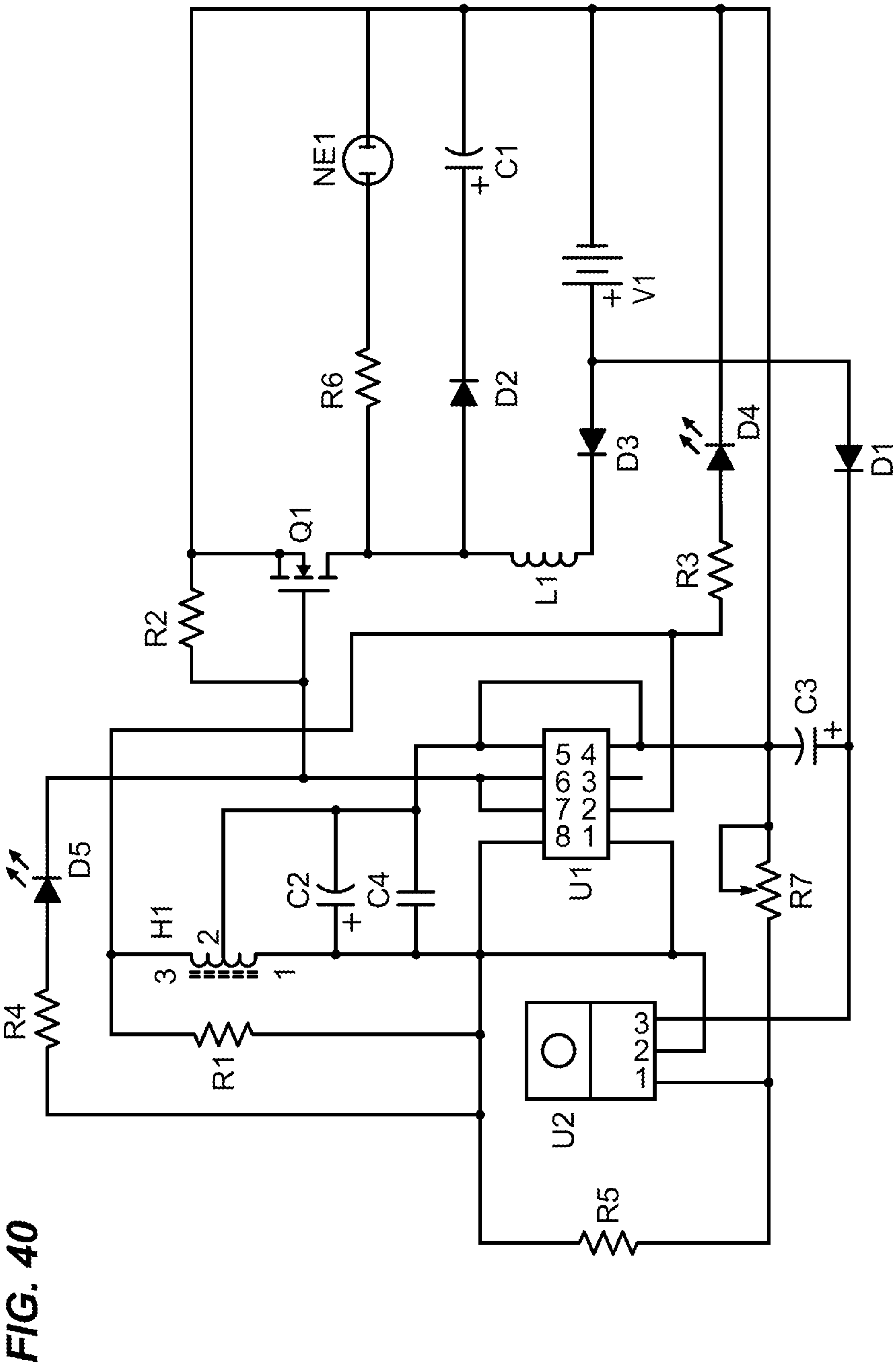

FIG. 40 illustrates an example embodiment of an energy capturing circuit including a Hall effect sensor H1. In embodiments, the Hall effect sensor H1 tracks a position of a magnet. In this example embodiment, the switching circuit includes a MOSFET Q1 and the Hall effect sensor H1. In embodiments, the MOSFET Q1 is a IRFP260N MOSFET transistor manufactured by Infineon Technologies AG with its principal place of business in Neubiberg, Germany. In embodiments, the Hall effect sensor H1 is a ATS137 Hall effect sensor manufactured by Diodes Incorporated with its principal place of business in Plano, TX. In embodiments, the resistor R1 has a resistance of approximately 1 kiloohms, the resistor R2 has a resistance of approximately 10 kiloohms, the resistor R3 has a resistance of approximately 56 kiloohms, the resistor R4 has a resistance of approximately 56 kiloohms, the resistor R5 has a resistance of approximately 330 ohms, the resistor R6 has a resistance of approximately 100 kiloohms, and the resistor R7 has a resistance of approximately 1.8 kiloohms. In embodiments, the diode D1 is a 1N4004 rectifier diode manufactured by ON Semiconductor (a/k/a Semiconductor Components Industries, LLC) having its principal place of business in Phoenix, AZ. The diodes D2, D3 are MUR1520 rectifier diodes manufactured by ON Semiconductor. In embodiments, the capacitor C1 has a capacitance of approximately 0.1 farad, the capacitor C2 has a capacitance of approximately 10 microfarads, and the capacitor C3 has a capacitance of approximately 100 microfarads, and the capacitor C4 has a capacitance of approximately 0.1 microfarads. In embodiments, the chip U1 is a TC4429 gate driver manufactured by Microchip Technology Inc. with its principal place of business in Chandler, AZ. In embodiments, the chip U2 is a LM317 linear voltage regulator manufactured by Texas Instruments Incorporated with its principal place of business in Dallas, TX.

Figure 41:
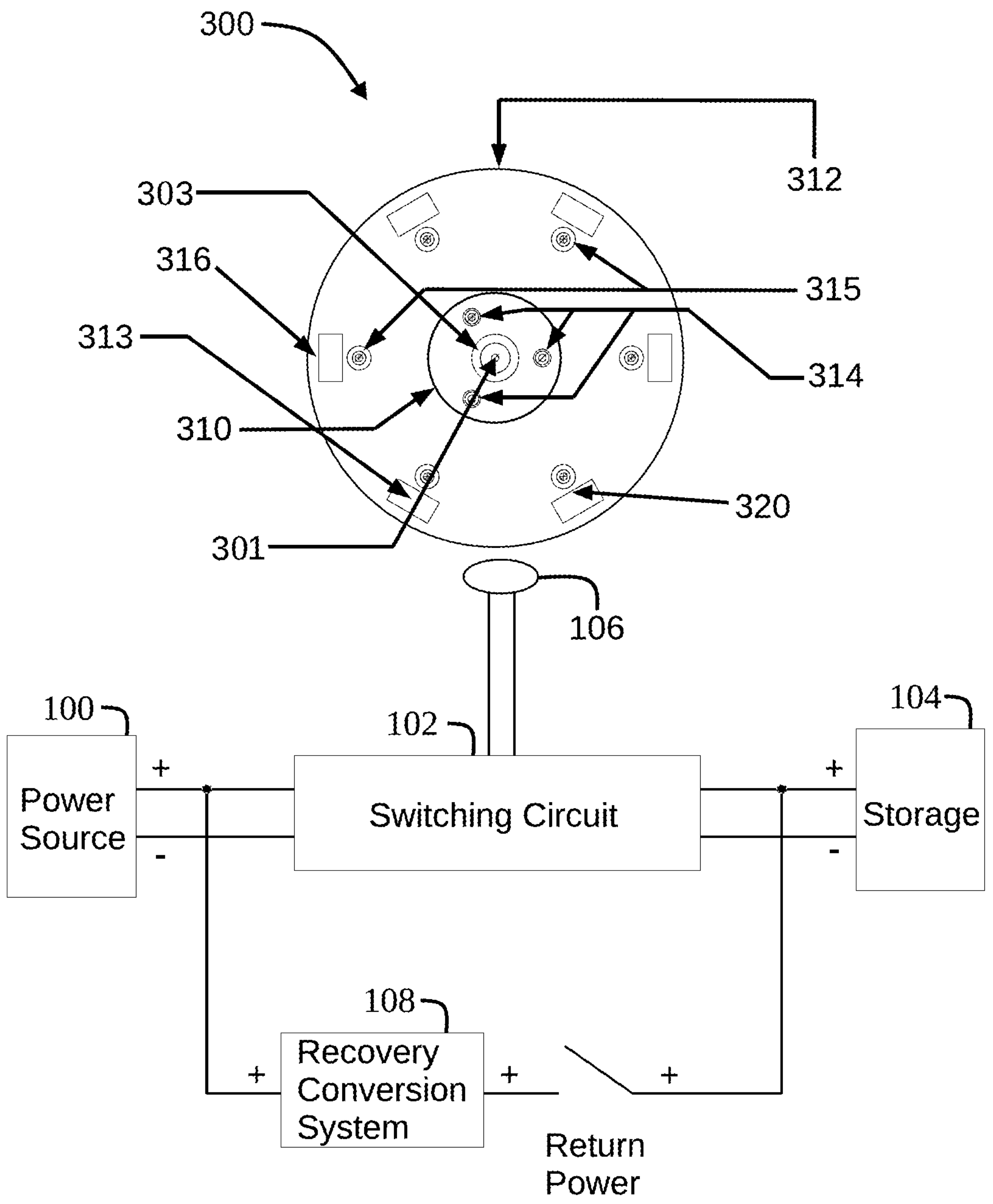
FIG. 41 illustrates the circuit in use in a system with an electric motor.
Figure 42:
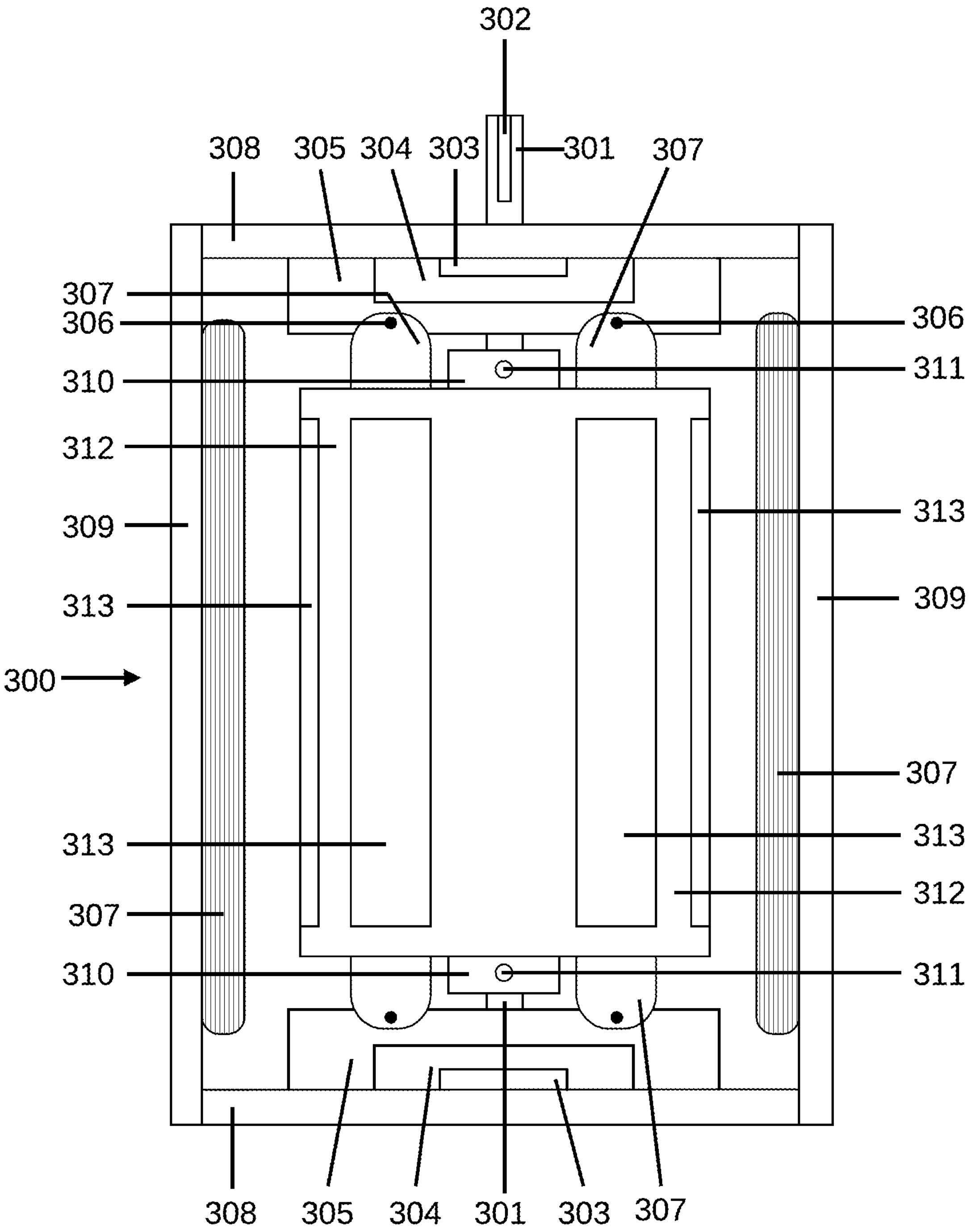
FIG. 42 illustrates a top view of an embodiment of a motor housing with a portion of a plate cut away to show an interior rotor assembly.
Figure 43:
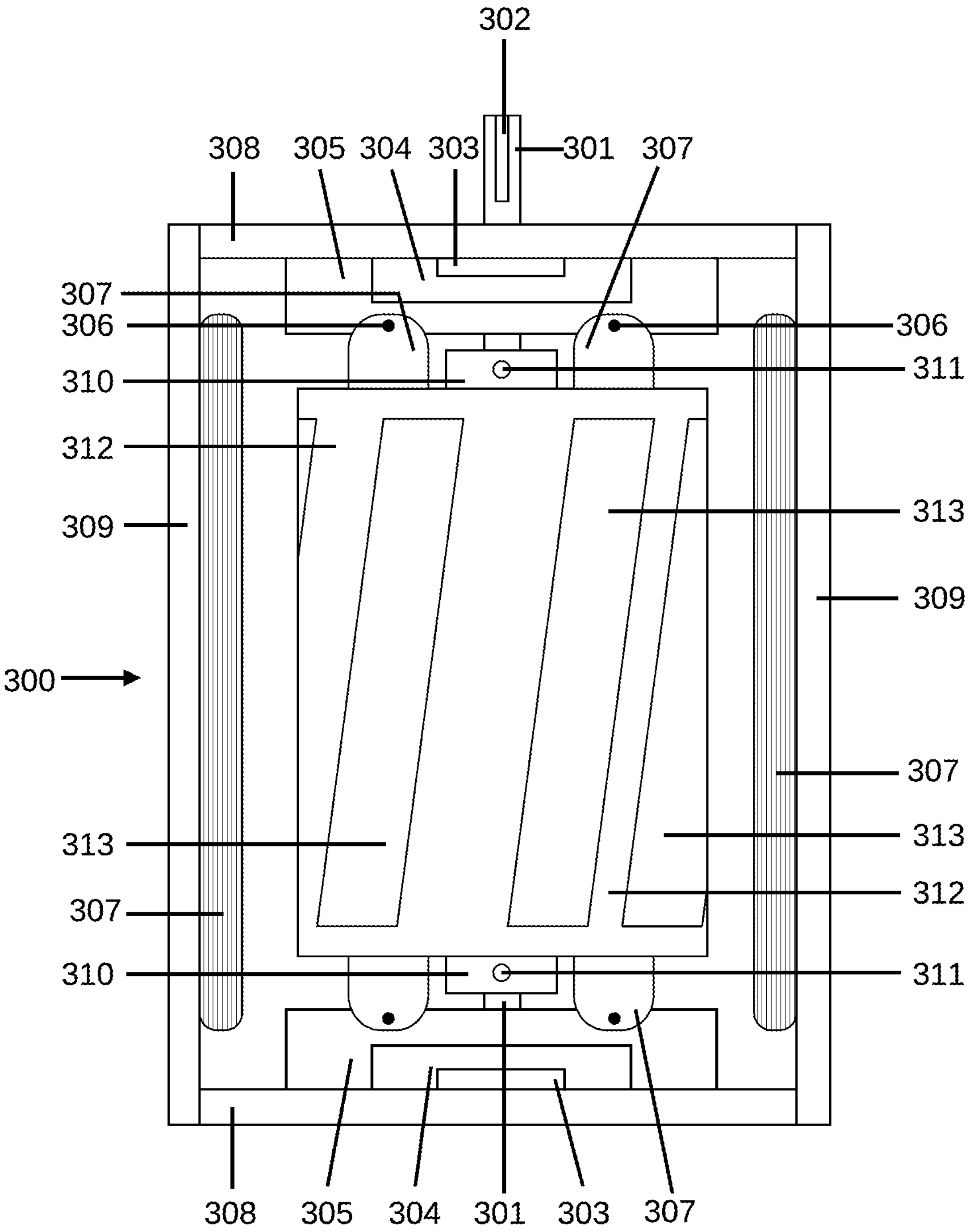
FIG. 43 illustrates a top view of a second embodiment of a motor housing with a portion of a plate cut away to show an interior rotor assembly.
Figure 44:
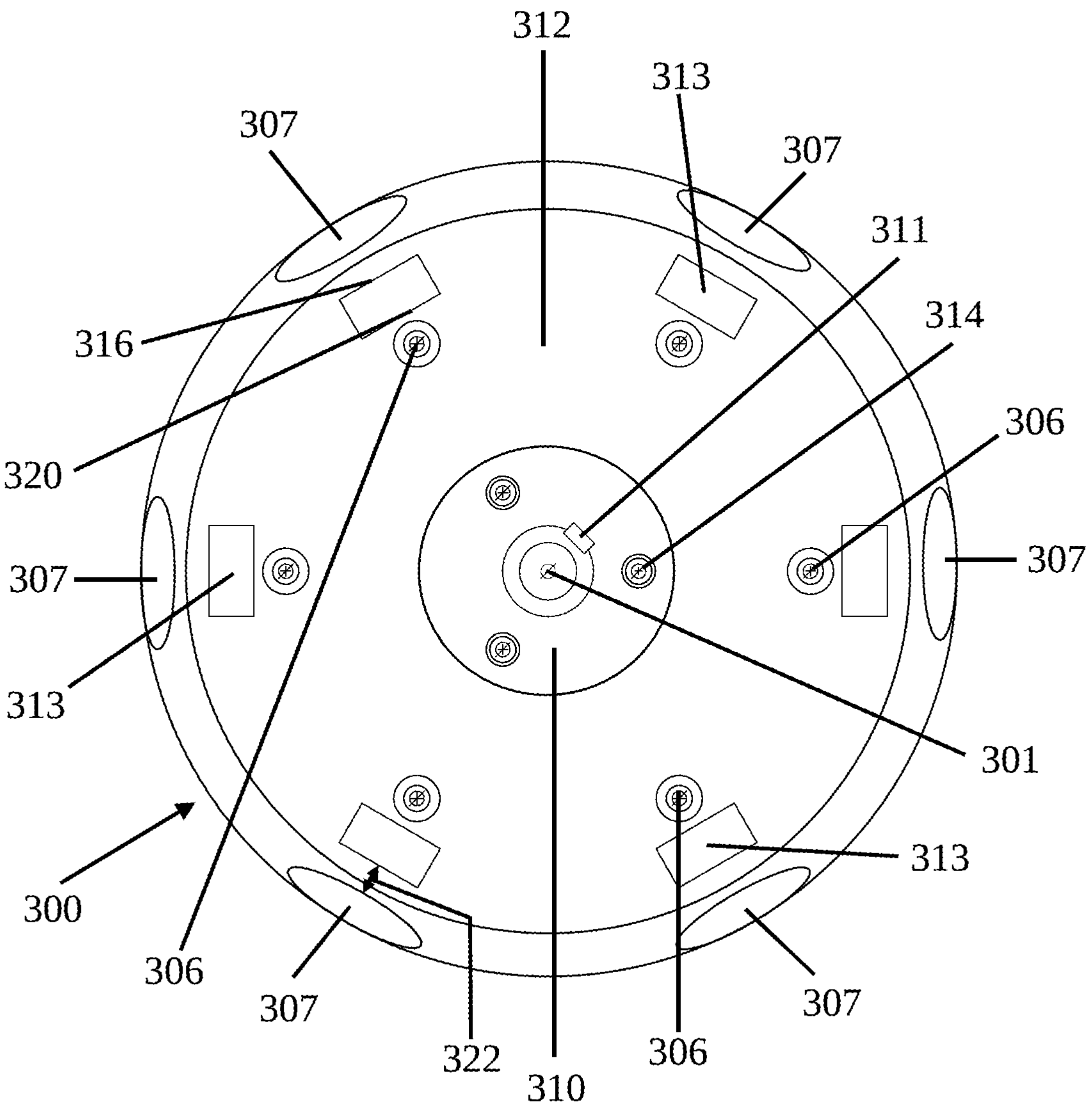
FIG. 44 illustrates an end view of an embodiment of a motor housing.
Figure 45:
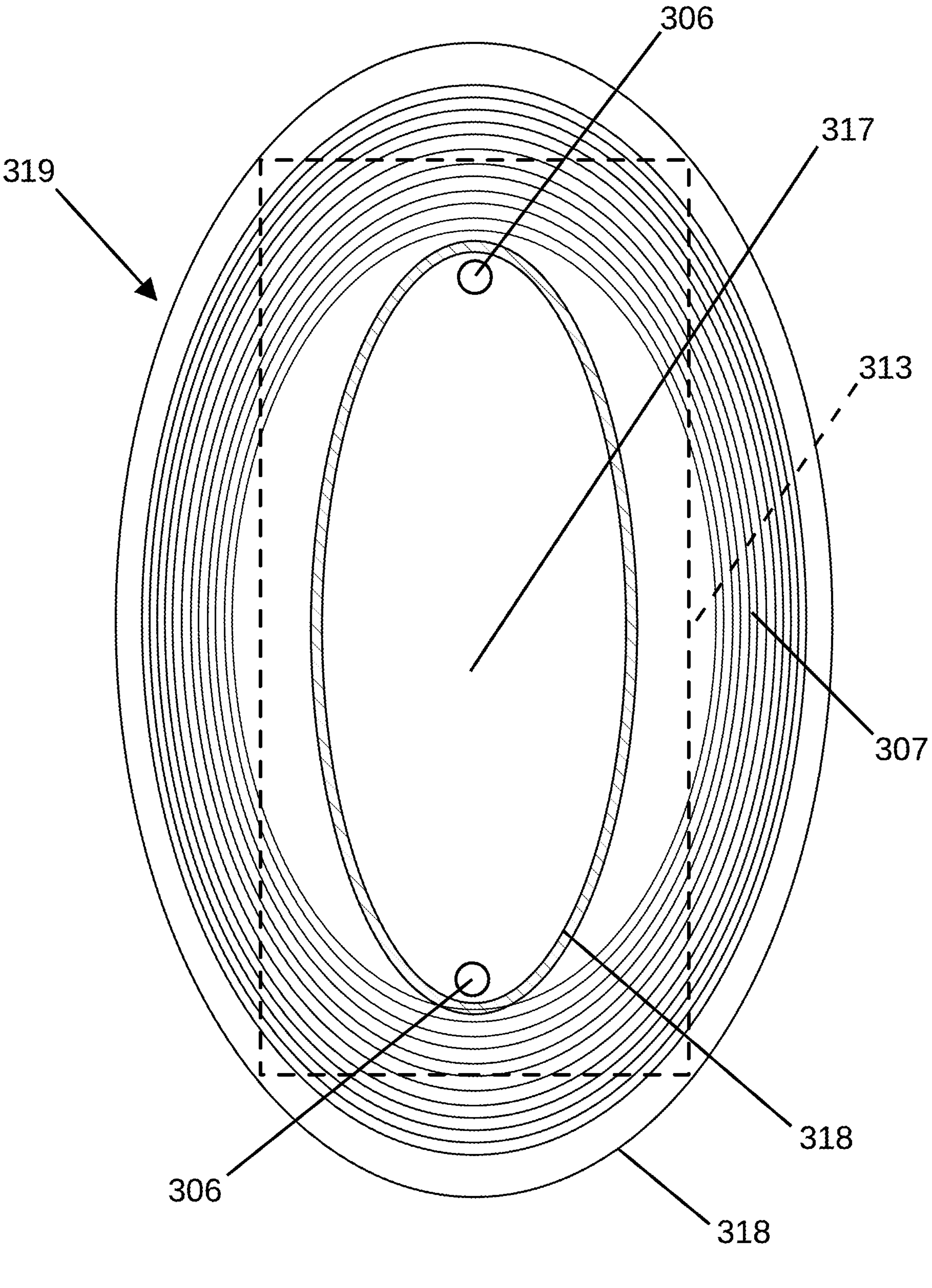
FIG. 45 illustrates a cross-sectional view of an embodiment of a coil assembly aligned with a magnet.
Figure 46:
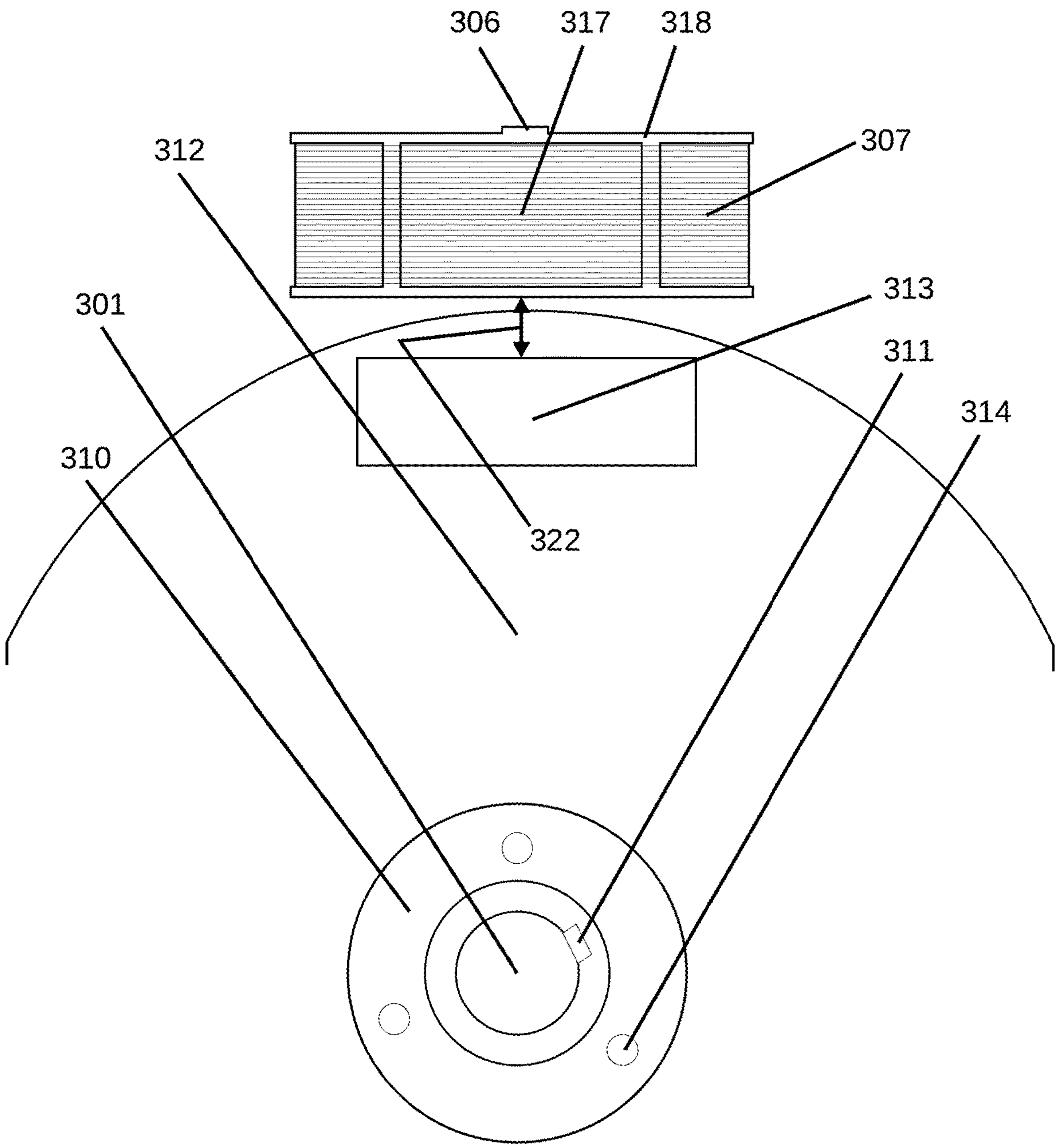
FIG. 46 illustrates an end view of an embodiment of a motor housing with a rotor assembly and a magnet.
Figure 47:
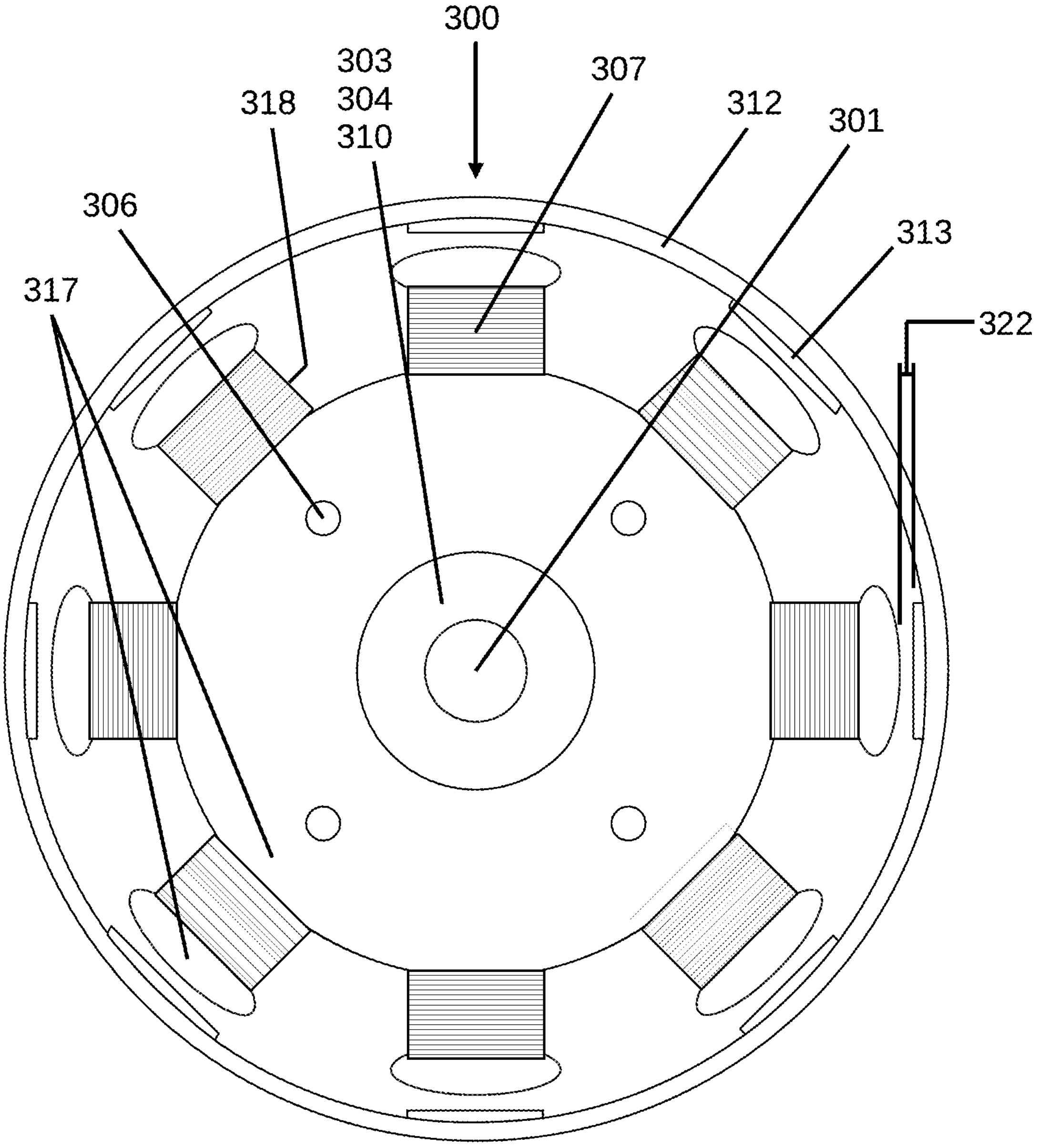
FIG. 47 illustrates a top view of an embodiment of a motor housing.
Figure 48:
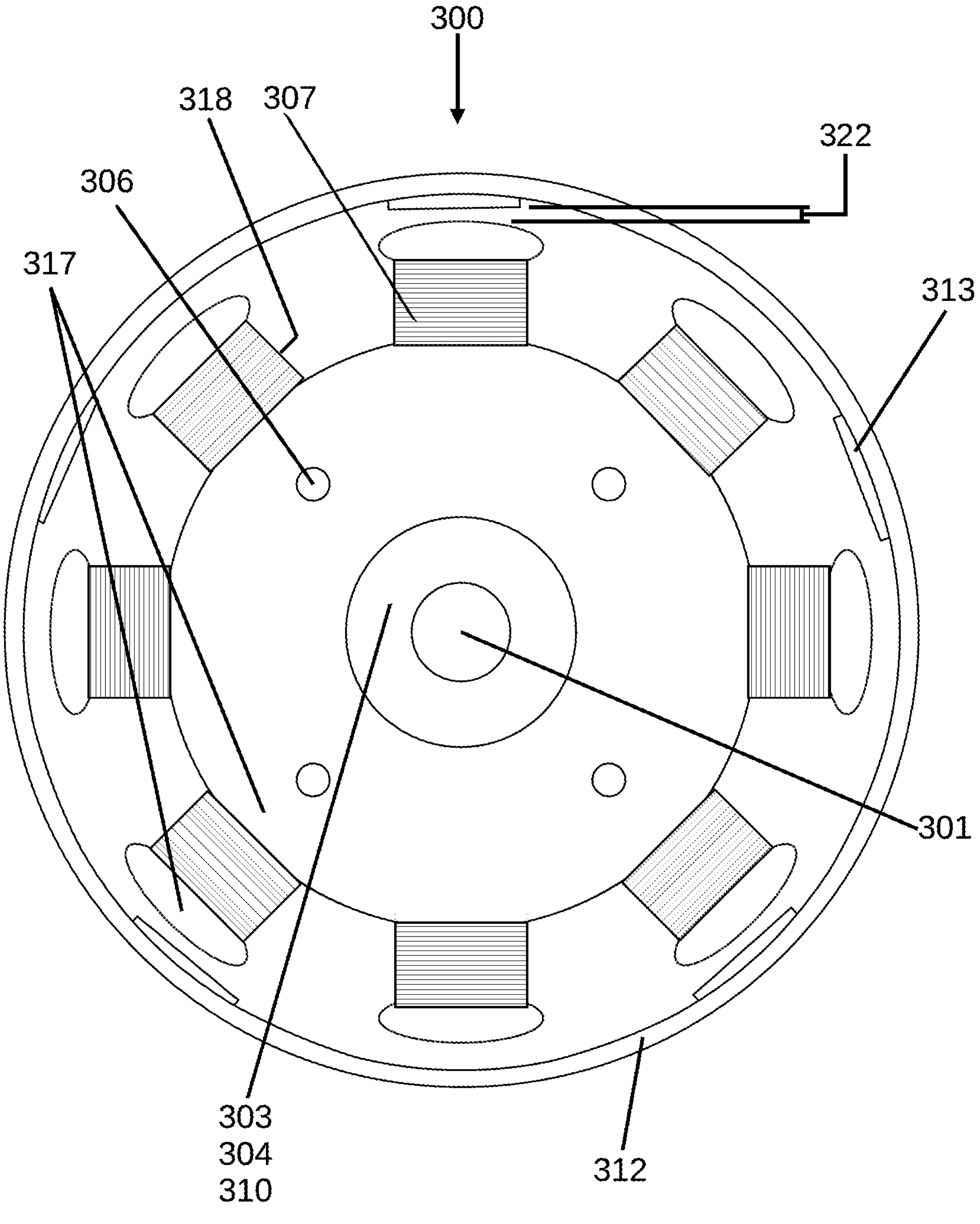
FIG. 48 illustrates a top view of an alternative embodiment of a motor housing.
Figure 49:
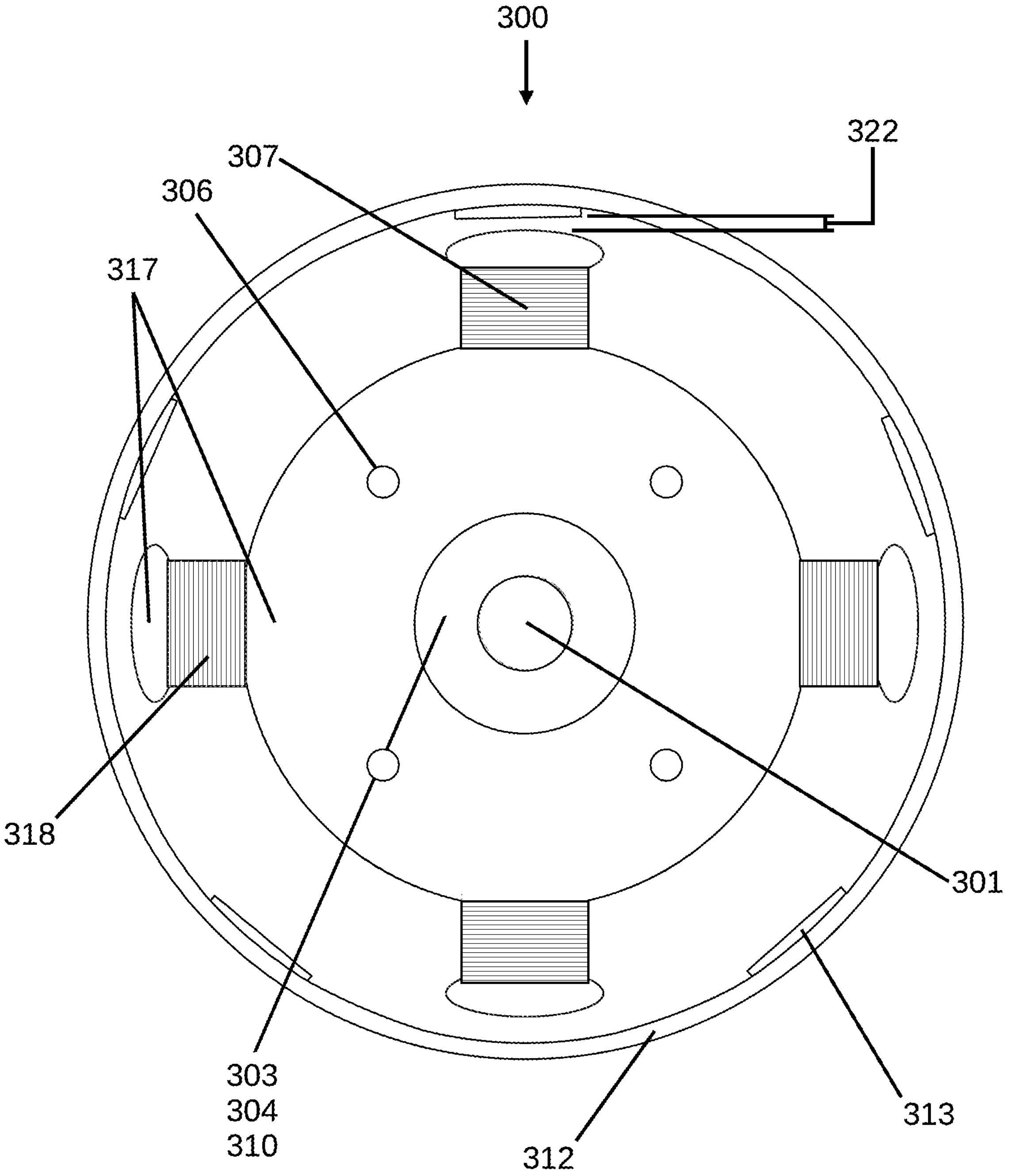
FIG. 49 illustrates a top view of an alternative embodiment of a motor housing.
Figure 50:
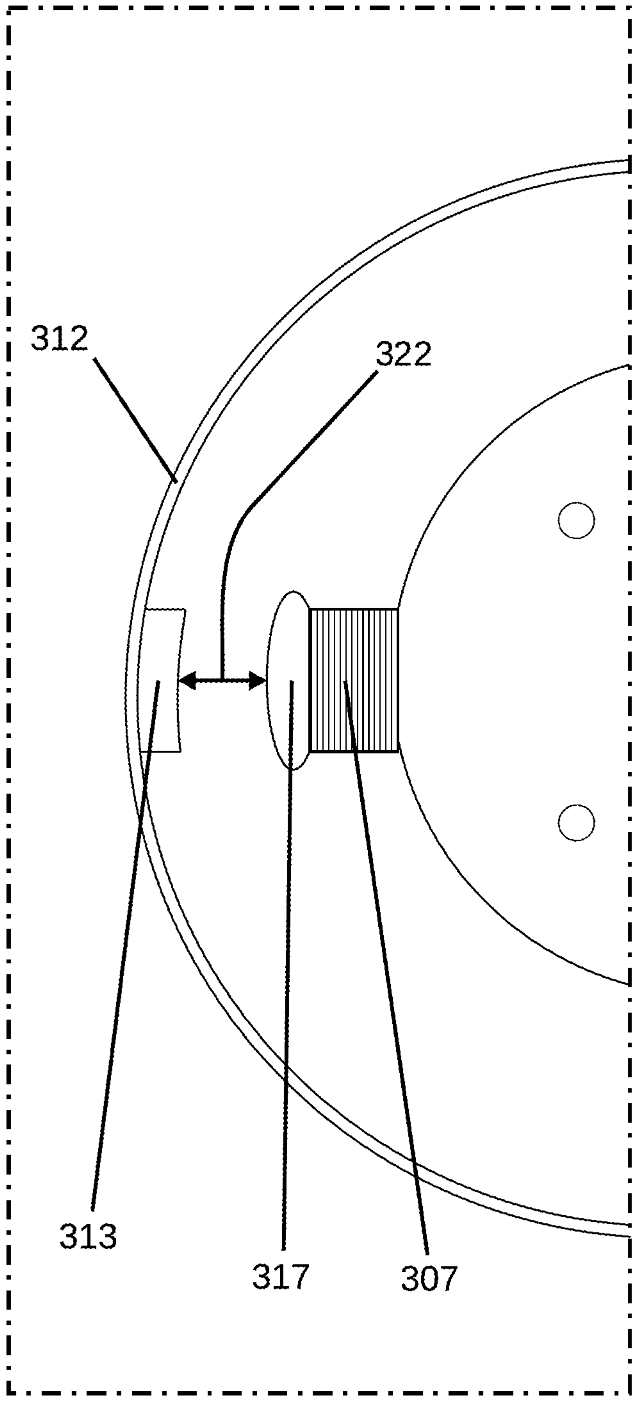
FIG. 50 illustrates a partial top view of an embodiment of a motor housing.

Turning now to FIG. 41, an embodiment in which the circuit is part of a system with an electric motor is shown. In this embodiment, the inductor (i.e., motor winding) 106 is a coil or winding in an electric motor 300. The motor 300 includes a shaft 301 and a bearing 303 that maintains a rotor 312 comprising a plurality of magnets 313. In the illustrated embodiment, each magnet 313 has a south pole 320 facing the shaft 301 or bearing 303 and a north pole 316 facing outward. In alternative embodiments, magnets 313 may be configured in different orientations. The rotor 312 is adjacent to an inductor (i.e., motor winding) 106. When current flows through the inductors (i.e., motor winding) 106, the generated magnetic field causes the motor 300 to rotate. Any suitable type of bearing can be used such as ceramic ball bearings or needle bearings with steel races. In at least some embodiments and in at least some circumstances, the motor increases speed when under load. The motor draws the same amount of current under load, without increasing power draw from the power supply, and in some cases this supplies more current to the rest of the circuit and causes the inductor (e.g., motor winding) 106 to generate a stronger electric field. In turn, a stronger electrical current 130 flows through the diode 118 and to the capacitor 120. This result provides more energy being recycled and returned to the power supply or battery or input power source 100.

FIGS. 42-50 illustrate example embodiments of a motor assembly and/or housing 300. While example embodiments are shown, different types or configurations of motors and motor components may be used in alternative embodiments. In the illustrated embodiments, the motor housing 300 includes a motor shaft keyway 302, a motor shaft 301, a motor housing end plate 308, a motor housing bottom plate 309, a hub 310, a bearing case 303, a bearing case housing 304, a winding holding plate 305, a motor winding 307, a winding assembly bolt connection 306, a magnet holder, and a rotor assembly 312. The motor housing 300 includes materials such as plastics, FR-4 or G-10, METGLAS® brand amorphous metal, silicon steel and resin compositions, other ferrous and non-ferrous materials, and combinations thereof. Examples of materials that can be used to form the rotor and motor housing include plastics, FR-4 or G-10 fiberglass laminate, METGLAS® brand amorphous metal, silicon steel, and resin compositions.

The hub 310 may be a bolt or other type of assembly that connects the rotor 312 to the motor shaft 301. A key or bolt 311 extends through the hub 310 and into the motor shaft 301. Additionally, hub bolt 314 extend through the hub 310, rotor lamination bolts 306 also extend into the rotor assembly 312. The bearing case housing 304 may also be a coil holder. The winding mount 306 holds windings and may also be bolted or fastened. A coil assembly 319 includes the motor winding 307. The coil assembly 319 includes a coil former or bobbin 318 around which wire forming the motor winding 307 is wound. The coil assembly 319 also has a core 317 extending through the center portion of the coil former 318 and through the center portion of the motor winding 307. Examples of material that can be used to form the core 317 include plastic, FR-4 or G-10, METGLAS® brand amorphous metal, silicon steel and resin compositions, other ferrous and non-ferrous materials, and combinations thereof. The magnet holder may also be a channel or a cavity that holds magnets to the rotor 312 or in the rotor 312. The motor winding 307 may also be a winding, inductor, or coil. In at least some example embodiments, the gap 322 or distance between the magnet and winding is in the range from approximately 3.9 thousandths of an inch (0.1 mm) to approximately 0.39 inch (10 mm). The bolt connection 306 may be other types of bolt connection for layer lamination, or for multi-layer rotor assemblies. In alternative embodiments, a weld, an adhesive, or other types of fasteners may be used in place of a bolt connection 306.

The rotor assembly 312 is also capable of holding magnets and providing indexed spacing for magnets. Rotor material may be plastics, FR-4 or G-10, METGLAS® brand amorphous metal, silicon steel and resin compositions, ferrous and non-ferrous materials, and combinations thereof. The rotor assembly 312 may also have a magnet inline or be skewed at an angle. The winding, inductor, or coil may be inline or skewed at an angle. The cross-sectional area of the winding, inductor, or coil can vary depending on design or use. Cross-sectional area refers to the surface area in which the winding, inductor, or coil or magnet or magnets are exposed to each other. The greater the cross-sectional area, the more energy consumed, recovered, more horsepower or torque is generated. In an example embodiment, the cross-sectional area of the winding for the cross-section facing the magnet is in the range from a value greater than 0 to approximately 60 inches (1,524 mm). The rotor may include layered lamination to create the rotor assembly 312. The layered laminations may also have channels or magnet mounts.

In an example embodiment of the motor assembly or housing 300, magnets 313 are located on or in the rotor 312. The rotor 312 is 6 inches in diameter and approximately 6.25 inches (158.75 mm) long. In example embodiments, the magnets 313 are approximately 0.25 inches×0.5 inches×2 inches (6.35 mm×12.7 mm×50.8 mm). In other embodiments, the magnets 313 can have other dimensions and can have a length greater or less than 2 inches (50.8 mm), a thickness greater or less than approximately a quarter inch, or a width greater or less than approximately a half inch. In example embodiments, each magnet 313 can be a single magnet or multiple magnets (e.g., three magnets) pressed together to make one long magnet. The magnets 313 are spaced equidistantly from each other along the rotor 312.

The orientation or pole direction (i.e., north/south, all north, or all south or halbach array) of the magnets 313 is changeable. Various magnet material types may be employed. Examples of magnetic materials that can be used include ceramic, samarium-cobalt, neodymium-iron-boron, alnico, barium/stratium and carbonate ceramic. The cross-sectional area of the magnets can vary based on a variety of factors. In example embodiments, the cross-sectional area of the magnets for the cross sectional facing the winding) can be in the range from greater than 0 to approximately 48 inches (1219 mm). In at least some example embodiments, the magnet can be an N52 magnet and generate a magnetic field having a strength of approximately 1.48 Tesla or less.

Further, one or more magnets may be employed. In at least some example embodiments, the spacing between adjacent magnets is in the range from approximately 0.1 inches (2.54 mm) to approximately 10 inches (254 mm). In other embodiments, the magnets 313 are spaced less than approximately 0.1 inches (2.54 mm) or greater than 10 inches (254 mm). Similarly, in at least some example embodiments, the spacing between adjacent windings is in the range from approximately 0.1 inches (2.54 mm) to approximately 10 inches (254 mm). In other embodiments, the windings 313 are spaced less than approximately 0.1 inches (2.54 mm) or greater than 10 inches (254 mm).

The rotor size determines the amount of energy the system can produce or consume (mechanical or electrical), with respect to magnet strength, size, orientation, quantity, and rotor material. In at least some example embodiments, the motor consumes approximately 5 V to approximately 520 V and approximately 50 uA to approximately 30 A. In at least some examples the motor has a switching frequency in the range from a value greater than 0 Hz to approximately 2 MHz and a horsepower rating in the range from a value greater than 0 HP to approximately 22 HP. In at least some example embodiments, the motor rotates at a rate in the range from approximately 1 RPM to approximately 60,000 RPM.

Figure 51:
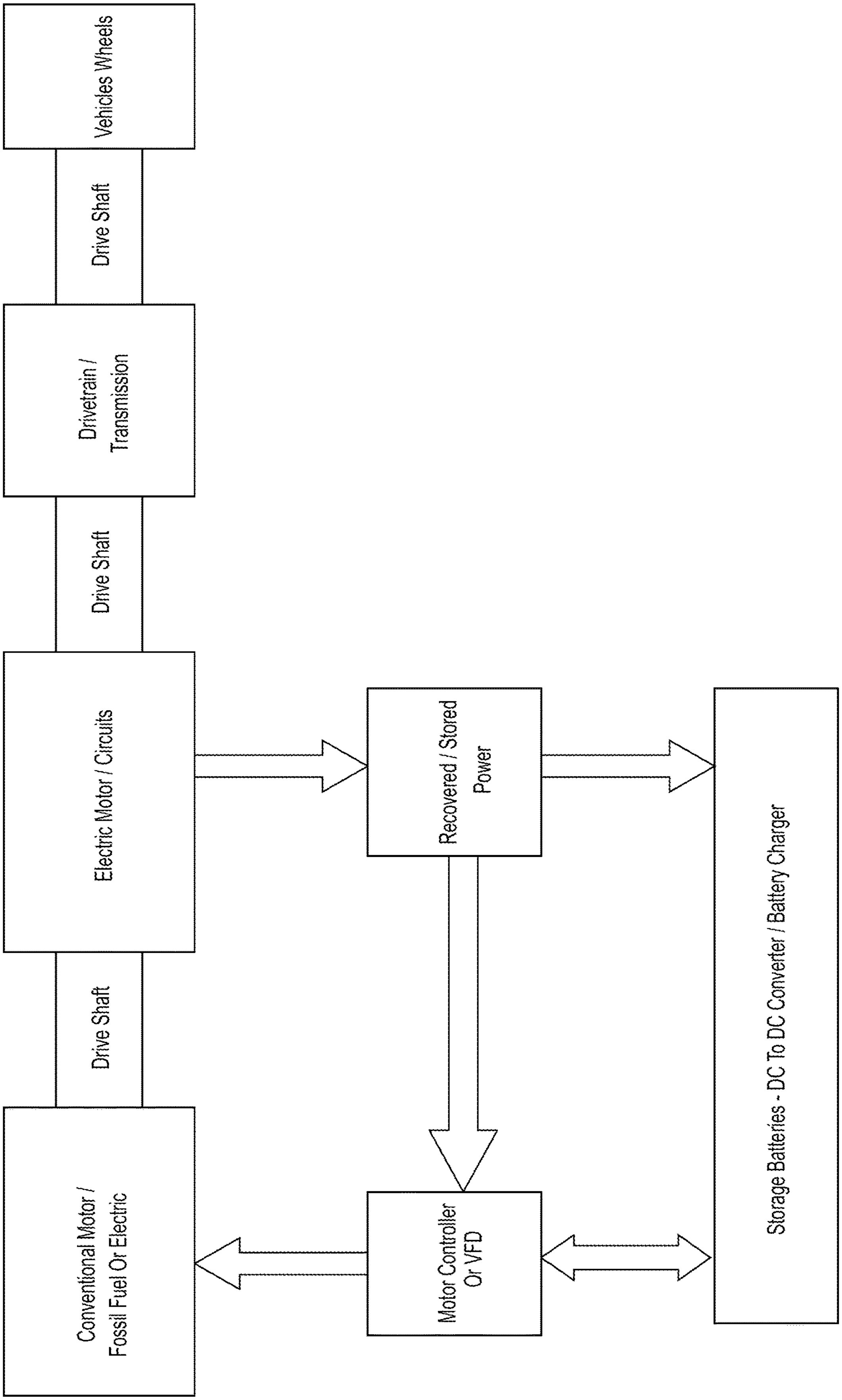
FIG. 51 illustrates an example block diagram of the circuit in use for energy storage in vehicles.

FIG. 51 shows an example of the circuit being used for energy storage for vehicles. The system uses a conventional motor, fossil fuels, or electricity to start and move the vehicle. Once the vehicle is in motion and not under a moderate to heavy load or not needing to charge storage batteries, the electric motor system can power the vehicle. Extra recovered energy that is not needed to move or power the vehicle will be transferred to the storage batteries. The recovery system also may transfer energy directly to the electric motor system if the batteries are significantly charged. When more torque or horsepower is needed, the conventional system will turn back on. If more power is still needed, the electric motor will stop charging the storage batteries and also will help power the vehicle, teaming both motors together. During this time, all the recovered energy will be transferred to the conventional motor if it is an electric motor.

If the conventional motor is fossil fueled, the electric system will transfer all the recovered energy to the storage batteries and back to the electric motor's input. This reduces or eliminates the electrical draw from the storage batteries. Once the load returns to normal, or under light load, the system will start charging the storage batteries and shut down the conventional motor until the need arises. If the vehicle is under a heavy load or acceleration, the conventional motor may be started and remain running, and may use the storage batteries' energy if the motor is electric. If the vehicle is going downhill, all motors may be turned off. The recovery system will remain on and transfer all recovered energy directly to the storage batteries. At the end of this recovery cycle, the system will return to normal operation, until the need arises for a system configuration to charge once again.

Other examples in which the system can be used for energy storage include other vehicles having an electric motor that forms at least part of its drive system such as trains and boats; conveyer belts; construction equipment; appliances such as washing machines and clothes dryers; fans; any other motorized apparatus; and other things in which it is advantageous to recapture energy.

Figure 52:
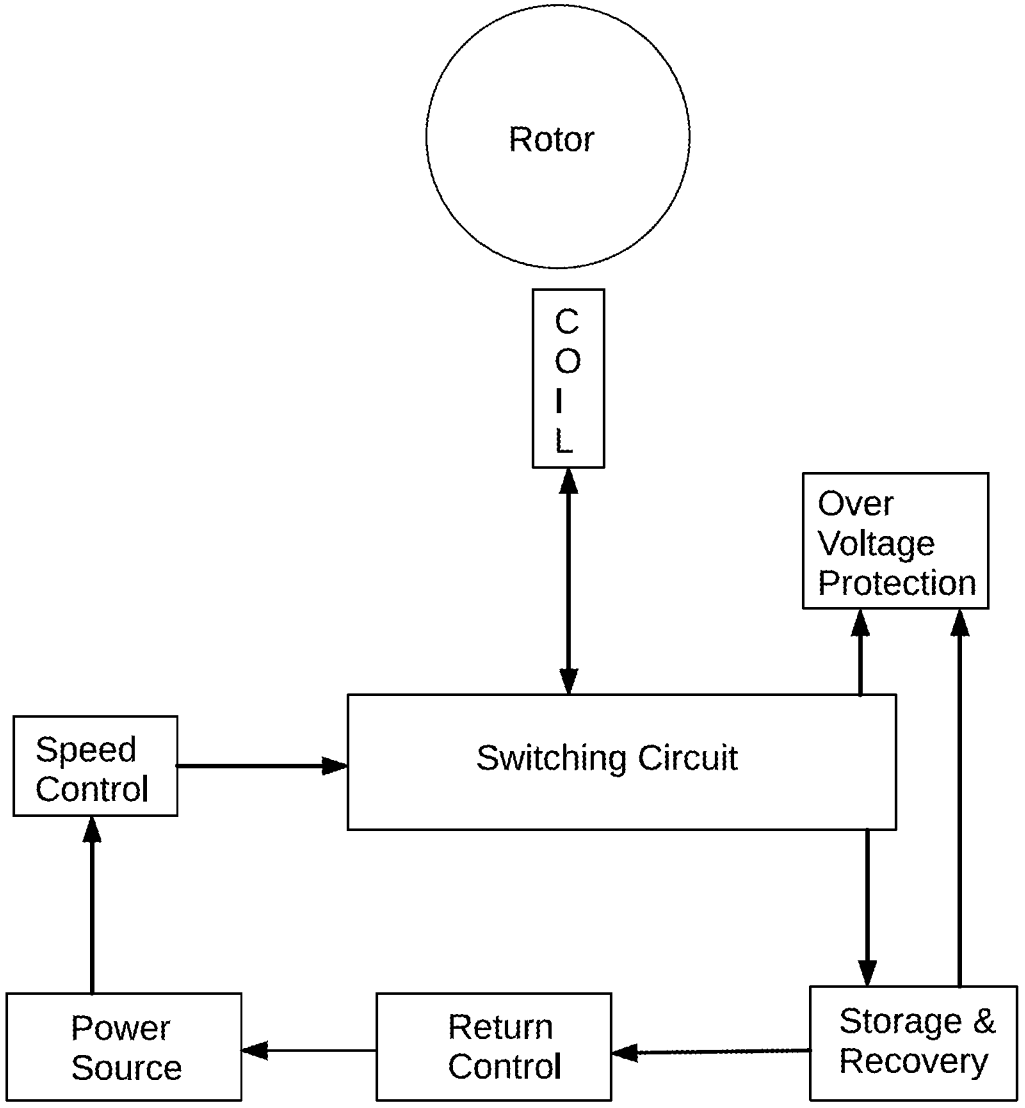
FIG. 52 illustrates an example block diagram of the circuit with a speed control.

FIG. 52 illustrates an example block diagram of the system. The system includes a rotor and coil connected to a switching circuit. The switching circuit is also connected to a speed control unit, a storage and recovery unit, and an over voltage protection. The system also includes a power source and a return control. When the rotor in the motor is in motion, magnetic energy is collected and stored into a capacitor or other storage device. The stored energy is then returned to an input, which is a continuous or pulsed input, without causing the motor to lose synchronization or speed.

Figure 53:
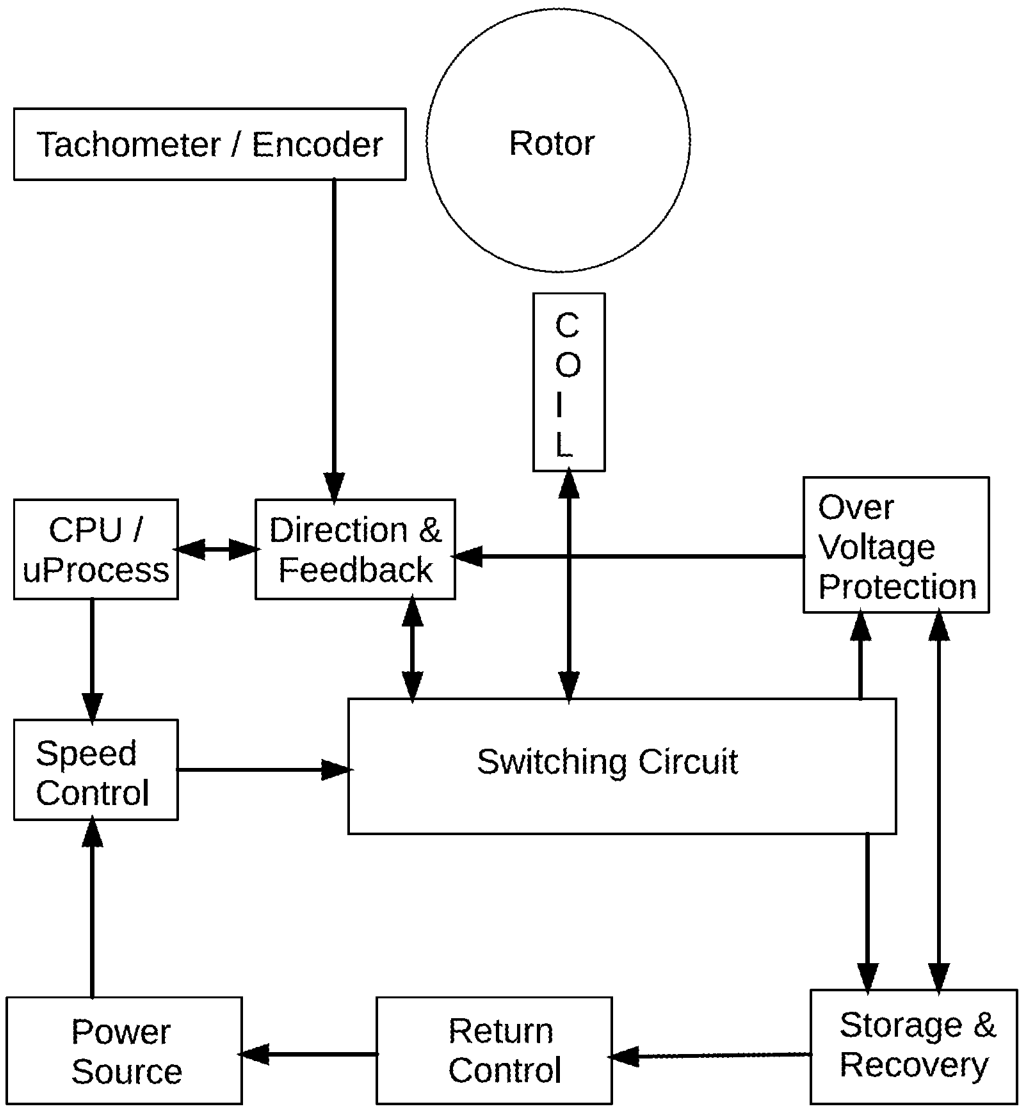
FIG. 53 illustrates an example block diagram of a CPU including the switching circuit.

FIG. 53 illustrates a block diagram of a CPU-based motor controller including the switching circuit. The system includes a rotor and coil connected to a switching circuit. The switching circuit is also connected to a speed control unit, a storage and recovery unit, an over voltage protection, and a direction and feedback unit. The system also includes a power source, a return control, a speed control, a CPU or microprocessor and a tachometer/encoder.

Electric motors, in general; permanent magnet, BLDC or electric motors with field windings can be used. If field winding motors are used, the field winding are generally energized first. As noted herein, there can also be more than one circuit in use for a single motor. An example 4 pole permanent magnet motor could use 4 circuits, one per pole, or just one circuit for all 4 poles. BLDC motors also can have 1 circuit per pole or phase. Poles can be wired in series or parallel or series/parallel. Additionally, example motors can have a difference number of magnets and poles. For example, a motor could have five magnets on its rotor, and four poles. Poles or pole pairs refer to magnetic orientation. Field windings can operate as inductors because they are the magnets or pole pairs used to form the rotor in the motor. The cross-sectional area of magnets or winding area effects the motor RPM, energy consumption by the motor, energy recovered from the motor, motor horsepower, and torque generated by the motor. An advantage of using permanent magnet motors is that they don't require electricity to generate the magnetic field.

As discussed in more detail herein, three embodiments of the circuit were tested to demonstrate performance and the recovery of energy. The first test used the exemplary circuit illustrated in FIG. 54. The second test used the exemplary circuit illustrated in FIG. 55. The third test used the exemplary circuit illustrated in FIG. 60.

Test 1

Figure 54:
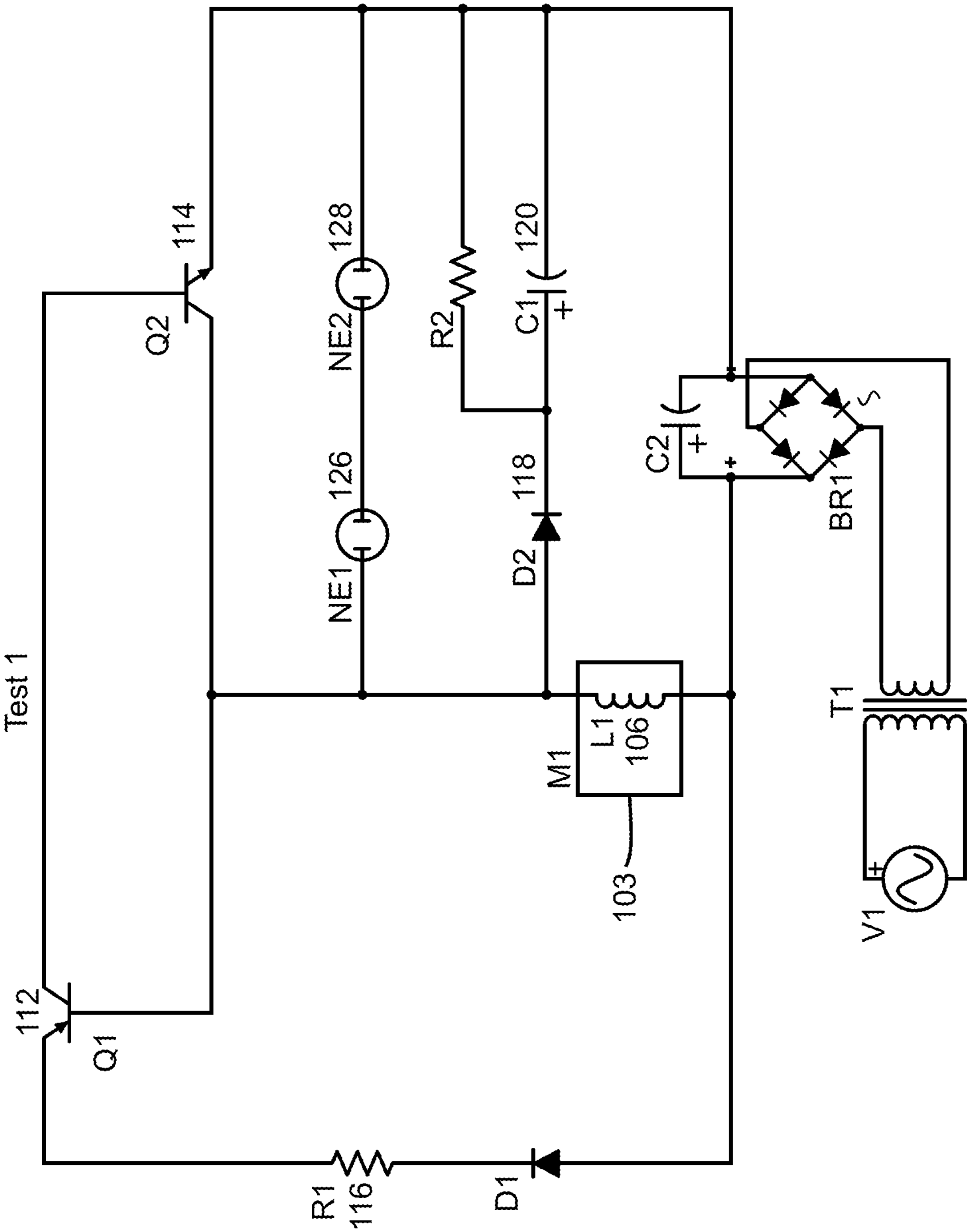
FIG. 54 illustrates an alternative embodiment of the circuits shown in FIGS. 2-40 and used in a test.

The test circuit illustrated in FIG. 54 is substantially similar to the circuit illustrated in FIGS. 3-5 with a second resistor R2 electrically connected in parallel to capacitor C1. In the test circuit, resistor R1 corresponds to resistor 116 and has a value of approximately 330 Ohms. Transistor Q1 corresponds to transistor 112 and is a model MJL21193 PNP transistor commercially available from On Semiconductor (a/k/a Semiconductor Components Industries, LLC) having its principal place of business in Phoenix, AZ. Transistor Q2 corresponds to transistor 114 and is a model MJL21194 NPN transistor also commercially available from On Semiconductor. Neon light bulbs NE1 and NE2 correspond to neon bulbs 126 and 128, respectively, and are 90 Volt DC bulbs. Diode D2 corresponds to diode 118 and are model MUR1520 diode manufactured by ON Semiconductor. Capacitor C1 corresponds to capacitor 120 and has a rating of 0.1 farads at 160 V. Inductor (i.e., motor winding) L1 corresponds to inductor (i.e., motor winding) 106, and is a winding in motor M1 103, has 200 turns of 18 gauge (AWG) wire, a resistance of 0.812 Ohms when conducting direct current, and an inductance of 2.816 mH at 100 Hz. The inductor (i.e., motor winding) L1 has an air core.

The battery 110 from FIGS. 3-5 is replaced by a power supply circuit 110 comprising a full-wave rectifier BR1, filter capacitor C2, and variable transformer T1. The DC output terminals of the full wave rectifier BR1 are electrically connected at the positions of battery 110 terminals from FIGS. 3-5. The filter capacitor C2 also is electrically connected at the position of the battery 110 terminals from FIGS. 3-5. Filter capacitor C2 is 0.1 farads at 36 V. The secondary coil of the variable transformer T1 is electrically connected across the input AC terminals of the full wave rectifier BR1. The primary coil of the variable transformer is connected to and received power from a single-phase power source V1 having a nominal voltage of 120 V such as a standard 120 Volt outlet. In this example, the variable transformer is a model TDGC-2KM VARIAC® brand variable transformer, which is commercially available from ISE, Inc., having its principal place of business in Cleveland, OH.

In the test circuit, motor M1 103 has one inductor and an air core. The test circuit is electrically connected to only one winding L1, which is the same as inductor (i.e., motor winding) L1.

Diode D2 is a model MUR1520 diode manufactured by ON Semiconductor Corporation. Resistor R2 is connected in parallel to capacitor C1. As discussed in more detail herein, three values for resistor R2 were used in the test.

The motor M1 103 rotor has a diameter of approximately 3.5 inches and a thickness of approximately 2.25 inches. The motor has 6 neodymium magnet N52 magnets in the rotor with the north pole facing out. Each of the magnets have a width of approximately 0.5 inches, a thickness of about 0.25 inches, and a length of about 2 inches. The motor M1 103 has a single inductor (i.e., winding) 106 in the stator. The motor M1 103 is configured in a similar layout to the example embodiments of motors depicted in FIGS. 41-46.

Three trials of the first test were run, each trial using three different values for the resistor R2—a 500 Watt 20 Ohm resistor, a 500 Watt 50 Ohm Resistor, and a 500 Watt 100 Ohm Resistor. In the test, the recovery voltage was taken across resistor R2 using a B&K2712 multimeter from B&K Precision Corporation having it principal place of business in Yorba Linda, CA. Input voltage was taken across the input to the variable transformer using the B&K2712 multimeter. Power was measured at the input to the variable transformer by a model P4400.01 Kill A Watt™ power meter manufactured by Prodigit Electronics having it principal place of business in New Taipei City, Taiwan. Rotations of the motor shaft were measured by a model DT-2234C digital tachometer. Waveforms were measured using a model SDS1202X-E oscilloscope manufactured by Siglent Technologies having its principal place of business in Shenzhen, China.

Results of the test are as follows:

| | Trial 1 | Trial 2 | Trial 3 |
|---|---|---|---|
| Value of Resistor R2 (Ohms) | 20 | 50 | 100 |
| Input Power (Watts) | 54.9 | 52.4 | 46.1 |
| Input Voltage (Volts) | 20.70 | 20.80 | 21.02 |
| Recover Voltage (Volts) | 26.40 | 38.91 | 50.05 |
| Rotation of Motor Rotor (RPM) | 3,331 | 4,769 | 5,240 |
| Recover Power (Watts) | 34.84 | 30.27 | 25.05 |

As is shown in the results, as the load on the motor increases, the power recovered across the resistor R2 increases, and the speed (RPM) of the motor decreases.

Figure 56:
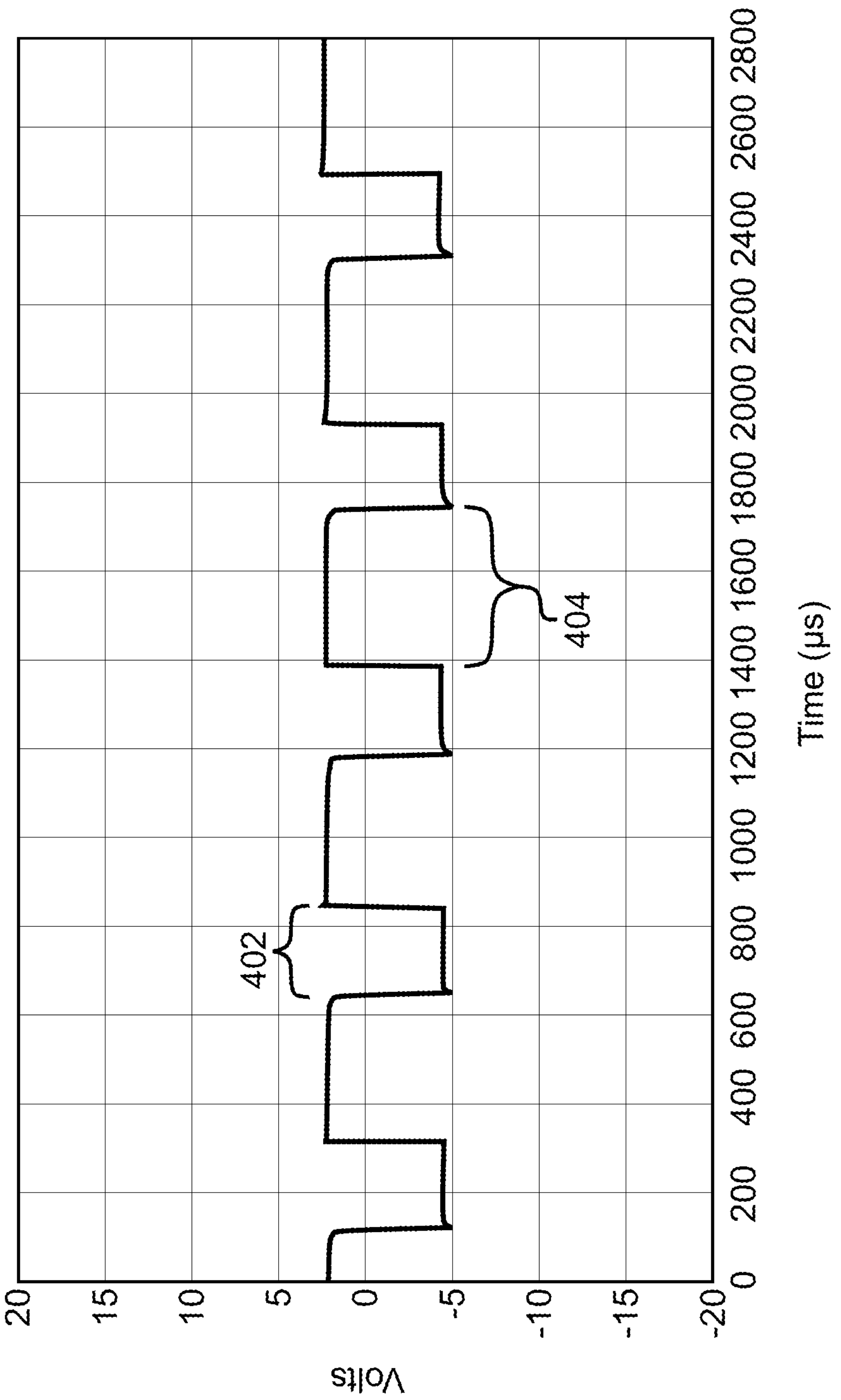
FIG. 56 illustrates a waveform showing voltage as a function of time generated using the circuit illustrated in FIG. 54.

FIG. 56 illustrates the waveform generated across the terminals of the inductor (i.e., motor winding) L1. It is a believed that a first portion 402 begins when magnetic coupling between the magnet and an Inductor L1 reaches a threshold level. During the first portion 402, the magnet moves adjacent to the Inductor L1. At the center of the first portion 402, the magnet is centered on the Inductor L1. As the magnet continues to move relative to the Inductor L1, the magnetic coupling between the magnet and the Inductor L1 falls below a threshold level, causing the waveform to transition from the first portion 402 to a second portion 404. During the second portion 404, the magnetic coupling between the magnet and the Inductor L1 is below a threshold level. During the second portion 404, a voltage across the terminals of the Inductor L1 is generally higher than during the first portion 402 but may be lower during pulses of the transistors Q1, Q2 and the Inductor L1, as described below with relation to FIGS. 57-59 from Test 2.

Test 2

Figure 55:
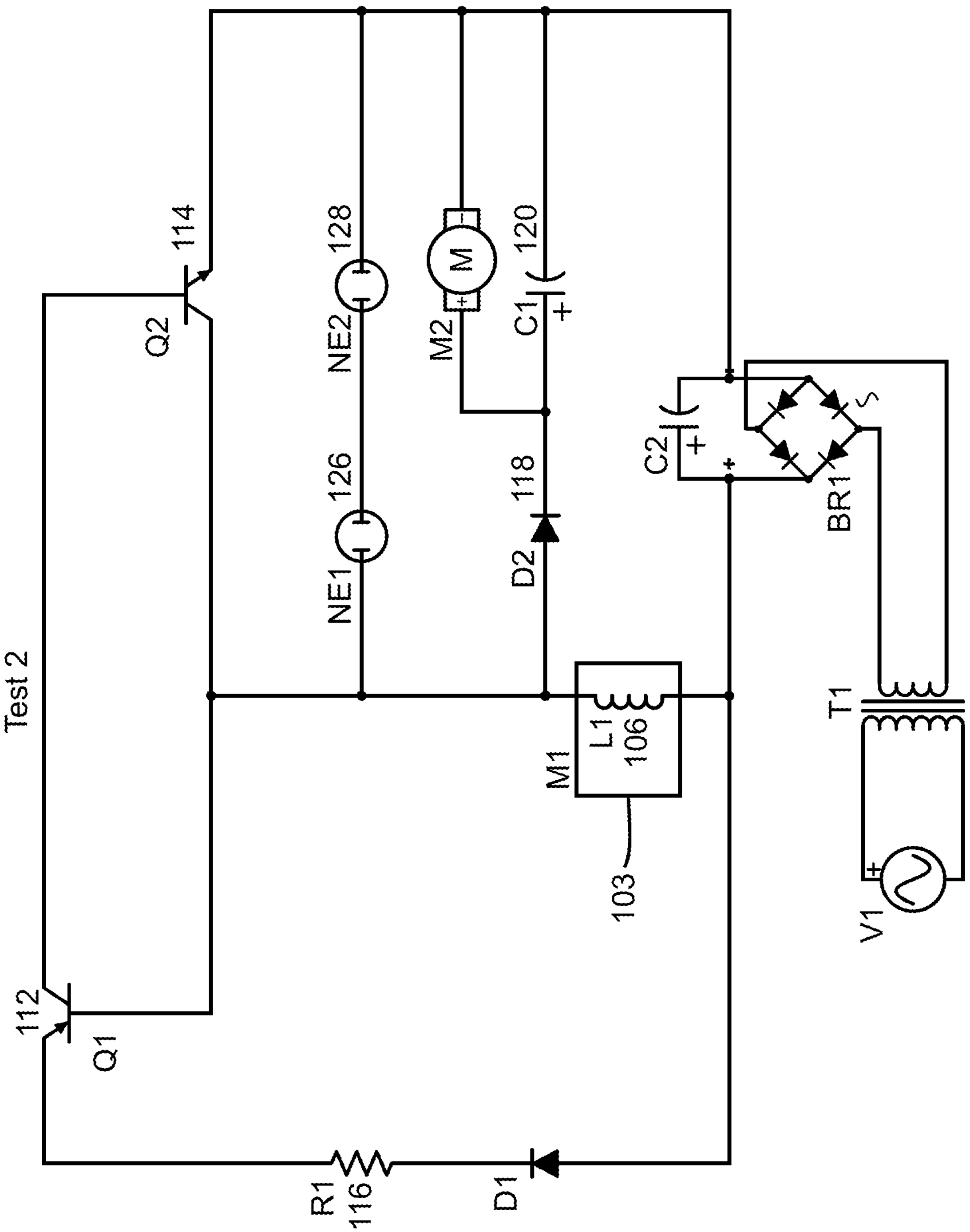
FIG. 55 illustrates an alternative embodiment of the circuit shown in FIGS. 2-40 and used in an alternative test.

The second test was run using the circuit illustrated in FIG. 55. This circuit is substantially similar to the circuit illustrated in FIG. 54. In this test circuit, a second motor M2 replaces resistor R2 and is connected in parallel to capacitor C1. Second motor M2 is a 110 volt DC permanent magnet motor, and has no load RPM rating of 3300 at 110 volt DC. The shaft of motor M2 is connected to the shaft of motor M1 103 and is rigidly coupled end-to-end with the shaft of motor M1 103. The connection is made with a collar (not shown) that is connected to the shaft with set screws. The motor M2 has 0.3 HP rating at 3300 RPM and 110 volts DC. In this test circuit, the inductor L1 has approximately 200 turns of 18 gauge (AWG) wire, a resistance of 0.812 Ohms when conducting direct current, an inductance of 2.816 mH at 100 Hz, and an air core. In this test circuit, the resistor R1 has a value of approximately 300 ohms.

Results of the test are as follows:

| | |
|---|---|
| M2 - Permanent Magnet Motor | 110 volt DC @ 3300 RPM |
| Input Voltage (Volts) | 12.8 |
| Recover Voltage (Volts) | 162.95 |
| Rotation of Motor Rotor Idle(RPM) | 3,300 |
| Rotation of Motor Rotor Under Load (RPM) | 3,000 |

Figure 57:
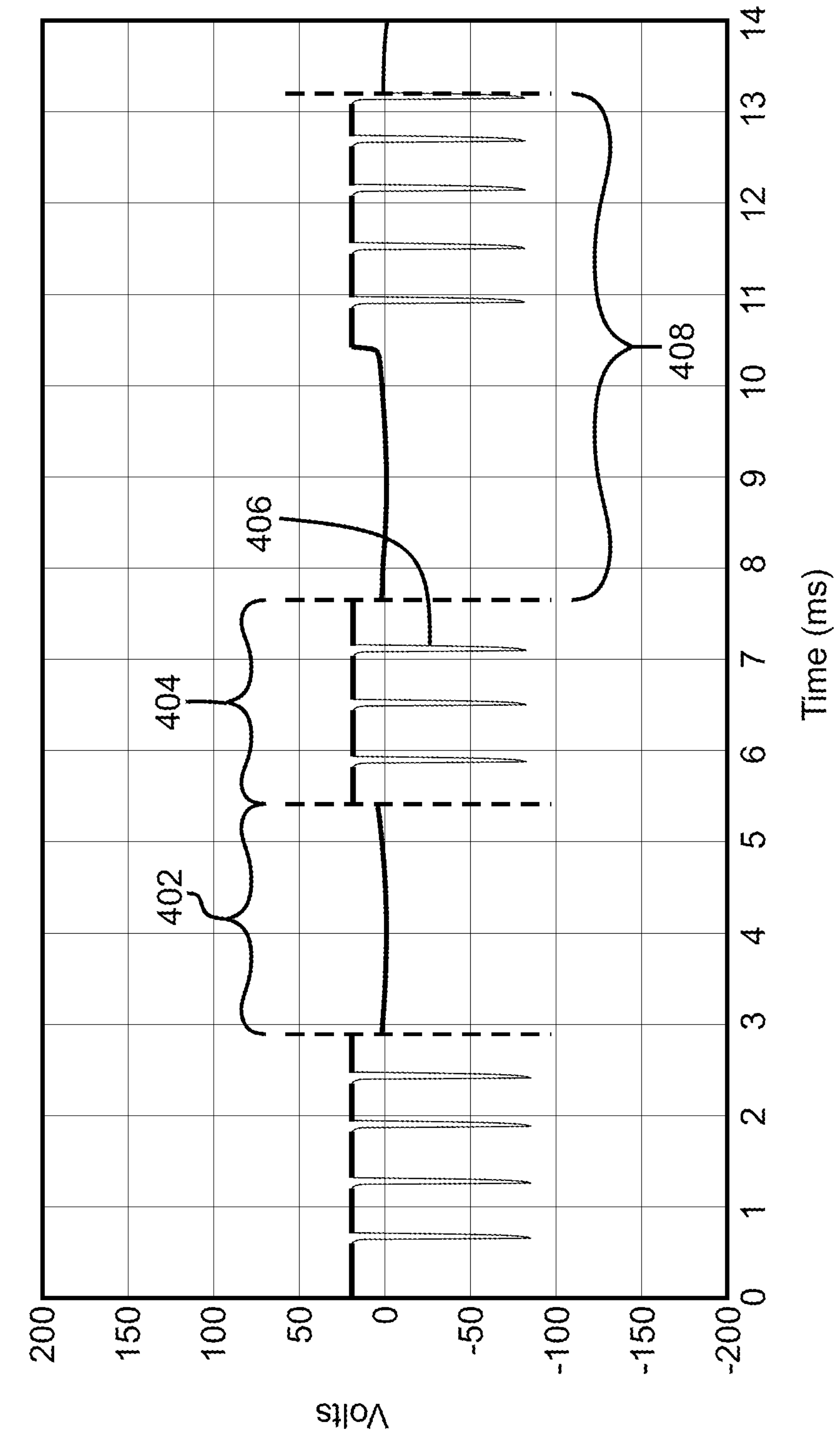
FIGS. 57-59 are images of an oscilloscope screen displaying the waveform showing voltage as a function of time generated using the circuit illustrated in FIG. 55.
Figure 58:
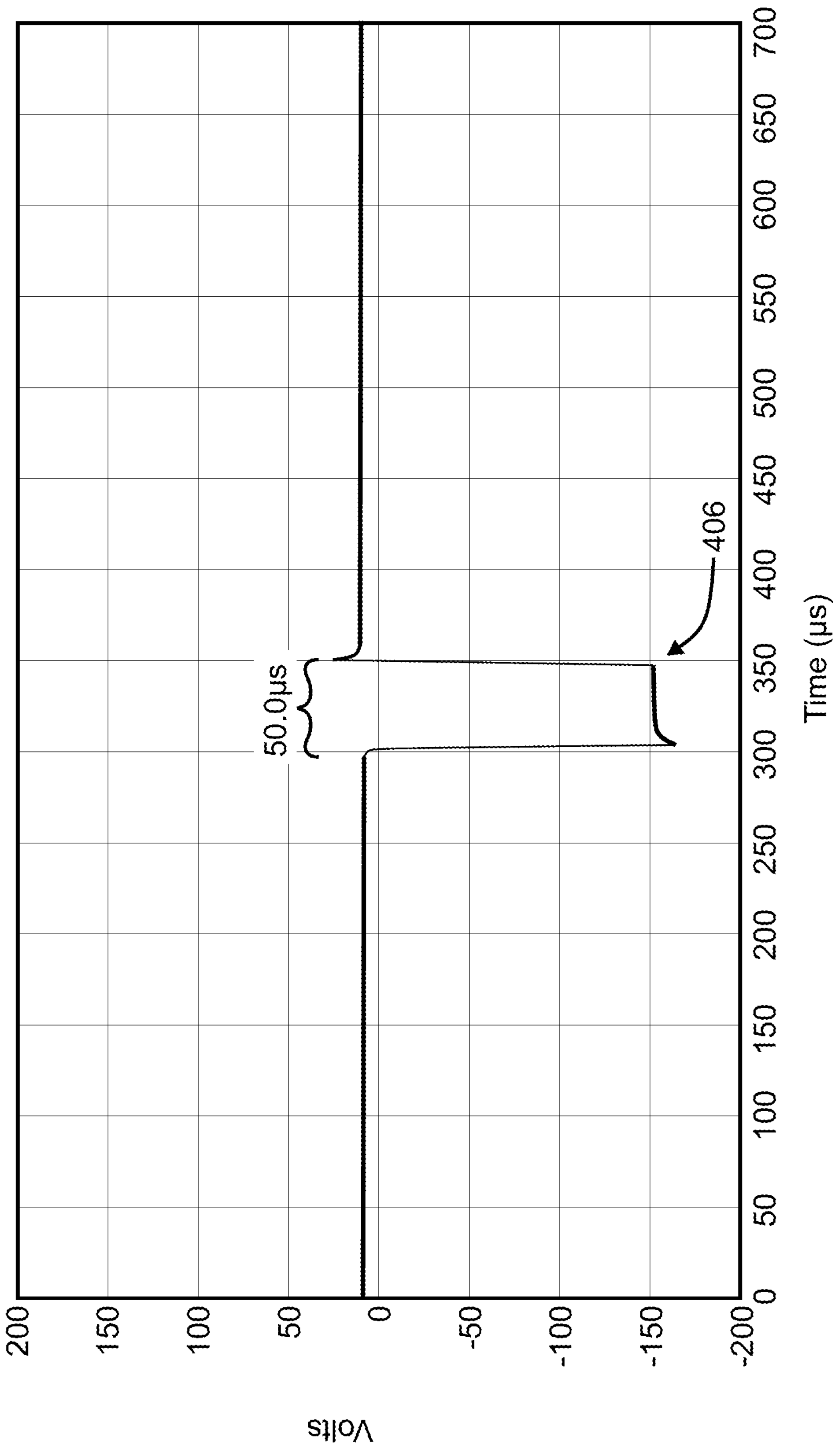
Figure 59:
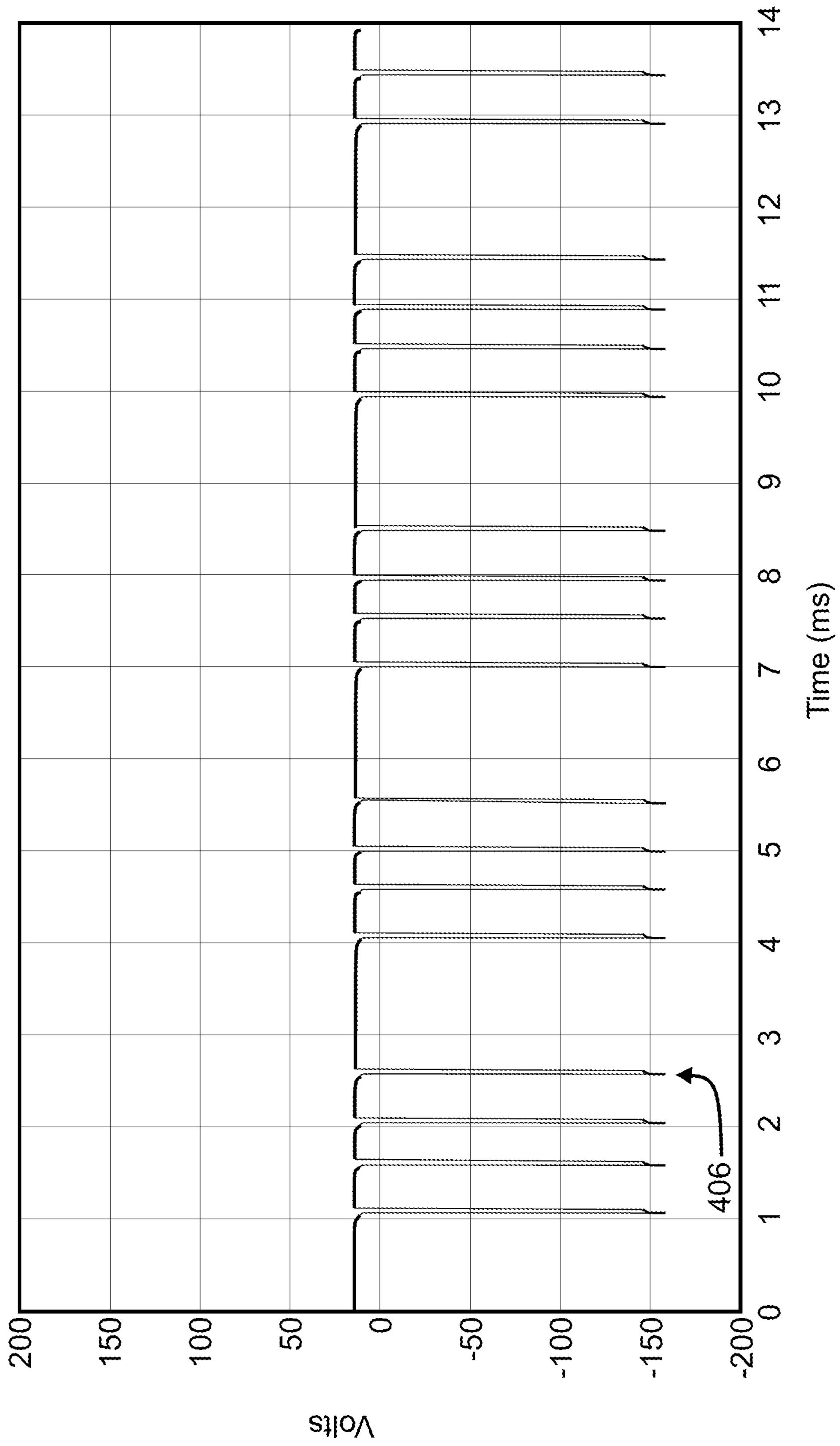

FIGS. 57-59 illustrate images of the oscilloscope screen showing the waveform measured across the terminals of the Inductor L1. The waveform shows the voltage as a function of time. The waveform includes multiple recurring cycle periods 408. Each cycle period 408 corresponds to one magnet passing relative to one Inductor L1 or one Inductor L1 passing relative to one magnet, depending on the configuration of the motor. Accordingly, the number of cycle periods 408 from one full rotation of the motor depends on the number of Inductors L1 and magnets in the motor. For example, with a motor having six magnets rotating relative to an Inductor L1, the waveform includes six cycle periods 408 in one full rotation of the motor, as the waveform shows one cycle period 408 for each of the six magnets passing by the Inductor L1. Each cycle period 408 includes a first portion 402 and a second portion 404, which are similar to the portions 402, 404 in the waveform illustrated in FIG. 56. During the second portion 404, the transistors Q1, Q2 and the Inductor L1 pulse, and the magnetic field in the Inductor L1 collapses and recovers, as shown by the pulses 406. As the motor accelerates, more pulses 406 may occur during the second portion 404 of a cycle period 408. In the waveform illustrated in FIG. 57, the pulses 406 have an average period of 981.54 microseconds and an average frequency of 1.02 kilohertz. During a pulse 406, the voltage changes by approximately 106 volts, from a maximum of approximately 18 Volts to a minimum of approximately −88 volts. As shown in FIG. 58, each pulse 406 has a duration of approximately 50 microseconds.

The waveforms shown in FIGS. 56-59 were captured from example embodiments of the circuits illustrated in FIGS. 54 and 55. Waveforms captured from alternative embodiments of the circuit may share a similar layout and may display similar characteristics; however, waveforms captured from alternative embodiments may not be identical to the waveforms shown in FIGS. 56-59. The shape of the waveforms may be influenced by a number of factors, such as operation of the circuit. Examples include the configuration of the circuit, the load on the motor, a type of motor, and values of the circuit components—e.g., resistances of biasing resistors.

Test 3

Figure 60:
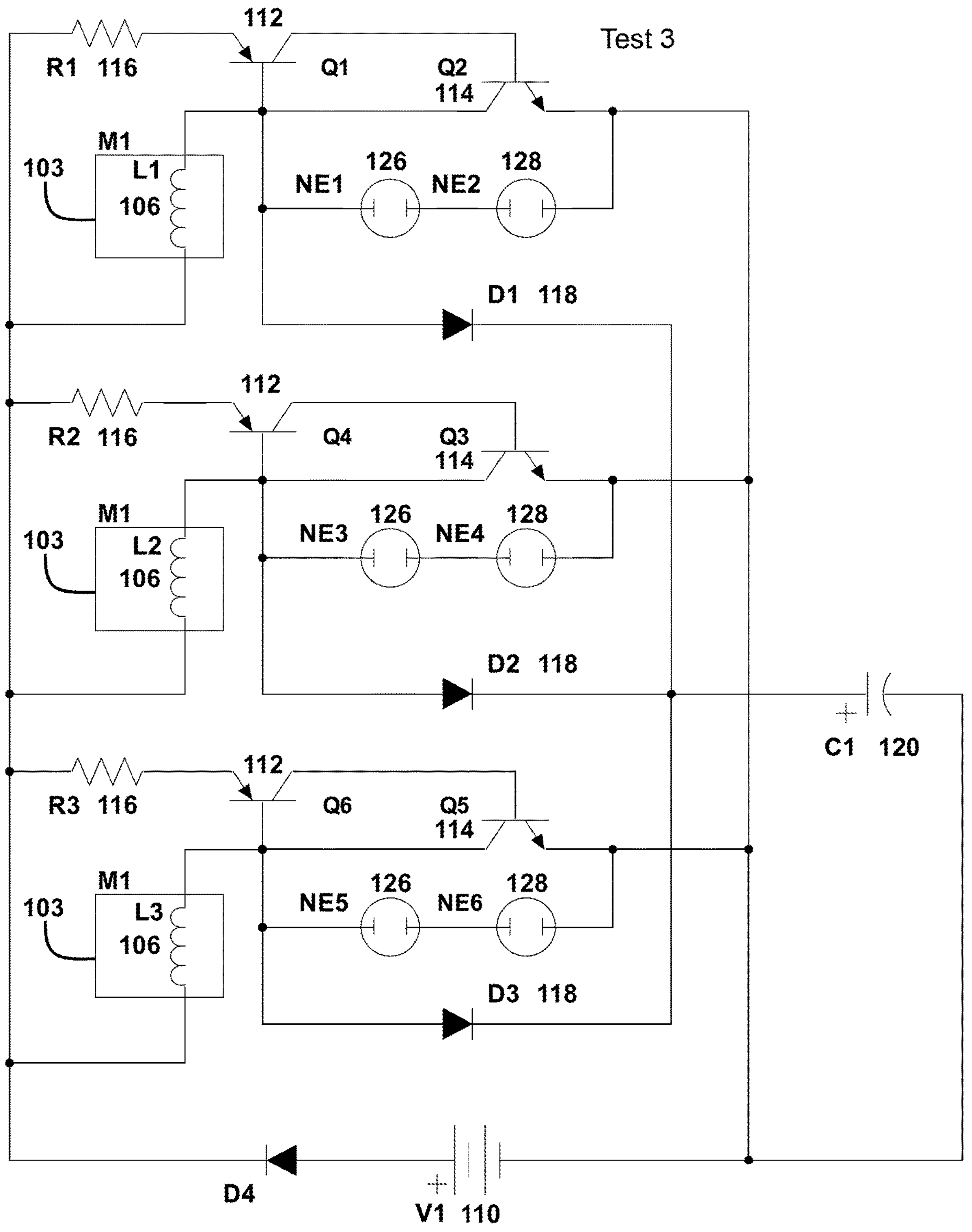
FIG. 60 illustrates another alternative embodiment of the circuit shown in FIGS. 2-40 and used in another alternative test.

The third test was run using the circuit illustrated in FIG. 60. This circuit has three subcircuits, and each subcircuit is substantially similar to the circuit illustrated in FIGS. 3-5 and are electrically connected together with a common power source V1 and a common storage device C1. In this test circuit, resistors R1, R2, R3 correspond to resistor 116 and have a resistance of approximately 500 Ohms. Transistors Q1, Q4, Q6 correspond to transistor 112 and are model MJL21193 PNP transistor commercially available from On Semiconductor (a/k/a Semiconductor Components Industries, LLC) having its principal place of business in Phoenix, AZ. Transistors Q2, Q3, Q5 correspond to transistor 114 and are a model MJL21194 NPN transistor also commercially available from On Semiconductor. Neon light bulbs NE1, NE3, NE5 correspond to neon bulb 126, and neon light bulbs NE2, NE4, NE6 correspond to neon bulb 128. Each of the neon light bulbs NE1, NE2, NE3, NE4, NE5, NE6 are 90 Volt DC bulbs. Diodes D1, D2, D3 correspond to diode 118 and are a model MUR1520 diode manufactured by ON Semiconductor. Capacitor C1 corresponds to capacitor 120 and has a rating of 0.1 farads at 160 V. Power supply V1 corresponds to the battery 110 and is a TDGC-2KM VARIAC® brand variable transformer, which is commercially available from ISE, Inc., having its principal place of business in Cleveland, OH.

Inductors (i.e., motor windings) L1, L2, L3 correspond to inductor (i.e., motor winding) 106, and are windings in motor M1 103. Inductors L1, L2, L3 have approximately 65 turns of 18 gauge (AWG) wire, a resistance of 0.237 Ohms when conducting direct current, and an inductance of 3.041 mH at 100 Hz. The inductors (i.e., motor windings) L1, L2, L3 have cores made of silicon steel (electrical steel). The inductors (i.e., motor windings) L1, L2, L3 are spaced 120 degrees apart within the motor M1 103. Due to the spacing of the inductors (i.e., motor windings) L1, L2, L3 in many possible embodiments, each subcircuit triggers at approximately the same time; however, it is not necessary that each subcircuit triggers at approximately the same time for the circuit to function—e.g., in a three-phase motor, the subcircuits can trigger at different phases and the circuit will function in substantially the same manner. The motor M1 103 has 9 magnets. The magnets are N52 grade and are made of neodymium material. The magnets are evenly spaced in the motor M1 103. The motor M1 103 is configured in a similar layout to the example embodiments of motors depicted in FIGS. 47-50.

The circuit was tested under two conditions: under no load and under load. The load used in the tests is a 100 Watt 120 Volt AC incandescent light bulb, which is connected across the capacitor C1 when the circuit is tested under load. Results of the test are as follows:

| | Motor Under No Load | Motor Under Load |
|---|---|---|
| Rotor Speed (RPM) | 171 | 186 |
| Input Voltage (Volts) | 23.7 | 23.7 |
| Input Current (Amps) | 4.0 | 4.0 |
| Input Power (Watts) | 97.3 | 97.3 |

As is shown in the results, the RPM of motor M1 103 is higher under load than under no load. The motor M1 103 consumes the same input power regardless of whether the motor M1 103 is under load or under no load.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. An energy recovering circuit system, comprising:

a power source, the power source being a first electrical energy source;

a switching circuit defining an electrical path;

a storage device, the storage device being a second electrical energy source; and a motor comprising a coil and a magnet, the coil electrically connected to the power source and the switching circuit, the coil being configured to generate a magnetic field upon receiving an electrical current, wherein at least one of the magnet and the coil is movable relative to the other of the coil or the magnet;

wherein when the coil and the magnet are at a first position relative to one another, the storage device stores electrical energy at a voltage;

wherein when the coil and the magnet are at a second position relative to one another, the switching circuit activates the electrical path to direct current from the power source through the coil, and the storage device provides electrical current to the coil to generate the magnetic field, wherein power delivered to the coil comprises power from both the power source and the storage device; and wherein when the coil and the magnet are at a third position relative to one another, the switching circuit deactivates the electrical path based at least in partially on the position of the coil relative to the magnet to substantially decrease current from the power source to the coil such that:

a magnetic field induced in the coil at least partially collapses; and energy from the at least partially collapsing magnetic field is captured in the storage device, charging the storage device to store recovered energy from the at least partially collapsing magnetic field.

2. The energy recovering circuit system of claim 1, wherein the magnet is movable and the coil is substantially stationary.

3. The energy recovering circuit system of claim 1, wherein the coil is movable and the magnet is substantially stationary.

4. The energy recovering circuit system of claim 1, wherein charging the storage device when the coil and the magnet are at the third position relative to one another increases the voltage of the storage device.

5. The energy recovering circuit system of claim 1, wherein energy is returned from the storage device to the power source through a recovery conversion system.

6. The energy recovering circuit system of claim 5, wherein energy is returned through the recovery conversion system when the coil and the magnet are at the first position relative to one another.

7. The energy recovering circuit system of claim 5, wherein energy is returned through the recovery conversion system when the coil and the magnet are at the second position relative to one another.

8. The energy recovering circuit system of claim 5, wherein energy is returned through the recovery conversion system when the coil and the magnet are at the third position relative to one another.

9. The energy recovering circuit system of claim 5, wherein when energy is returned through the recovery conversion system, the voltage of the storage device decreases.

10. The energy recovering circuit system of claim 1, wherein the recovery conversion system is selected from the group consisting essentially of: the motor, a step-down resistor, a step-down DC-to-DC converter, an electric motor, a light bulb, a series of one or more capacitors, a linear regulator, an inductor, and a transformer.

11. The energy recovering circuit system of claim 1, wherein the motor comprises more than one magnet.

12. The energy recovering circuit system of claim 1, wherein the motor comprises more than one coil.

13. The energy recovering circuit system of claim 1, wherein the switching circuit comprises a PNP transistor and an NPN transistor.

14. The energy recovering circuit system of claim 1, wherein the switching circuit comprises one or more metal-oxide-semiconductor field-effect transistors.

15. The energy recovering circuit system of claim 1, wherein the motor is configured to receive a pulse width modulated signal having a series of pulses controlled by the switching circuit.

16. A method for capturing energy in an electrical circuit, comprising:

storing a voltage in a storage device when a coil and a magnet are at a first position relative to one another, the storage device being a second electrical energy storage source;

activating an electrical path with a switching circuit to direct current from a power source through the coil when the coil and the magnet are at a second position relative to one another, the power source being a first electrical energy storage source, and the storage device provides electrical current to the coil to generate the magnetic field wherein power delivered to the coil comprises power from both the power source and the storage device; and deactivating the electrical path with the switching circuit based at least on party of the position of the coil relative to the magnet to substantially decrease current from the power source to the coil, at least partially collapsing a magnetic field induced in the coil, and capturing energy in the storage device, the captured energy from the at least partially collapsing magnetic field, charging the storage device, to store recovered energy from the at least partially collapsing magnetic field.

17. The method of claim 16, wherein the magnet is movable and the coil is substantially stationary.

18. The method of claim 16, wherein the coil is movable and the magnet is substantially stationary.

19. The method of claim 16, further comprising:

returning energy from the storage device to the power source through a recovery conversion system.

20. An energy capturing circuit, comprising:

a power source supplying electricity to the energy capturing circuit, the power source having a positive side and a negative side, the power source being a first electrical energy source;

a coil with a first side and a second side, the first side electrically connected to the positive side of the power source;

a storage device with a positive side electrically connected to the second side of the coil and a negative side electrically connected to the negative side of the power source, wherein energy released by the coil is captured by the storage device, the storage device being a second electrical energy source;

a PNP transistor having a base, a collector, and an emitter and an NPN transistor having a base, a collector, and an emitter;

wherein the emitter of the PNP transistor is electrically connected to the positive side of the power source, the collector of the PNP transistor is electrically connected to the base of the NPN transistor, and the base of the PNP transistor is electrically connected to the second side of the coil and the collector of the NPN transistor; and wherein the emitter of the NPN transistor is electrically connected to the negative side of the storage device and the negative side of the power source; and a recovery conversion system electrically connected between a positive side of the storage device and a positive side of the power source;

wherein when the coil and the magnet are at a first position relative to one another, the storage device has a voltage;

wherein when the coil and the magnet are at a second position relative to one another, the switching circuit activates the electrical path to direct current from the power source through the coil, and the storage device provides electrical current to the coil to generate the magnetic field wherein power delivered to the coil comprises power from both the power source and the storage device;

wherein when the coil and the magnet are at a third position relative to one another, the switching circuit deactivates the electrical path based at least in part on the position of the coil relative to the magnet to substantially decrease current from the power source to the coil, a magnetic field induced in the coil at least partially collapses and energy from the at least partially collapsing magnetic field is captured in the storage device, charging the storage device to store recovered energy from the at least partially collapsing magnetic field; and wherein recovered energy stored in the storage device returns to the power source by running through the recovery conversion system.

21. The energy capturing circuit of claim 20, further comprising:

a diode with an anode side electrically connected to the second side of the coil and a cathode side electrically connected to the positive side of the storage device, wherein the diode allows current to flow from the second side of the coil to the positive side of the storage device and substantially prevents current from flowing from the positive side of the storage device to the second side of the coil.

* * * * *